(12) United States Patent
Prabhu et al.

(10) Patent No.: US 7,003,093 B2
(45) Date of Patent: Feb. 21, 2006

(54) TONE DETECTION FOR INTEGRATED TELECOMMUNICATIONS PROCESSING

(75) Inventors: Raghavendra S. Prabhu, Costa Mesa, CA (US); Adam Strauss, Brea, CA (US); Stan Hsieh, Diamond Bar, CA (US); Zhen Zhu, Irvine, CA (US); Anurag Bist, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 09/938,699

(22) Filed: Aug. 23, 2001

(65) Prior Publication Data

US 2002/0076034 A1 Jun. 20, 2002

Related U.S. Application Data

(60) Provisional application No. 60/231,090, filed on Sep. 8, 2000.

(51) Int. Cl.
*H04M 1/00* (2006.01)
*H04M 3/00* (2006.01)

(52) U.S. Cl. .................. 379/390.02; 379/386; 379/282; 379/283; 379/351; 379/284

(58) Field of Classification Search ............ 379/390.02, 379/390.03, 386
See application file for complete search history.

(56) References Cited

U.S. PATENT DOCUMENTS

| | | | |
|---|---|---|---|
| 4,570,260 A | * | 2/1986 | Basehore |
| 4,658,420 A | | 4/1987 | Fukushi et al. |
| 4,969,118 A | | 11/1990 | Montoye et al. |

(Continued)

FOREIGN PATENT DOCUMENTS

| | | |
|---|---|---|
| EP | 0 384 490 A2 | 8/1990 |
| EP | 0 576 980 A2 | 1/1994 |
| EP | 0 734 012 A2 | 9/1996 |
| WO | WO 99/29085 | 6/1999 |
| WO | WO 00 17856 | 3/2000 |
| WO | WO 00/17856 | 3/2000 |

OTHER PUBLICATIONS

Mader et al., "Step-size control for acoustic echo cancellation filters —an overview," Signal Processing 80 (2000) 1697–1719.

Sankaran et al., "Convergence Analysis Results for the Class of Affine Projection Algorithms," 1999 IEEE International Symposium on Circuits and Systems, Orlando, Florida, vol. III, pp. 251–254, May 1999.

Gay et al., "The Fast Affine Projection Algorithm," Acoustics Research Department AT&T Bell Laboratories, Murry Hill, NJ.

(Continued)

*Primary Examiner*—Forester W. Isen
*Assistant Examiner*—Ramnandan Singh
(74) *Attorney, Agent, or Firm*—Blakely, Sokoloff, Taylor & Zafman LLP

(57) ABSTRACT

Disclosed is an integrated tone detection processor for discriminating between tone and voice signals and determining the tones. The tone detection processor performs Automatic Gain Control (AGC) to normalize the power of the tone or voice signal. Further, the energy of the tone or voice signals are determined at specific frequencies utilizing a Goertzel Filter process. The tone detection processor determines whether or not a tone is present, and if a tone exists, determines the type of tone. Based upon determining the two maximum energy levels of the Goertzel filtered tone, whether the tone is a single tone, dual tone, silence, or other (e.g. speech) can be discriminated. The tone can then be identified by a user-defined dictionary of tones. Based upon various ON and OFF cadence checks in combination with the use of TONE ON and TONE OFF counters, tones can be declared.

36 Claims, 37 Drawing Sheets

U.S. PATENT DOCUMENTS

| | | | |
|---|---|---|---|
| 5,142,677 | A | | 8/1992 Ehlig et al. |
| 5,241,492 | A | | 8/1993 Girardeau, Jr. |
| 5,325,425 | A | | 6/1994 Novas et al. |
| 5,341,374 | A | | 8/1994 Lewen et al. |
| 5,448,624 | A | * | 9/1995 Hardy et al. |
| 5,499,272 | A | | 3/1996 Bottomley |
| 5,530,663 | A | | 6/1996 Garcia et al. |
| 5,541,917 | A | | 7/1996 Farris |
| 5,559,793 | A | | 9/1996 Maitra et al. |
| 5,563,942 | A | * | 10/1996 Tulai |
| 5,574,927 | A | | 11/1996 Scantlin |
| 5,598,466 | A | | 1/1997 Graumann |
| 5,604,771 | A | * | 2/1997 Quiros |
| 5,638,524 | A | | 6/1997 Kiuchi et al. |
| 5,727,194 | A | | 3/1998 Shridhar et al. |
| 5,748,977 | A | | 5/1998 Kawasaki et al. |
| 5,761,470 | A | | 6/1998 Yoshida |
| 5,809,133 | A | * | 9/1998 Bartkowiak et al. |
| 5,822,613 | A | | 10/1998 Takaki et al. |
| 5,825,685 | A | | 10/1998 Yamane et al. |
| 5,826,072 | A | | 10/1998 Knapp et al. |
| 5,838,931 | A | | 11/1998 Regenold et al. |
| 5,880,984 | A | | 3/1999 Burchfiel et al. |
| 5,881,060 | A | | 3/1999 Morrow et al. |
| 5,901,301 | A | | 5/1999 Matsuo et al. |
| 5,923,871 | A | | 7/1999 Gorshtein |
| 5,940,785 | A | | 8/1999 Georgiou et al. |
| 5,953,410 | A | | 9/1999 Pfeil et al. |
| 5,970,094 | A | | 10/1999 Lee |
| 5,983,253 | A | | 11/1999 Fischer et al. |
| 5,995,122 | A | | 11/1999 Hsieh et al. |
| 6,023,470 | A | * | 2/2000 Lee et al. |
| 6,029,267 | A | | 2/2000 Simanapalli et al. |
| 6,058,408 | A | | 5/2000 Fischer et al. |
| 6,081,732 | A | | 6/2000 Suvanen et al. |
| 6,138,136 | A | | 10/2000 Bauer et al. |
| 6,154,828 | A | | 11/2000 Macri et al. |
| 6,172,985 | B1 | * | 1/2001 Gilbert |
| 6,212,374 | B1 | * | 4/2001 Scott et al. |
| 6,330,660 | B1 | | 12/2001 Ganapathy et al. |
| 6,381,330 | B1 | * | 4/2002 Johanson |

OTHER PUBLICATIONS

Breining et al., "Acoustics Echo Control, An Application of Very–High–Order Adaptive Filters," IEEE Signal Processing Magazine, 1053–5888/99/S10.00©1999IEEE.

M. Felder, J. Mason & B. Evans; Effieicent Dual–tone Multifrequency Detection Using the Nonuniform Discrete Fourier Transform, IEEE Signal Processing Letters, Jul. 1998.

Minoli & Minoli; Chapter 5, Technology and Standards for Low–Bit–Rate Vocoding Methods; Delivering Voice Over IP Networks; 1998; pp. 149–233; Robert Ipsen Pub.

Texas Instruments, SMJ320C80 Digital Signal Processor Data Sheet; document No. SGUS025; Aug. 1998; Texas Instruments.

W. Stallings, Computer Organization and Architecture 4th Edition, pp. 313–386, Prentice–Hall, Inc. New Jersey, 1993.

R. Fromm, Instruction Set Architecture Simulation Infrastructure . . . Development, www.ilpsoft.eecs.berkely.edu:9636/~9636/~ilpsoft/99abstracts/rfromm.1.html, Oct. 15,1999.

Instructions Set Architecture, Web based course, www.–ee.eng.hawaii.edu/~tep/EE461/Notes/ISA/isa.html, Oct. 15, 1999.

J. McCormick, Supporting Predicated Execution: Techniques and Tradeoffs, www.crhc.uiuc.edu/IMPACT/abstracts/report/ms–thesis–jim–mccormick.html, Oct. 15, 1999.

R65C00/21 Dual CMOS Microcomputer and R65C29 Dual CMOS Microprocessor; Rockwell 1984 Data Book; Rockwell International; Doc. No. 29651N64; pp. 3–1–3–33.

D. Patterson & J. Hennessy, Computer Architecture A Quantitative Approach, Morgan Kaufmann Publishers, Inc., San Mateo, CA 1990, pp. 142–143.

J. Mick & J. Brick, Bit–Slice Microprocessor Design, McGraw–Hill Book Company, 1990, p. 191.

R. Kain, Advanced Computer Architecture, A Systems Design Approach, Department of Electrical Engineering, University of Minnesota, Prentice Hall, NJ, pp. 16–17.

J. Cavanagh, Digital Computer Arithmetic, Design and Implementation, McGraw–Hill Book Company, 1994, pp. 1–12.

Texas Instruments, DTMF Tone Generation and Detection An Implementation Using the TMS320C54x Application Report, SPRA096, Jun. 1997.

Texas Instruments, DTMF Tone Generation and Detection An Implemention Using the TMS320C54X, SPEA096, Jun. 1997

Texas Instruments, Application Report SPRA482, Programmable Double Biquad Filter for Tone Detection on Fixed Point DSPs, Feb. 1999, pp. 1–25.

S. Varada and R. Sankar; Hardware Strategies for End–Point Detection, Department of Electrical Eng. University of South Florida, Tampa, FL, 33620, Published Jul. 3, 1995.

* cited by examiner

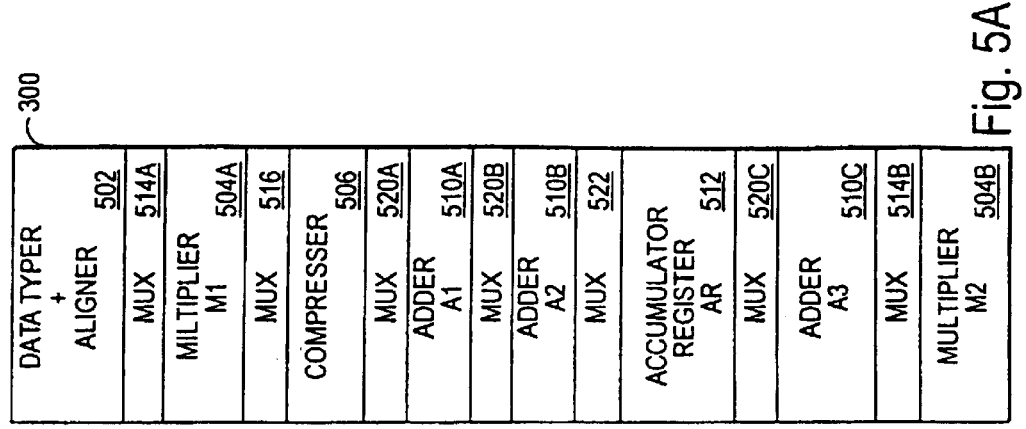
Fig. 5A
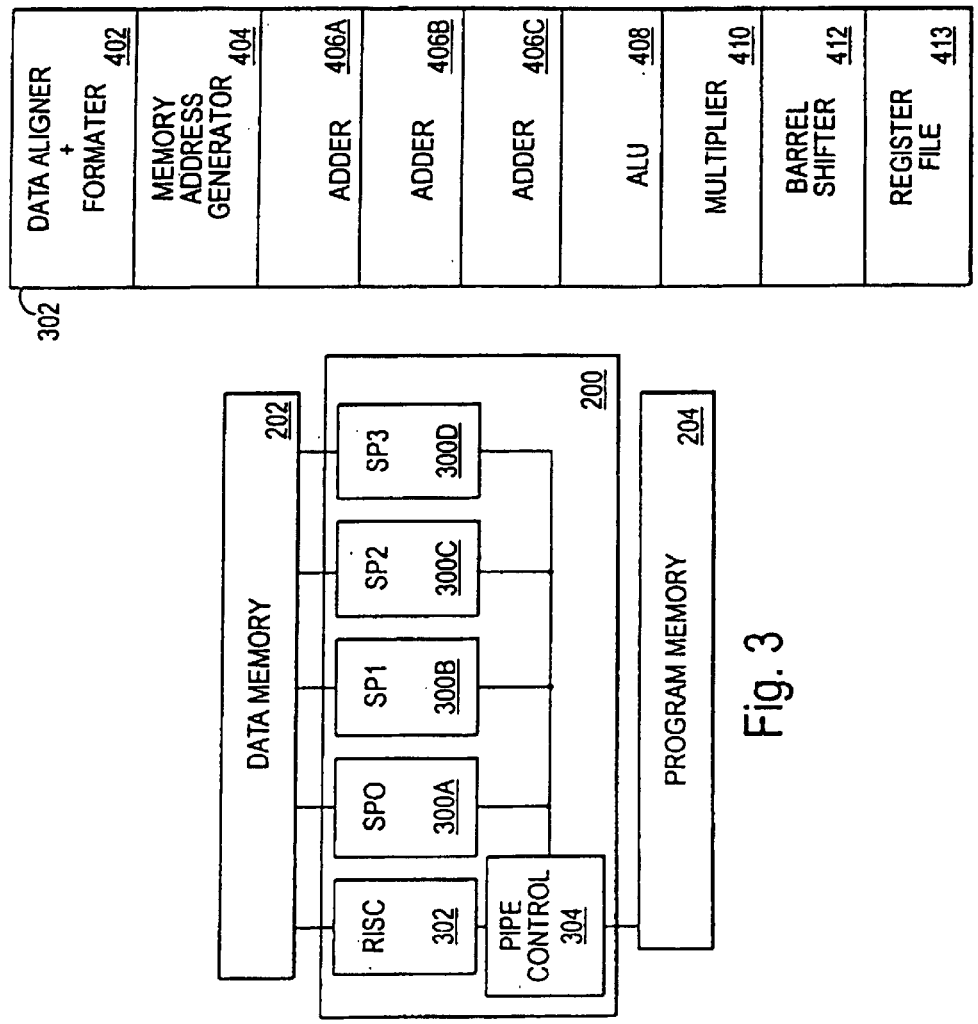
Fig. 4
Fig. 3

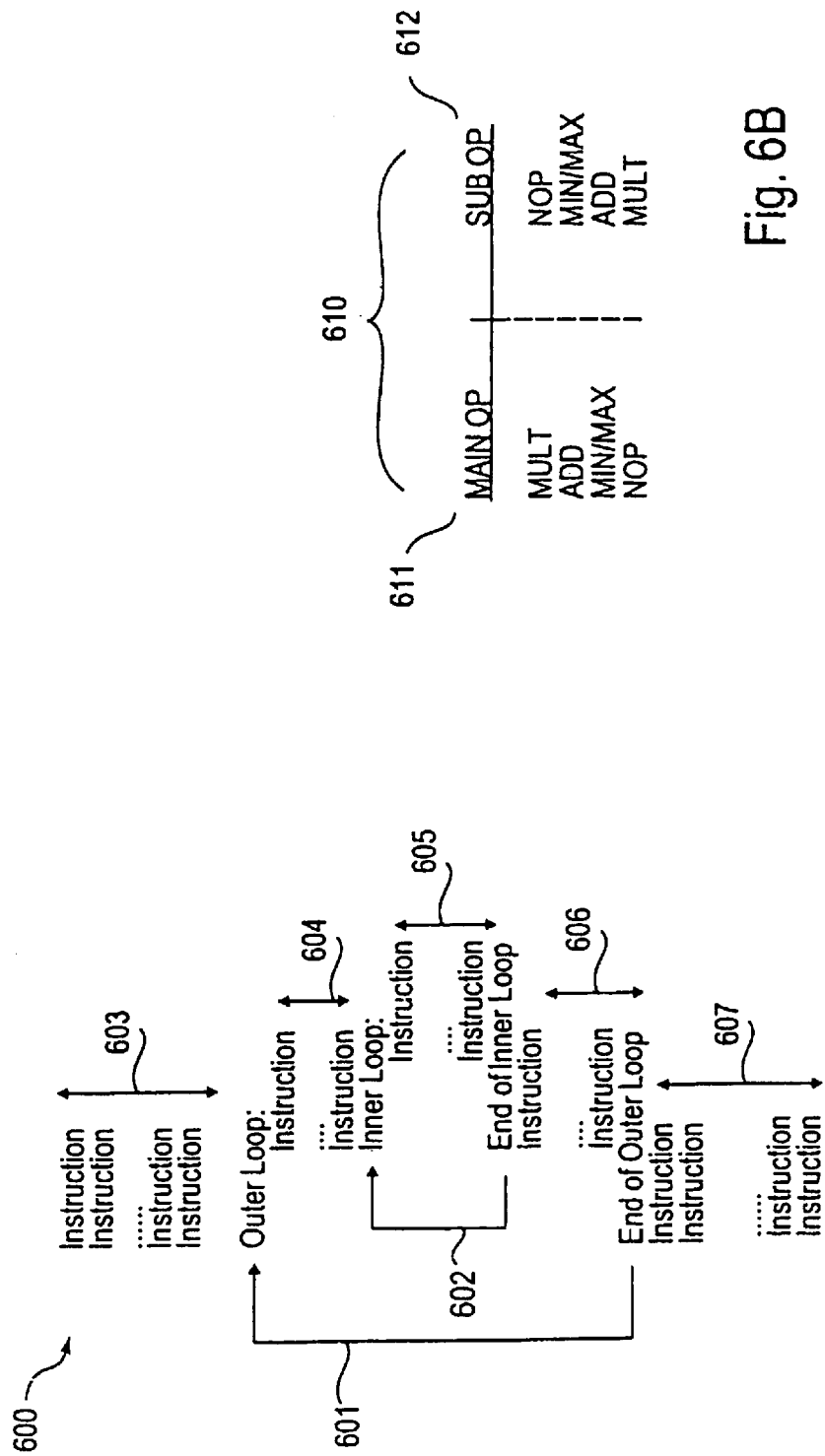

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|

| 1 | 0 | 0 | PS | S* | SX | V/S SA DA | Sub-op | 1 | Pred | PL | Sxl | Syt | Rnd | S* | S* | S* | 0 | SA | DA | abs | 0 | 0 |

| SX | V/S SA DA | Sub-op | | |
|---|---|---|---|---|
| da = +/-sx*sy | Nop | 0 | 0 | 0 |
| da = +/-(sx*sy) + sa | Add | 0 | 0 | 1 |
| da = +/-(sx*sa) + sy | Add | 0 | 1 | 0 |
| da = +/-(sx*sy) - sa | Sub | 0 | 1 | 1 |
| da = +/-(sx*sa) - sy | Sub | 1 | 0 | 0 |
| da = min(+/-sx*sy,sa) | Min | 1 | 0 | 1 |
| da = min(+/-sx*sa,sy) | Min | 1 | 1 | 0 |
| da = max(+/-sx*sy,sa) | Max | 1 | 1 | 1 |

| Rnd |
|---|
| LI |
| LI |
| LI |
| LI |
| Gx |
| Gx |
| Gx |

Fig. 6C

| 39 | 38 | 37 | 36 | 35 | 34 | 33 | 32 | 31 | 30 | 29 | 28 | 27 | 26 | 25 | 24 | 23 | 22 | 21 | 20 |
|---|---|---|---|---|---|---|---|---|---|---|---|---|---|---|---|---|---|---|---|
| 1 | 0 | 0 | PS | S* | SX | | | | | SY | | | | V/S SA DA | | | | | |

| V/S SA DA | | | |
|---|---|---|---|
| 0 | 0 | 0 | Add |
| 1 | 0 | 0 | Sub |
| 1 | 1 | 0 | Min |

$da = +/-(mx*sa) + my$ $da = +/-(mx*sa) - my$ $da = min(+/-mx*sa, my)$

Fig. 6D

20-bit ISA

| 39 | 19 | | |
|---|---|---|---|
| 0 | 0 | 20-bit parallel | Control ‖ Control |
| 0 | 1 | 20-bit serial | Control # Control |
| 1 | 0 | 40-bit extended | DSP extensions/Shadow |
| 1 | 1 | 20-bit serial | DSP # DSP |

DSP Instructions

| | 39 | 38 | 37 | 36 | 35 | 35 | 33 | 32 | 31 | 30 | 29 | 28 | 27 | 26 | 25 | 24 | 23 | 22 | 21 | 20 | |
|---|---|---|---|---|---|---|---|---|---|---|---|---|---|---|---|---|---|---|---|---|---|
| Multiply | 1 | 0 | 0 | PS | | S* | | SX | | | | SY | | | V/S | SA | DA | Sub-op | | | |
| | da = sx*sy | | | | | | | | | | | | | | | | | 0 | 0 | 0 | Nop |
| | da = (sx*sy) + sa | | | | | | | | | | | | | | | | | 0 | 0 | 1 | Add |
| | da = (sx*sa)+ sy | | | | | | | | | | | | | | | | | 0 | 1 | 0 | Add |
| | da = (sx*sy) - sa | | | | | | | | | | | | | | | | | 0 | 1 | 1 | Sub |
| | da = (sx*sa) - sy | | | | | | | | | | | | | | | | | 1 | 0 | 0 | Sub |
| | da = min(sx*sy,sa) | | | | | | | | | | | | | | | | | 1 | 0 | 1 | Min |
| | da = min(sx*sa,sy) | | | | | | | | | | | | | | | | | 1 | 1 | 0 | Min |
| | da = min(sx*sy,sa) | | | | | | | | | | | | | | | | | 1 | 1 | 1 | Max |
| Add | 1 | 0 | 1 | PS | | +/- | | SX | | | | SY | | | V/S | SA | DA | Sub-op | | | |
| | da = sx+sy | | | | | | | | | | | | | | | | | 0 | 0 | 0 | Nop |
| | da = sx+sy+sa | | | | | | | | | | | | | | | | | 0 | 0 | 1 | Add |
| | da = sx+sy;sa=sx-sy; | | | | | | | | | | | | | | | | | 0 | 1 | 0 | AddSub |
| | da = (sx+ sy)*sa | | | | | | | | | | | | | | | | | 0 | 1 | 1 | Mul |
| | da = -(sx+sy)*sa | | | | | | | | | | | | | | | | | 1 | 0 | 0 | MulN |
| | da = min(sx+sy,sa) | | | | | | | | | | | | | | | | | 1 | 0 | 1 | Min |
| | da = max(sx+sy,sa) | | | | | | | | | | | | | | | | | 1 | 1 | 0 | Max |
| | da = ssum(sa) (sx,sy unused) | | | | | | | | | | | | | | | | | 1 | 1 | 1 | CombAdd |
| Extremum | 1 | 1 | 0 | PS | | X/N | | SX | | | | SY | | | V/S | SA | DA | Sub-op | | | |
| | da = ext(sx,sy) | | | | | | | | | | | | | | | | | 0 | 0 | 0 | Nop |
| | da = ext(sx,sy,sa) | | | | | | | | | | | | | | | | | 0 | 0 | 1 | Ext |
| | da = ext(sx,sa) *sy | | | | | | | | | | | | | | | | | 0 | 1 | 0 | Mul |
| | da = -ext(sx,sa) *sy | | | | | | | | | | | | | | | | | 0 | 1 | 1 | MulN |
| | da = ext(sx,sa) + sy | | | | | | | | | | | | | | | | | 1 | 0 | 0 | Add |
| | da = ext(sx,sa) - sy | | | | | | | | | | | | | | | | | 1 | 0 | 1 | Sub |
| | ext(sa,da)?t = sx,tr = sy,lcs = lc | | | | | | | | | | | | | | | | | 1 | 1 | 0 | amax |
| type-match | 1 | 1 | 0 | PS | | 0 | | SX | | | | SY | | x | x | x | | 1 | 1 | 1 | |
| Permute | 1 | 1 | 0 | PS | | 1 | | SX | | | | Type | | x | | ereg | | 1 | 1 | 1 | Permute |
| Reserved | 1 | 1 | 1 | PS | | x | | SX | | | | SY | | | SA | DA | V/S | Sub-op | | | |

Fig. 6E(1)

Control and specifier Extensions

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

Mul: | 0 | Pred | PL | Sxt | Syt | Rnd | | S* | S* | S* | 0 | SA | DA | abs | 0 | 0 |  → Add/Sub min/max
with sub-fields: Lt / Gx Add: | 0 | Pred | PL | Sxt | Syt | Lt | Sub-ext | 0 | SA | DA | abs | 0 | 0 |  → Nop(uadd) Mul/MulN Min/Max
sub-fields: +/- +/- +/- x / x V/S Rnd Fp / tr-ctl Gx Fp Ext: | 0 | Pred | PL | Sxt | Syt | tr-ctl | Gx | Sub-ext | 0 | SA | DA | abs | 0 | 0 |  → Add/sub Mul
sub-fields: Lt Fp / Rnd V/S

| 0 | Pred | PL | Sxt | Pctl1 | 0 | ereg | Pctl | 0 | 0 |

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|
| 0 | Pred | PL | x | Type: SX | Type: SY | 0 | SA | DA | x | 0 | 1 |  Type override
| 0 | Pred | PL | Psx | Permute: SX | Permute: SY | 0 | SA | DA | Psy | 1 | 0 |  permute override
| 0 | Pred | I/R | I/R | prX | Offset: SX | Offset: SY | 0 | SA | DA | prY | 1 | 1 |  Offset override

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

| 0 | Op | PL | op | ereg | ereg | 1 | SA | DA | Sub-op |

Fig. 6E(2)

Control Instructions

| | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|
| add.sub | L | Pred | 0 | 0 | 0 | RX | | | | | RY | | | | RZ | | | | +/- | 0 | |
| max.min | L | Pred | 0 | 0 | 0 | RX | | | | | RY | | | | RZ | | | | X/N | 1 | |
| Shift | L | Pred | 0 | 0 | 1 | RX | | | | | UI4 | | | | RZ | | | | UI1 | R/L | <Bit1, Bits9-6> ==UI5 (Shift Amount) |
| Logic | L | Pred | 0 | 1 | 0 | RX | | | | | RY | | | | RZ | | | | &, | &l | |
| Mux | L | Pred | 0 | 1 | 1 | RX | | | | | RY | | | | RZ | | | | Pd | 0 | |
| mov | L | Pred | 0 | 1 | 1 | Rx | | | | DZ | | | | | Rxt | Dzt | 0 | 0 | 0 | 1 | |
| addi | L | Pred | 0 | 1 | 1 | SI4 | | | | DZ | | | | | x | x | 1 | 0 | 0 | 1 | |
| mov2erg | L | Pred | 0 | 1 | 1 | RX | | | | unit | | ereg | | | gd | type | | 1 | 0 | 1 | |
| Ldm | L | Pred | 0 | 1 | 1 | RX | | | | Dz1 | | | | | Dz2 | | | | 1 | 1 | |
| Set4bits | L | Pred | 1 | 0 | 0 | UI4:POS | | | | RZ | | | | | Rzt | UI4 | | | | 0 | |
| Set2bits | L | Pred | 1 | 0 | 0 | UI4:POS | | | | RZ | | | | | Rzt | UI2 | | 0 | 0 | 1 | |
| Setbit | L | Pred | 1 | 0 | 0 | UI4:POS | | | | RZ | | | | | Rzt | UI1 | UI1 | 1 | 0 | 0 | <Bit3, Bits13-10> ==UI5: POS |
| Movl | L | Pred | 1 | 0 | 0 | SI8 | | | | | | | | | RZ | | | | 1 | 1 | |
| Jmp | L | Pred | 1 | 0 | 1 | SI9 | | | | | | | | | | 0 | Pred | | 0 | 0 | |
| Call | L | Pred | 1 | 0 | 1 | SI9 | | | | | | | | | | 1 | Pred | | 0 | 0 | |
| Loop | L | Pred | 1 | 0 | 1 | UI5: Lcount | | | | | UI5: Lsize | | | | | | UI2:Lst | | 0 | 1 | |
| Jmpi | L | Pred | 1 | 0 | 1 | RX | | | | x | x | x | x | x | 0 | Pred | | 1 | 0 | |
| Calli | L | Pred | 1 | 0 | 1 | RX | | | | x | x | x | x | x | 1 | Pred | | 1 | 0 | |
| Loopi | L | Pred | 1 | 0 | 1 | RX | | | | x | | UI5: Lsize | | | | | UI2:Lst | | 1 | 1 | |
| Test | L | Pred | 1 | 1 | 0 | RX | | | | RY | | | | | PZ | | | =,<,> | 0 | |
| Testbit | L | Pred | 1 | 1 | 0 | RX | | | | UI5 | | | | | PZ | | | B | 0 | 1 | |
| Andp.orp | L | Pred | 1 | 1 | 0 | Pa | | Pb | | Pc | | | | PZ | | | &l | 1 | 1 | |
| Load | L | Pred | 1 | 1 | 1 | MX | | | | RZ | | | | | Ext | | | 0 | 0 | 0 | |
| Store | L | Pred | 1 | 1 | 1 | MZ | | | | RX | | | | | Ext | | | 1 | 0 | 0 | |
| eLoad | L | Pred | 1 | 1 | 1 | MX | | | | RZ | | | | | 1 | 1 | 1 | 0 | 0 | 0 | |
| eStore | L | Pred | 1 | 1 | 1 | MZ | | | | RX | | | | | 1 | 1 | 1 | 1 | 0 | 0 | |
| Extended | L | Pred | 1 | 1 | 1 | Bits 27:16 | | | | | | | | | | | | | 1 | 0 | |
| Logic2 | L | Pred | 1 | 1 | 1 | RX | | | | RY/RZ | | | | | Rxt | Ryt | &,l,&l,l | | 0 | 1 | |
| mov-erg | L | Pred | 1 | 1 | 1 | unit | | ereg | | RZ | | | | | gd | Sft | | 0 | 1 | 1 | |
| Crb | L | Pred | 1 | 1 | 1 | RX | | | | RZ | | | | | s/m | 0 | 0 | 1 | 1 | 1 | |
| Parity | L | Pred | 1 | 1 | 1 | RX | | | | PZ | | | | O/E | 0 | 1 | 0 | 1 | 1 | 1 | |
| Stm | L | Pred | 1 | 1 | 1 | MZ | | | | RX | | | | | 1 | 1 | 0 | 1 | 1 | 1 | |
| Abs | L | Pred | 1 | 1 | 1 | RX | | | | RZ | | | | | 0 | 0 | 1 | 1 | 1 | 1 | |
| Neg | L | Pred | 1 | 1 | 1 | RX | | | | RZ | | | | | 0 | 1 | 1 | 1 | 1 | 1 | |
| Div-step | L | Pred | 1 | 1 | 1 | RX | | | | RZ | | | | | 1 | 0 | 1 | 1 | 1 | 1 | |
| Test & Set | L | Pred | 1 | 1 | 1 | RX | | | | PZ | | | | 0 | 1 | 1 | 1 | 1 | 1 | 1 | |
| Return | L | Pred | 1 | 1 | 1 | Pred | | I-ctl | | 0 | 1 | 0 | 1 | 1 | 1 | 1 | 1 | 1 | 1 | 1 | |
| Zero-ac | L | Pred | 1 | 1 | 1 | ac# | | | | 1 | 1 | 0 | 1 | 1 | 1 | 1 | 1 | 1 | 1 | 1 | |
| eSync | L | Pred | 1 | 1 | 1 | RZ | | | | 0 | 1 | 1 | 1 | 1 | 1 | 1 | 1 | 1 | 1 | 1 | |
| Swi | L | Pred | 1 | 1 | 1 | UI3 | | | 0 | 1 | 1 | 1 | 1 | 1 | 1 | 1 | 1 | 1 | 1 | 1 | |
| Nop | L | Pred | 1 | 1 | 1 | UI3 | | | 1 | 1 | 1 | 1 | 1 | 1 | 1 | 1 | 1 | 1 | 1 | 1 | |

Fig. 6F

Extended Control

| | Bits 13:2 of upper half 39:20) | | | | | | | | | | | | |
|---|---|---|---|---|---|---|---|---|---|---|---|---|---|
| | 13 | 12 | 11 | 10 | 9 | 8 | 7 | 6 | 5 | 4 | 3 | 2 | 19 | 18 | 17 | 16 |
| Insert/EXTRACT | RX | | | | RZ | | | | 0 | 0 | 0 | 0 | 0 | x | x | 0 |
| Inserti | UI4: length | | | | RZ | | | | 0 | 0 | 0 | 1 | 0 | x | x | 0 |
| Shift | RX | | | | RZ | | | | 0 | 0 | 0 | 0 | 0 | rxh | rxl | 0 |
| Rotate | RX | | | | RZ | | | | 0 | 0 | 0 | 0 | 0 | x | x | 0 |
| jmp, call | u17 | | | | | | | J/C | 0 | 0 | 1 | 0 | 0 | Pred | | 0 |
| dloop | U14: outer LC | | | | U14: outer LC | | | | 0 | 0 | 1 | 1 | 0 | x | exit | 0 |
| dloopi | RX | | | | RY | | | | 0 | 0 | 1 | 1 | 0 | x | exit | 0 |
| mult | RX | | | | RY | | | | 0 | 1 | 0 | 0 | 0 | x | x | 0 |
| add/sub | RX | | | | RY | | | | 0 | 1 | 0 | 0 | 0 | x | x | 0 |
| logicp | PX | | | D | | PZ | | | 0 | 1 | 0 | 0 | 0 | x | x | 0 |
| Testi | RX | | | D | | PZ | | | 0 | 1 | 0 | 1 | 0 | =,>,< | | 0 |
| Movi | H/L | Fill | | | RZ | | | | 0 | 1 | 1 | 0 | 0 | x | x | 0 |
| loadi | Type | | | | RZ | | | | 0 | 1 | 1 | 1 | 0 | x | x | 0 |
| storei | Type | | | | RZ | | | | 0 | 1 | 1 | 1 | 0 | x | x | 0 |
| loadt | RX | | | | RZ | | | | 0 | 1 | 1 | 1 | 0 | x | x | 0 |
| storet | MZ | | | | RX | | | | 0 | 1 | 1 | 1 | 0 | x | x | 0 |
| Add/subi | RX | | | | RZ | | | | 1 | 0 | +/- | 0 | 0 | LI | s/u | 0 |
| mini.maxi | RX | | | | RZ | | | | 1 | 0 | X/N | 1 | 0 | x | x | 0 |
| andi, ori | RX | | | | RZ | | | | 1 | 1 | &I | H/L | 0 | x | x | 0 |

Fig. 6G(1)

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| Rxt | Rzt | I/E | R/I | R/I | Offset: UI5 | | | | | Length: UI5 | | | | | 0 | |
| | | | | | x | RY | | | | RV | | | | x | | |
| Rzt | UI5: Position | | | | | Imm10 | | | | | | | | | | |
| rzh | rzl | D | U/S | 1 | Shift: UI5 | | | | | A/L | Lt | R/L | 0 | Fill | 1 | Fill: Sign/Zero |
| | | | | | 0 | ryh | | RY | | | | | | | | |
| x | x | x | x | 1 | Shift: UI15 | | | | | 1 | 1 | R/L | 1 | x | 1 | |
| | | | | | 0 | ryh | | RY | | | | | | | | |
| x | UI15 | | | | | | | | | | | | | | | |
| UI1 | UI4: outer L size | | | | UI4: Inner L size | | | | U12: 0-Ls | UI4 ; Inner L start | | | | | 0 | BIT 15 is Continuation of Inner LC |
| x | UI4: outer L size | | | | UI4: Inner L size | | | | U12: 0-Ls | UI4 ; Inner L start | | | | | 1 | |
| 0 | rxh | rnd | ryh | +/- | =/+ | RZ | | | | I/f | rzh | rzl | s/u | s/u | 0 | |
| 0 | rxh | rx1 | ryh | ryl | +/- | RZ | | | | Lt | rzh | rzl | x | x | 1 | |
| 1 | T/F | T/F | T/F | &l | &l | PY | | | | PV | | | | x | 1 | andp, orp, andorp, orandp: pz = (px relop py) relop pv |
| Imm 16 | | | | | | | | | | | | | | | | |
| Imm 16 | | | | | | | | | | | | | | | | |
| 0 | 0 | Imm 14 | | | | | | | | | | | | | | |
| 0 | 1 | Imm 14 | | | | | | | | | | | | | | |
| 1 | Rzt | 0 | Type | | | S10 | | | | | | | | | | |
| 1 | Rzt | 1 | Type | | | S10 | | | | | | | | | | |
| Imm 16 | | | | | | | | | | | | | | | | |
| Imm 16 | | | | | | | | | | | | | | | | |
| Imm 16 | | | | | | | | | | | | | | | | |

Fig. 6G(2)

MAC:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Pred | | | | opcode | | | | | SX | | | | | | | | SY | | | | |
| 1-40-bit | | | | | | | | | | | | | | | | | | | | | | | | |
| 2-20 ser | | | | | | | | | | | | | | | | | | | | | | | | |
| 2-20 par | | | | | | | | | | | | | | | | | | | | | | | | |
| res. | | | | | | | | | | | | | | | | | | | | | | | | |

ARITH:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Pred | | | | opcode | | | | | SX | | | | | | | | SY | | | | |

0 0 NOP
0 1 Acc
1 0 Ext
1 1 Mac

EXT:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Pred | | | | opcode | | | | | SX | | | | | | | | SY | | | | |

0 0 NOP
0 1 Acc
1 0 Ext
1 1 Mac

LOGIC:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Pred | | | | opcode | | | | | SX | | | | | | | | SY | | | | |

Fig. 6H(1)

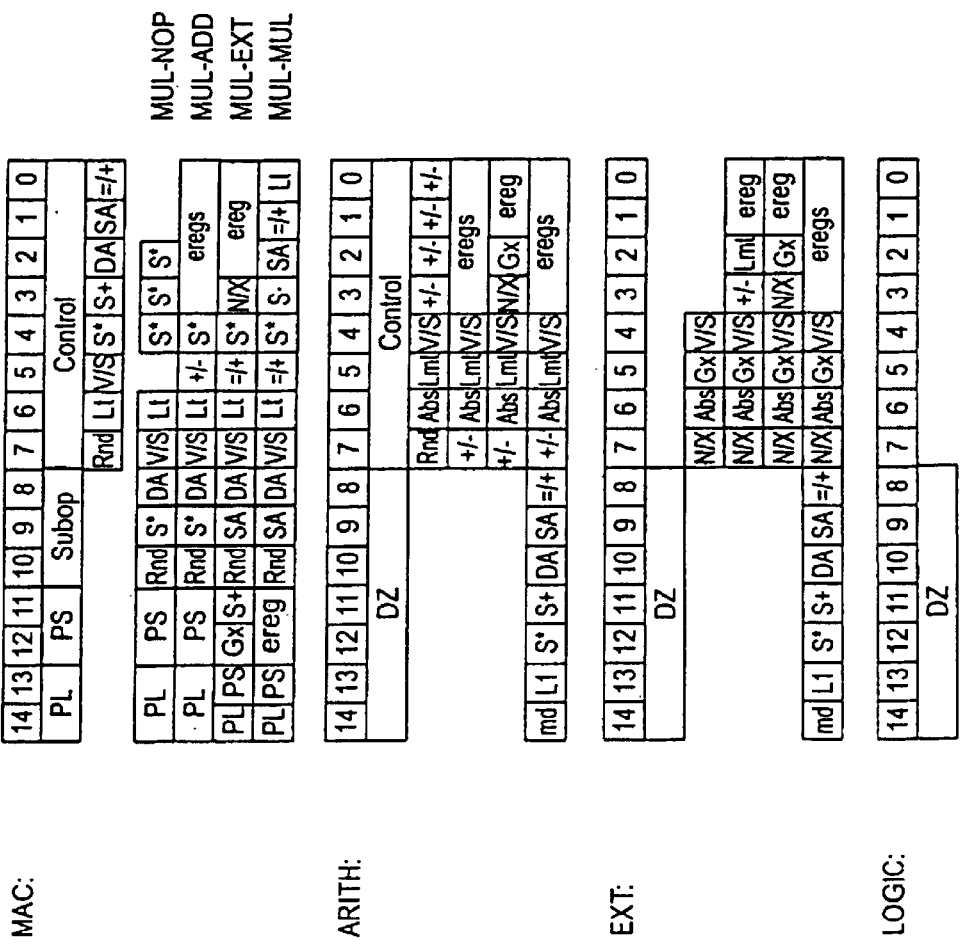
Fig. 6H(2)

SHIFT:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | Pred | | | opcode | | | | | | | SX | | | | | | DZ | | | | | |
| Group | | | Pred | | | opcode | | | | | | | SX | | | | | | DZ | | | | | |
| Group | | | Pred | Imm2 | | opcode | | | | | | DZ | | | | Imm14 | | | | | | | | |

Immediate:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | | DZ | | | | | | SX | | | | | | | | | | | | | | Imm32 |
| Group | op | | opcode | | | | | | | | | | | | | DZ | | | | | | | | |

Subop:
- MOV
- ADD
- SUB
- MIN
- MAX
- AND
- OR

Test:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | Pred | | | opcode | | | | | | | SX | | | | | | SY | | | | | |

Branch:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | Pred | | | opcode | | | | | | | | | | | | | | | | | | |

Misc:

SHIFT:

| 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| | | Amount | | | | PL | PS | Lt | Rot | Fill | A/L | 1 | 1 | Shift |
| | | Amount | | | | | | Position | | | I/E | 0 | 1 | Insert/extract |
| | | Length | | | | | | Position | | | | | 0 | Setbits |

Immediate:

| 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| | | | | | | | Imm16 | | | | | | | |

Test:

| 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| | | DPz | | | | Subop | | | | | | | | 0 |

Branch:

| 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| | | | | | | | Imm20 | | | | | | | 0 |

7-bit specifier: Parallel Store, Parallel Load in DSP Instructions

| 6 | 5 | 4 | 3 | 2 | 1 | 0 | |
|---|---|---|---|---|---|---|---|
| M/R | | | | | | | |
| 0 | 0 | 0 | SPR: s0-s15 | | | | |
| 0 | 0 | 1 | reserved | | | | |
| 0 | 1 | 0 | ac-names | | | | |
| 0 | 1 | 1 | gpr: r0-r15 | | | | |
| 1 | 0 | ptr: (r0) to (r15) | | | | off | Mem(ptr) ∥ ptr += ldr — Always postupdate |
| 1 | 1 | onset: U14 | | | | ptr | Mem(ptr + ldr)    ptr: p14, p15 — Always preupdate |

6-bit specifier: DSP Instructions

| 5 | 4 | 3 | 2 | 1 | 0 |
|---|---|---|---|---|---|
| M/R | | | | | |
| 0 | 0 | ac-names | | | |
| 0 | 1 | gpr: r0-r15 | | | |
| 1 | ptr: r(0) to r(15) | | | | off |

Always postupdate

5-bit specifier: RISC Instructions

| 4 | 3 | 2 | 1 | 0 |
|---|---|---|---|---|
| 0 | spr: s0-s15 | | | |
| 1 | gpr: r0-r15 | | | |

4-bit specifier:

| 3 | 2 | 1 | 0 |
|---|---|---|---|
| gpr: r0-r15 | | | |
| ptr: (r0-r7) | | | off |
| ereg | | | |

RISC Instructions
20-bit DSP Instructions
20-bit Shadow DSP Instructions

AR:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| type | | | | permute | | | | | | CB | Idx1:U13(0-7) | | | | | | | | xhr0: S15 (-16 to 15) | | | | | | | | | | | | |
| | | | | | | | | | | | | | | | | | | | | ptr | | | | | | | | | | | |

Fig. 6i(1)

ac-names:

| 3 | 2 | 1 | 0 | | |
|---|---|---|---|---|---|
| 0 | 0 | 0 | 0 | A0 | (use type, SIMD) |
| 0 | 0 | 0 | 1 | A1 | |
| 0 | 0 | 1 | 0 | T | |
| 0 | 0 | 1 | 1 | TR | |
| 0 | 1 | 0 | 0 | A00 | (unit 0) |
| 0 | 1 | 0 | 1 | AI0 | |
| 0 | 1 | 1 | 0 | T0 | |
| 0 | 1 | 1 | 1 | TR0 | |
| 1 | 0 | 0 | 0 | Sx1 | |
| 1 | 0 | 0 | 1 | Sx1s | |
| 1 | 0 | 1 | 0 | Sx2 | |
| 1 | 0 | 1 | 1 | Sx2s | |
| 1 | 1 | 0 | 0 | Sy1 | |
| 1 | 1 | 0 | 1 | Sy1s | |
| 1 | 1 | 1 | 0 | Sy2 | |
| 1 | 1 | 1 | 1 | Sy2s | |

SPR:

gpr-type
ereg-type
fu · ctl
pls- ctf
cb - ctl
loop - ctl
per
status ereg-names

| 3 | 2 | 1 | 0 | |
|---|---|---|---|---|
| 0 | 0 | 0 | 0 | A0 |
| 0 | 0 | 0 | 1 | A1 |
| 0 | 0 | 1 | 0 | T |
| 0 | 0 | 1 | 1 | TR |
| 0 | 1 | 0 | 0 | PP0 |
| 0 | 1 | 0 | 1 | Aout |
| 0 | 1 | 1 | 0 | PP1 |
| 0 | 1 | 1 | 1 | Dout |
| 1 | 0 | 0 | 0 | Sx1 |
| 1 | 0 | 0 | 1 | Sx1s |
| 1 | 0 | 1 | 0 | Sx2 |
| 1 | 0 | 1 | 1 | Sx2s |
| 1 | 1 | 0 | 0 | Sy1 |
| 1 | 1 | 0 | 1 | Sy1s |
| 1 | 1 | 1 | 0 | Sy2 |
| 1 | 1 | 1 | 1 | Sy2s |

Fig. 6i(2)

Exemplary Filter Coefficients
for Goertze Filter

| frequency | cos(2*pi*f1/fs) | frequency index |
|---|---|---|
| 350 | 31536 | 0 |
| 400 | 31163 | 1 |
| 425 | 30958 | 2 |
| 440 | 30829 | 3 |
| 480 | 30465 | 4 |
| 540 | 29863 | 5 |
| 600 | 29195 | 6 |
| 620 | 28958 | 7 |
| 660 | 28462 | 8 |
| 697 | 27978 | 9 |
| 700 | 27938 | 10 |
| 770 | 26955 | 11 |
| 780 | 26808 | 12 |
| 852 | 25700 | 13 |
| 900 | 24916 | 14 |
| 941 | 24218 | 15 |
| 1020 | 22802 | 16 |
| 1100 | 21280 | 17 |
| 1140 | 20487 | 18 |
| 1209 | 19072 | 19 |
| 1300 | 17120 | 20 |
| 1336 | 16324 | 21 |
| 1380 | 15332 | 22 |
| 1477 | 13084 | 23 |
| 1500 | 12539 | 24 |
| 1620 | 9634 | 25 |
| 1633 | 9314 | 26 |
| 1700 | 1649 | 27 |
| 1740 | 6644 | 28 |
| 1860 | 3595 | 29 |
| 1980 | 514 | 30 |
| 2040 | -1029 | 31 |
| 2100 | -2570 | 32 |
| 2280 | -7147 | 33 |
| 2400 | -10125 | 34 |
| 2600 | -14875 | 35 |
| 3825 | -32457 | 36 |

Fig. 11C

Exemplary Call Progress Tones

| Frequency1 | Frequency2 | Call Progress Tone |
|---|---|---|
| 350 | 440 | ANSI T1.401 dial tone |
| 425 | 0 | Q.35 Dial Tone |
| 440 | 480 | ANSI T1.401 audiable ringing |
| 480 | 620 | ANSI T1.401 line busy tone |
| 480 | 620 | ANSI T1.401 Recorder |
| 400 | 0 | Audiable ringing |
| 440 | 0 | Dial Tone |
| 440 | 0 | ANSI T1.401Fast Busy Tone |
| 440 | 0 | Busy Tone |

Fig. 11D

TONE DETECTION FOR INTEGRATED TELECOMMUNICATIONS PROCESSING

RELATED APPLICATION

This application claims the benefit of U.S. Provisional Patent Application No. 60/231,090 filed on Sep. 8, 2000

FIELD OF THE INVENTION

This invention relates generally to signal processors. More particularly, the invention relates to telephone signal processors and tone detection for integrated telecommunications processing.

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. However, when performing signal processing functions on data it is often desirable to perform other DSP operations in varying combinations.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fixed filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

One area where finite impulse response filters is applied is in echo cancellation for telephony processing. Echo cancellation is used to cancel echoes over full duplex telephone communication channels. The echo-cancellation process isolates and filters the unwanted signals caused by echoes from the main transmitted signal in a two-way transmission. Single or multiple DSP chips can be used to implement an echo canceller having finite impulse response filter to provide echo cancellation. However, echo cancellation is only one part of telecommunication processing. Typically, telephone processing functions are spread over multiple devices, components or boards in a telephone communication system.

Referring now to FIG. 8, a typical prior art telephone communication system is illustrated. A telephone, fax, or data modem couples to a local subscriber loop 802 at one end and another local subscriber loop 802' at an opposite end. Each of the local subscriber loops 802 and 802' couple to 2-wire/4-wire hybrid circuits 804 and 804'. Hybrid circuits 804 are composed of resistor networks, capacitors, and ferrite-core transformers. Hybrids circuits 804 convert 4-wire telephone trunk lines 806 (a pair in each direction) running between telephone exchanges of the PSTN 812 to each of the 2-wire local subscriber loops 802 and 802'. The hybrid circuits 804 is intended to direct all the energy from a talker on the 4-wire trunk 806 at a far-end to a listener on a 2-wire local subscriber loop 802 at a near end.

Echoes 810' are often formed when a speech signal from a far end talker leaves a far end hybrid 804' on a pair of the four wires 806', and arrives at the near end after traversing the PSTN 812, and may be heard by the listener at the near side. In traditional telephone networks, an echo canceller is placed at each end of the PSTN in order to reduce and attempt to eliminate this echo.

Referring now to FIG. 9, a typical prior art digital echo canceller 900 is illustrated. The prior art digital echo canceller 900 couples between the hybrid circuit 804 and the public switched telephone network (PSTN) 902 on the telephone trunk lines. The governing specification for digital echo cancellers is the ITU-T recommendation G.168, Digital network echo cancellers. The following terms from ITU-T document G.168 are used herein and are illustrated in FIG. 9. The end or side of the connection towards the local handset is referred to as the near end, near side or send side 910. The end or side of the connection towards the distant handset is referred to as the far end, far side or receive side 920. The part of the circuit from the near end 910 to the far end 920 is the send path 930. The part of the circuit from the far end to the near end is the receive path 935. The part of the circuit (i.e. copper wire, hybrid) in the local loop 802, between the end system subscriber or telephone system 108 and the central-office termination of the hybrid 804, is the end path. Speech signals entering the echo canceller 900 from the near end 910 are the send input $S_{in}$. Speech signals entering the echo canceller from the far end 920 are the received input $R_{in}$. Speech signals output from the echo canceller 900 to the far end 920 are the send output $S_{out}$. Speech signals exiting the echo canceller to the near end 910 are the received output $R_{out}$.

The typical prior art digital echo canceller 900 includes the basic components of an echo estimator 902, a digital subtractor 904, and a non-linear processor 906. Typically, the echo-cancellation process in the typical prior art digital echo canceller 900 begins by eliminating impedance mismatches. In order to do so, the typical digital echo canceller 900 taps the receive-side input signal ($R_{in}$). $R_{in}$ is processed to generate an estimate of Sin in the echo estimator (902). Sin serves as the reference signal for the echo cancellation process. Rin is also passed through to the near end 910 without change as the $R_{out}$ signal. The echo estimator 902 is a linear finite impulse response (FIR) convolution filter implemented in a DSP. The estimator 902 accepts successive samples of voice on Rin (typically a 16 bit sample every 125 microseconds). The voice samples are multiplied with a set of filter coefficients approximating the impulse response of circuitry in the endpath to generate an echo estimation. Over time, the set of filter coefficients are changed (i.e. adapted) until they accurately represent the desired impulse response to form an accurate echo estimation. The echo estimation is coupled into the subtractor 904. If the echo estimation is accurate, it is substantially equivalent to the actual echo on $S_{in}$ and the output from the subtractor 906 into the non-linear processor has linear echoes substantially removed. The non-linear processor 906 is used to remove non-linear echo sources.

With growing interest in providing telephony communication channels over packet networks such as the Internet or Asynchronous Transfer Mode (ATM), telephony processing has become more complicated.

BRIEF DESCRIPTIONS OF THE DRAWINGS

FIG. 3 is a block diagram of an instance of the core processors within the ASSP of the present invention.

FIG. 4 is a block diagram of the RISC processing unit within the core processors of FIG. 3.

FIG. 5A is a block diagram of an instance of the signal processing units within the core processors of FIG. 3.

FIG. 6A is an exemplary instruction sequence illustrating a program model for DSP algorithms employing the instruction set architecture of the present invention.

FIG. 6B is a chart illustrating the permutations of the dyadic DSP instructions.

FIG. 6C is an exemplary bitmap for a control extended dyadic DSP instruction.

FIG. 6D is an exemplary bitmap for a non-extended dyadic DSP instruction.

FIGS. 6E and 6F list the set of 20-bit instructions for the ISA of the present invention.

FIG. 6G lists the set of extended control instructions for the ISA of the present invention.

FIG. 6H lists the set of 40-bit DSP instructions for the ISA of the present invention.

FIG. 6I lists the set of addressing instructions for the ISA of the present invention.

Figure 7:
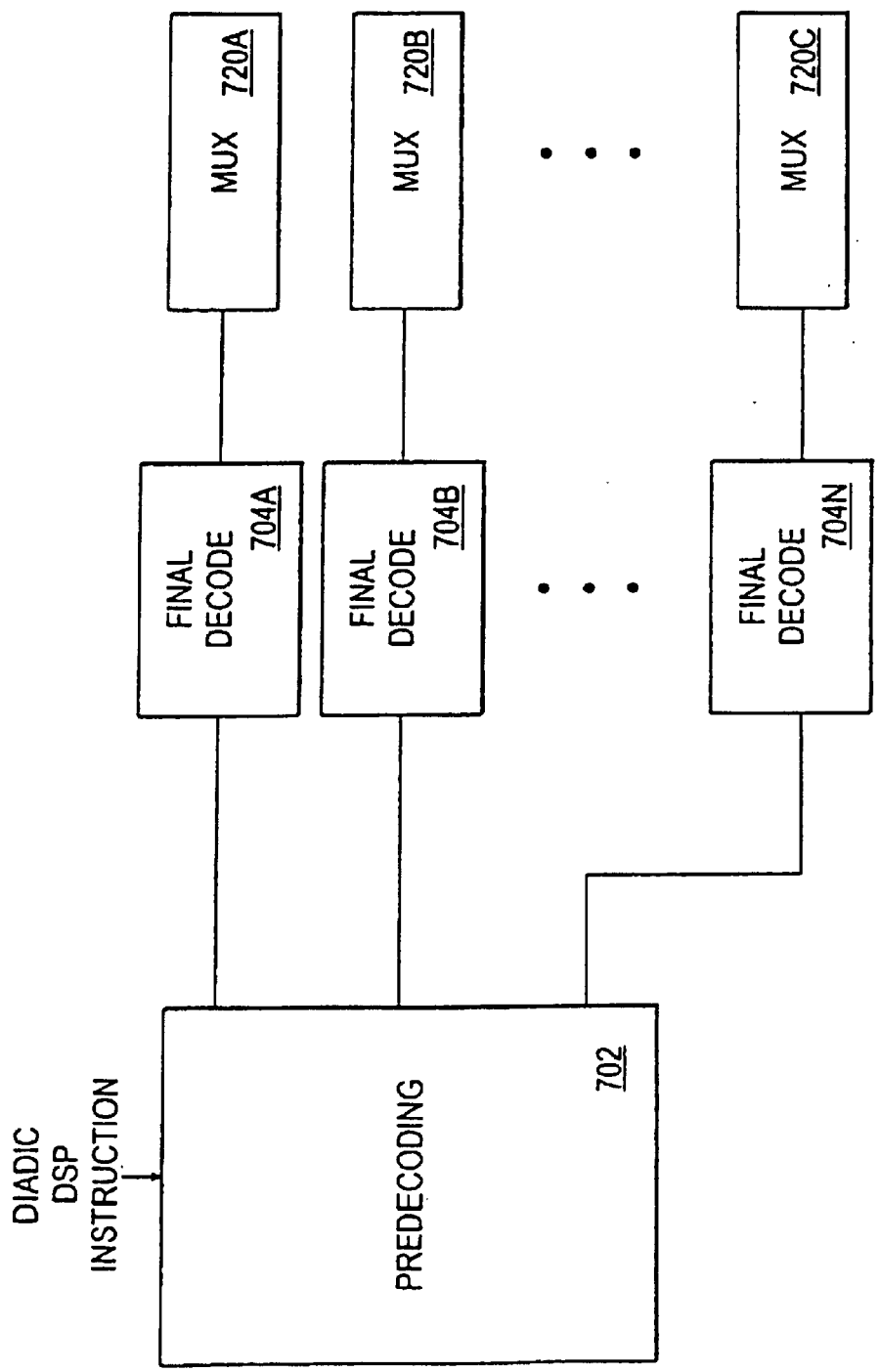

FIG. 7 is a block diagram illustrating the instruction decoding and configuration of the functional blocks of the signal processing units.

Figure 8:
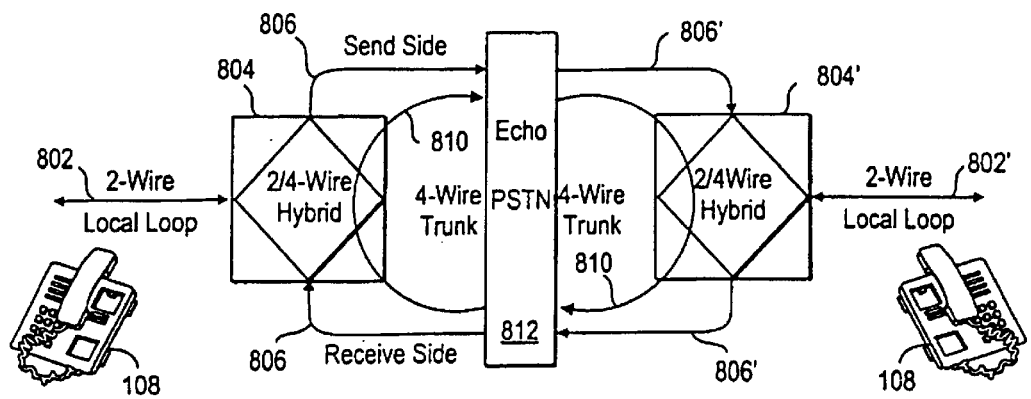

FIG. 8 is a prior art block diagram illustrating a PSTN telephone network and echoes therein.

Figure 9:
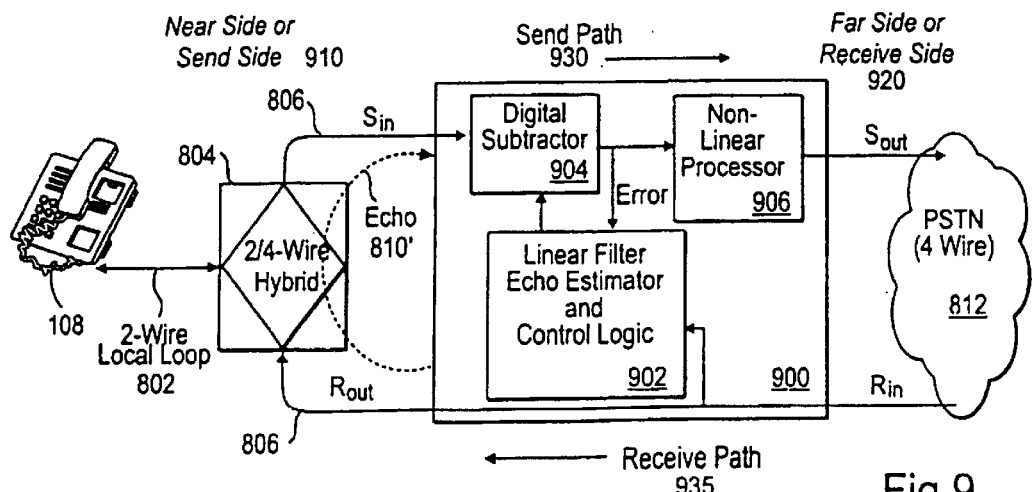

FIG. 9 is a prior art block diagram illustrating a typical prior art echo canceller for a PSTN telephone network.

Figure 10:
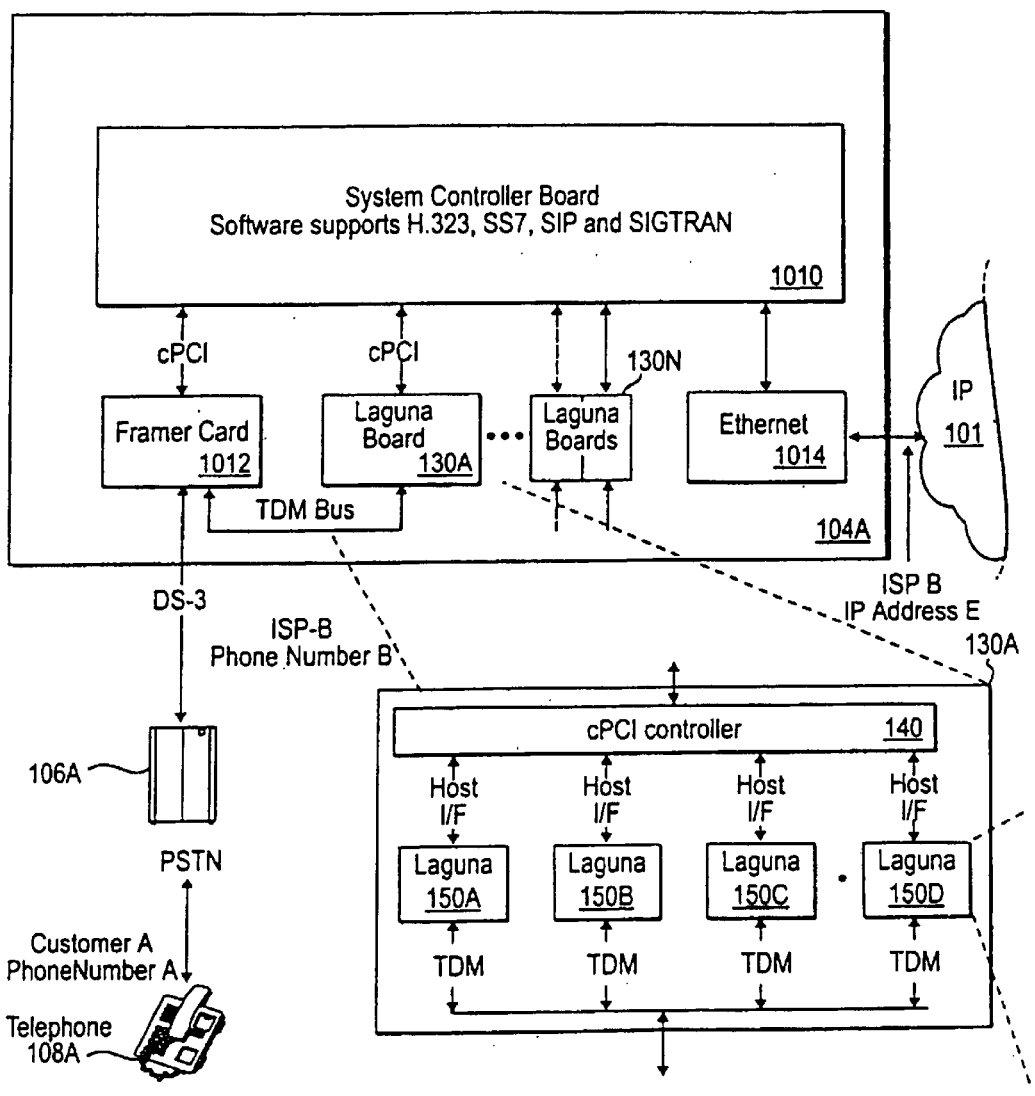
Figure 10:
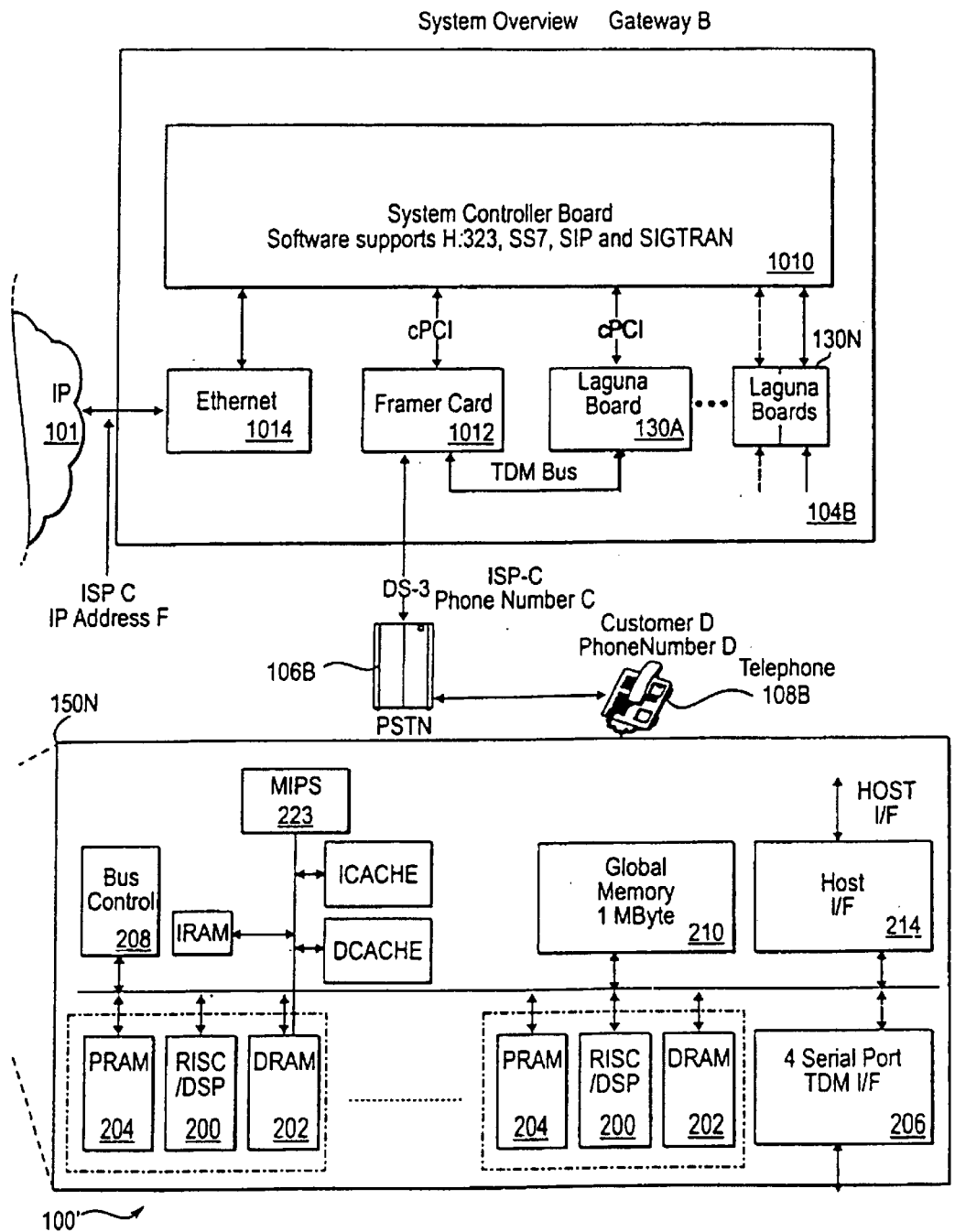

FIG. 10 is a block diagram of a packet network system incorporating the integrated telecommunications processor of the present invention.

Figure 11A:
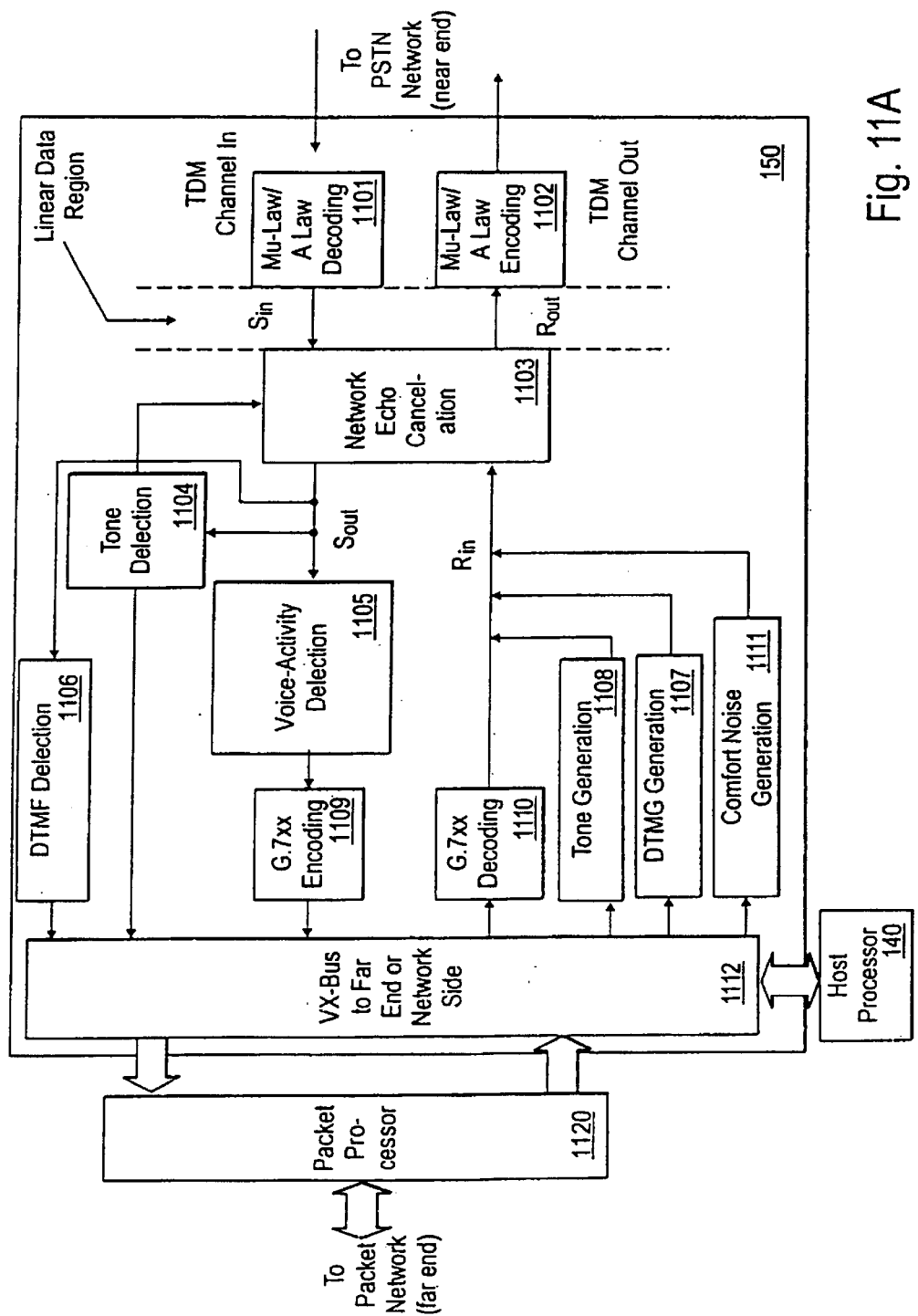

FIG. 11A is a block diagram of the firmware telecommunication processing modules of the integrated telecommunications processor for one of multiple full duplex channels.

Figure 11B:
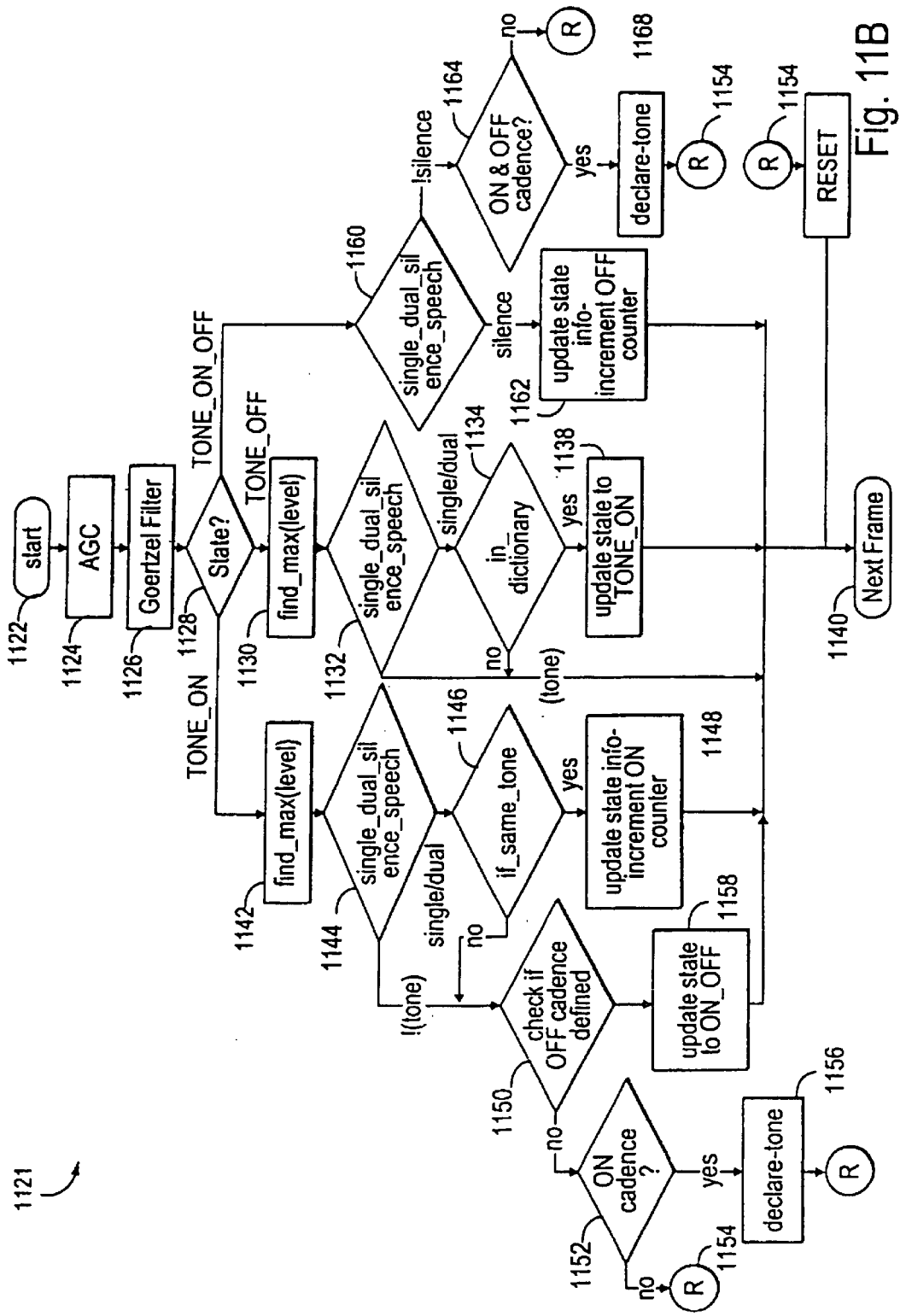

FIG. 11B illustrates a process for tone detection that can be implemented by a tone detection processor/module according to one embodiment of the invention.

FIG. 11C illustrates a table of common frequencies used in the telecommunications industry and associated exemplary coefficients for a Goertzel filter used in conjunction with the process of FIG. 11B according to one embodiment of the invention.

FIG. 11D illustrates a partial dictionary of exemplary call progress tones used in conjunction with the process of FIG. 11B according to one embodiment of the invention.

Figure 11E:
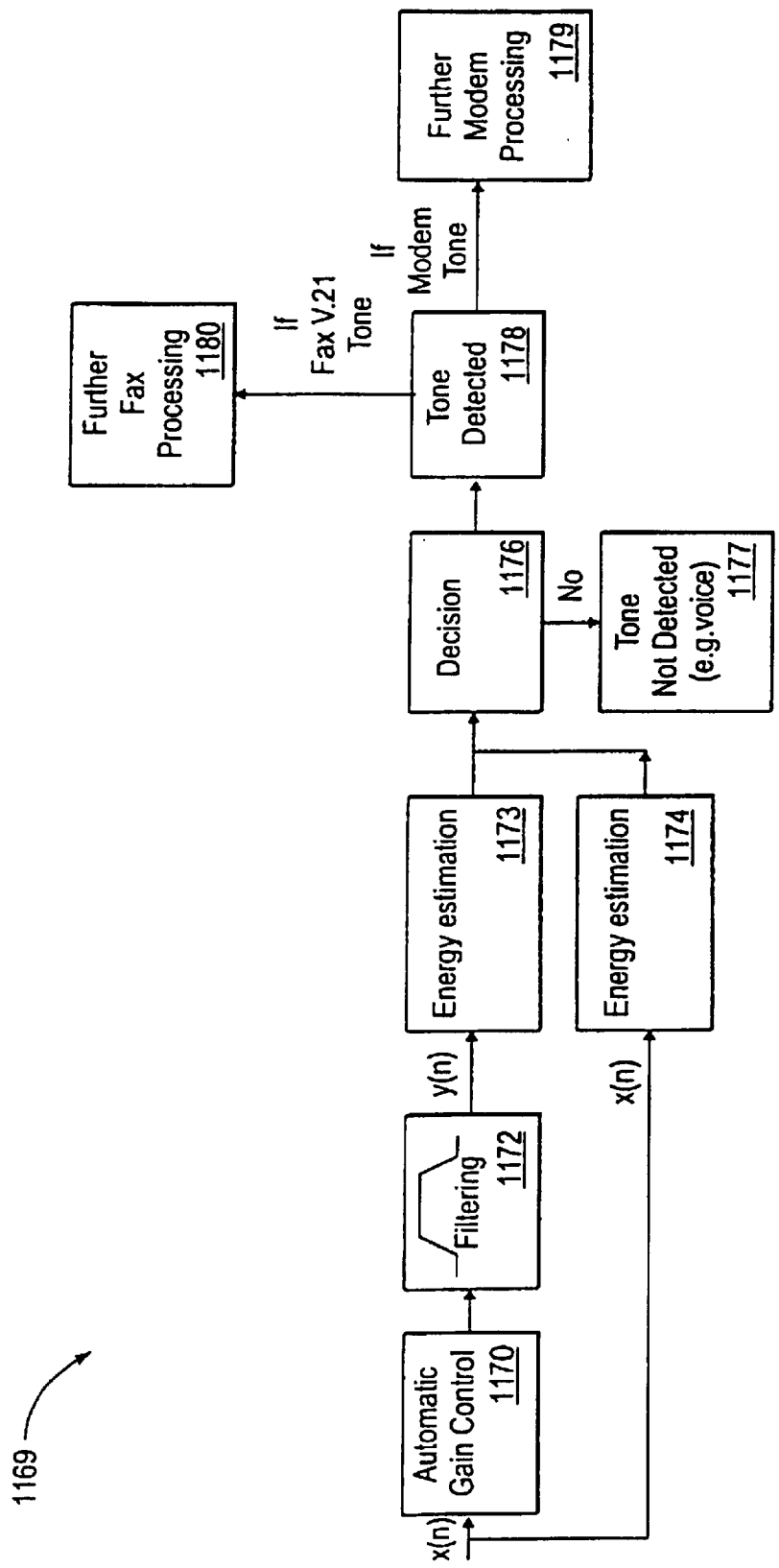

FIG. 11E illustrates another process for tone detection that can be implemented by a tone detection processor/module according to another embodiment of the invention.

Figure 11F:
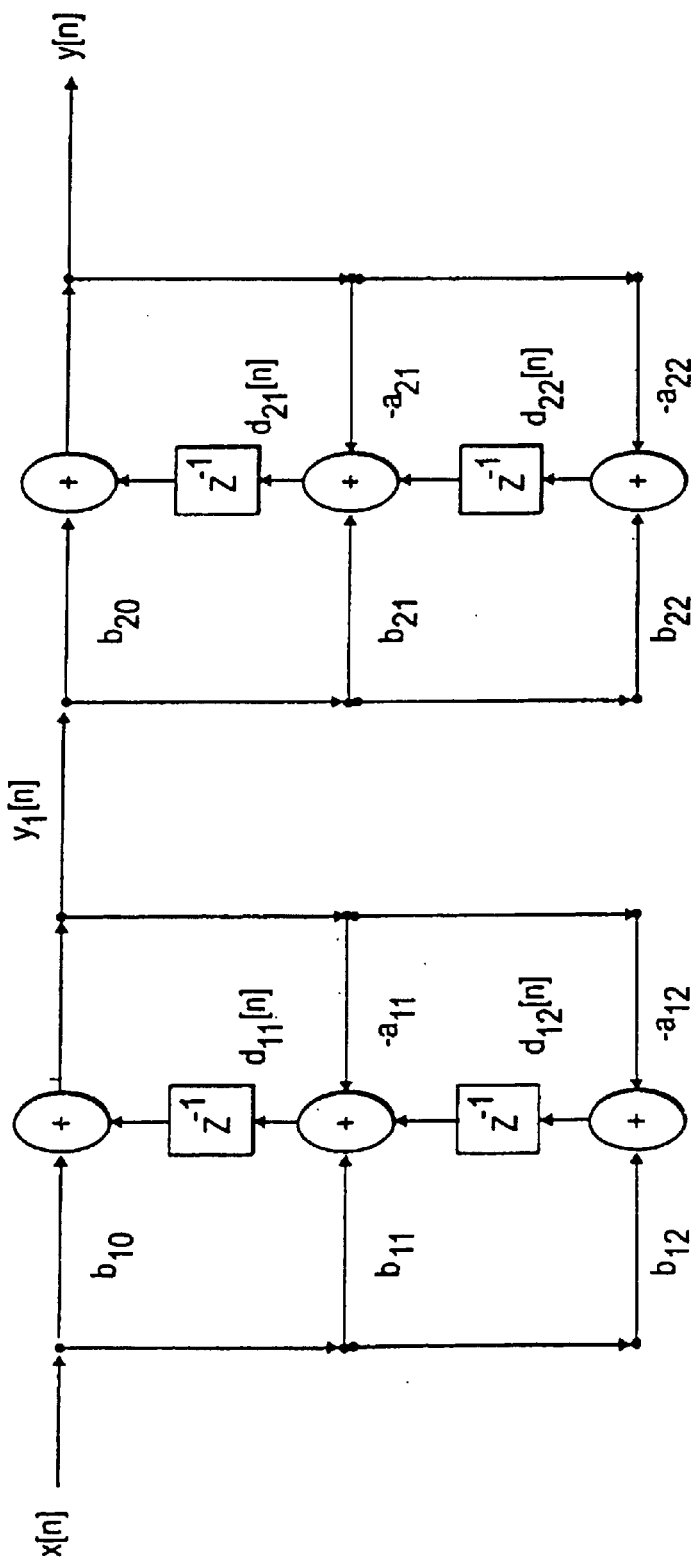

FIG. 11F illustrates an efficient DFII structure for implementing elliptic IIR filters used in conjunction with the process of FIG. 11E according to one embodiment of the invention.

Figure 11G:
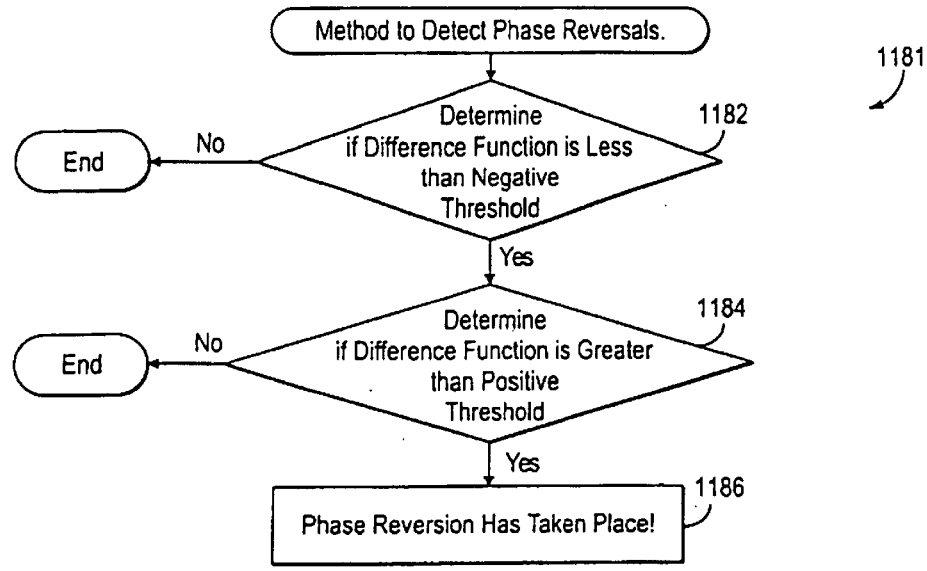
Figure 11G:
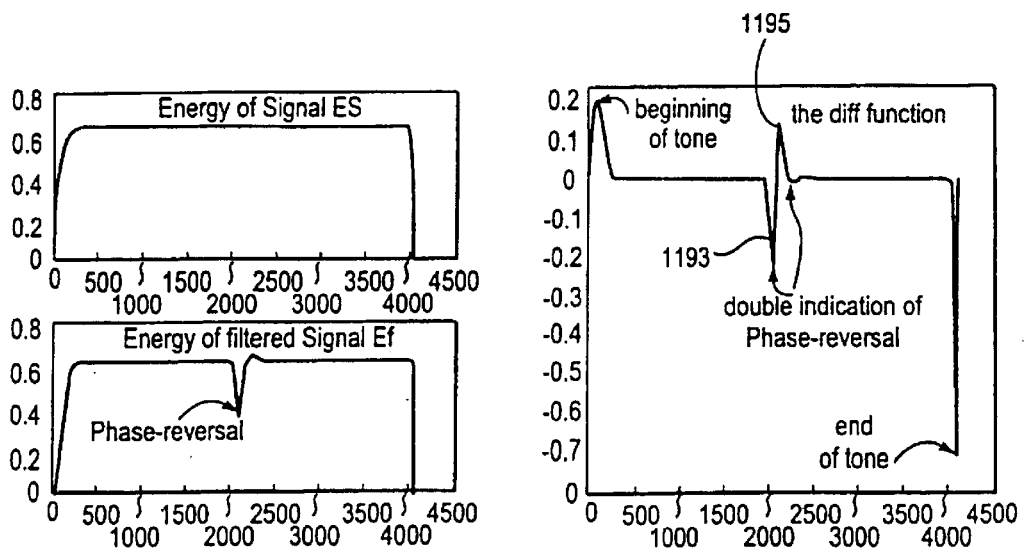

FIG. 11G illustrates a sub-process for phase reversal detection used in conjunction with the process of FIG. 11E according to one embodiment of the invention.

Figure 11H:
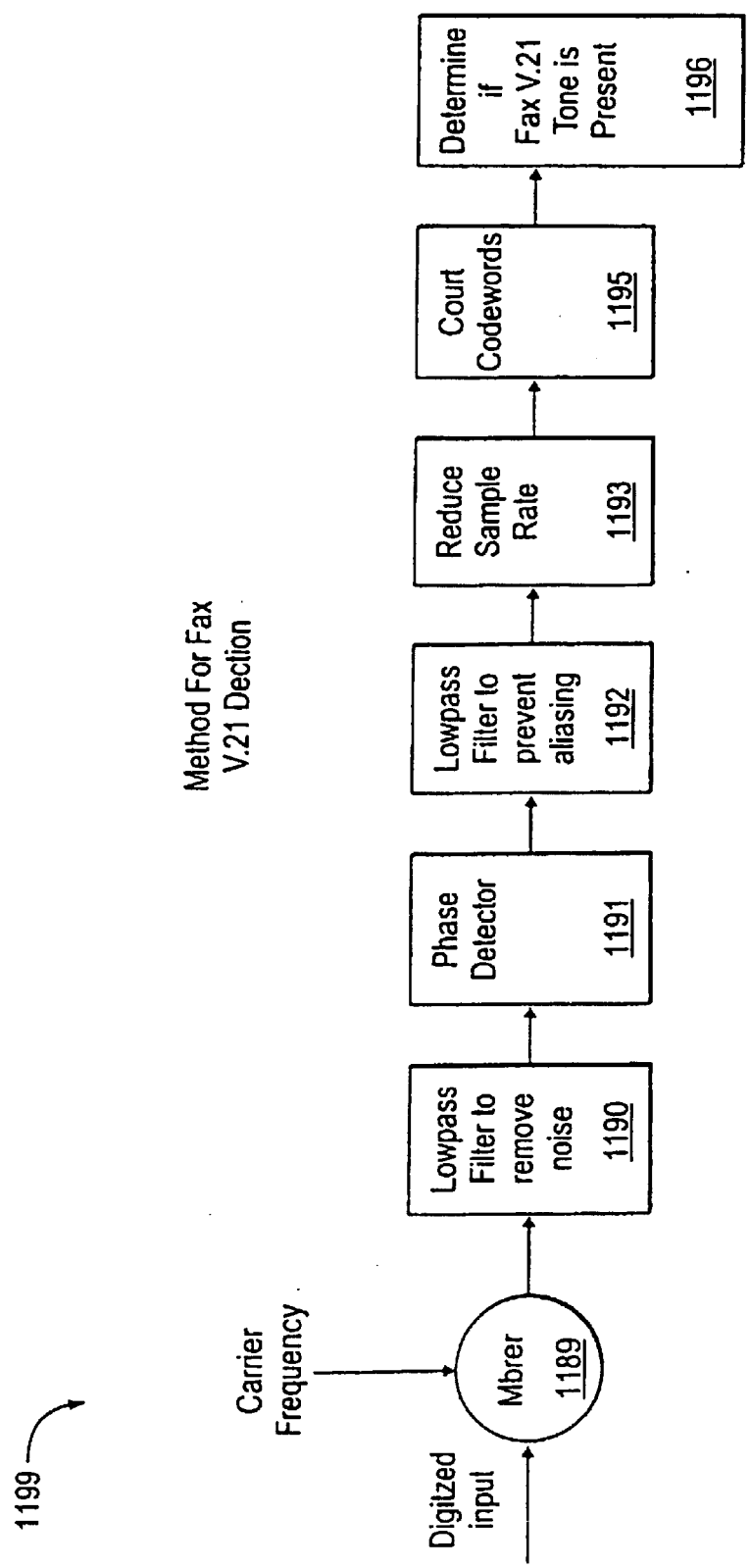

FIG. 11H illustrates a sub-process for FAX V.21 detection used in conjunction with the process of FIG. 11E according to one embodiment of the invention.

Figure 12:
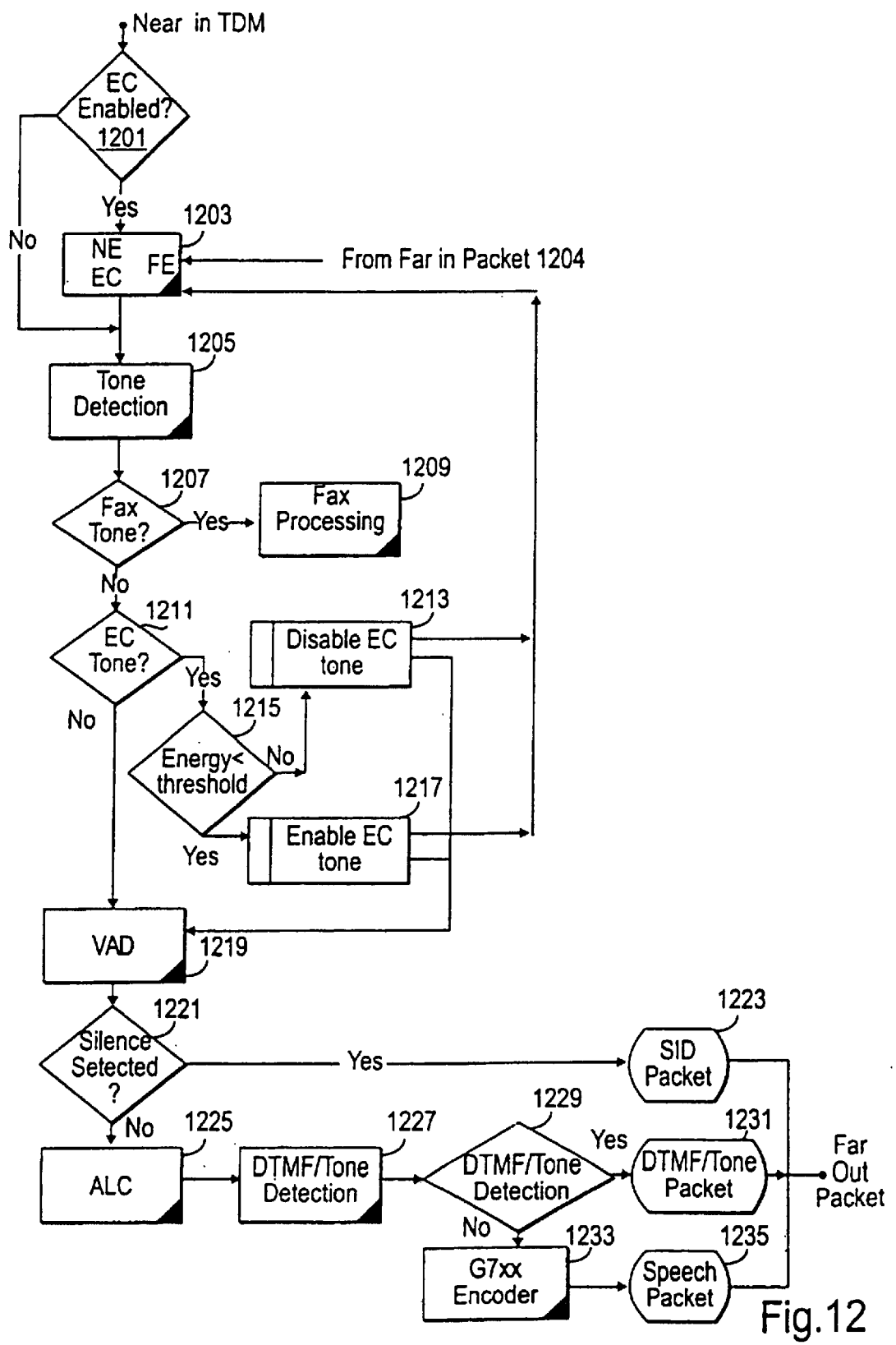

FIG. 12 is a flow chart of telecommunication processing from the near end to the packet network.

Figure 13:
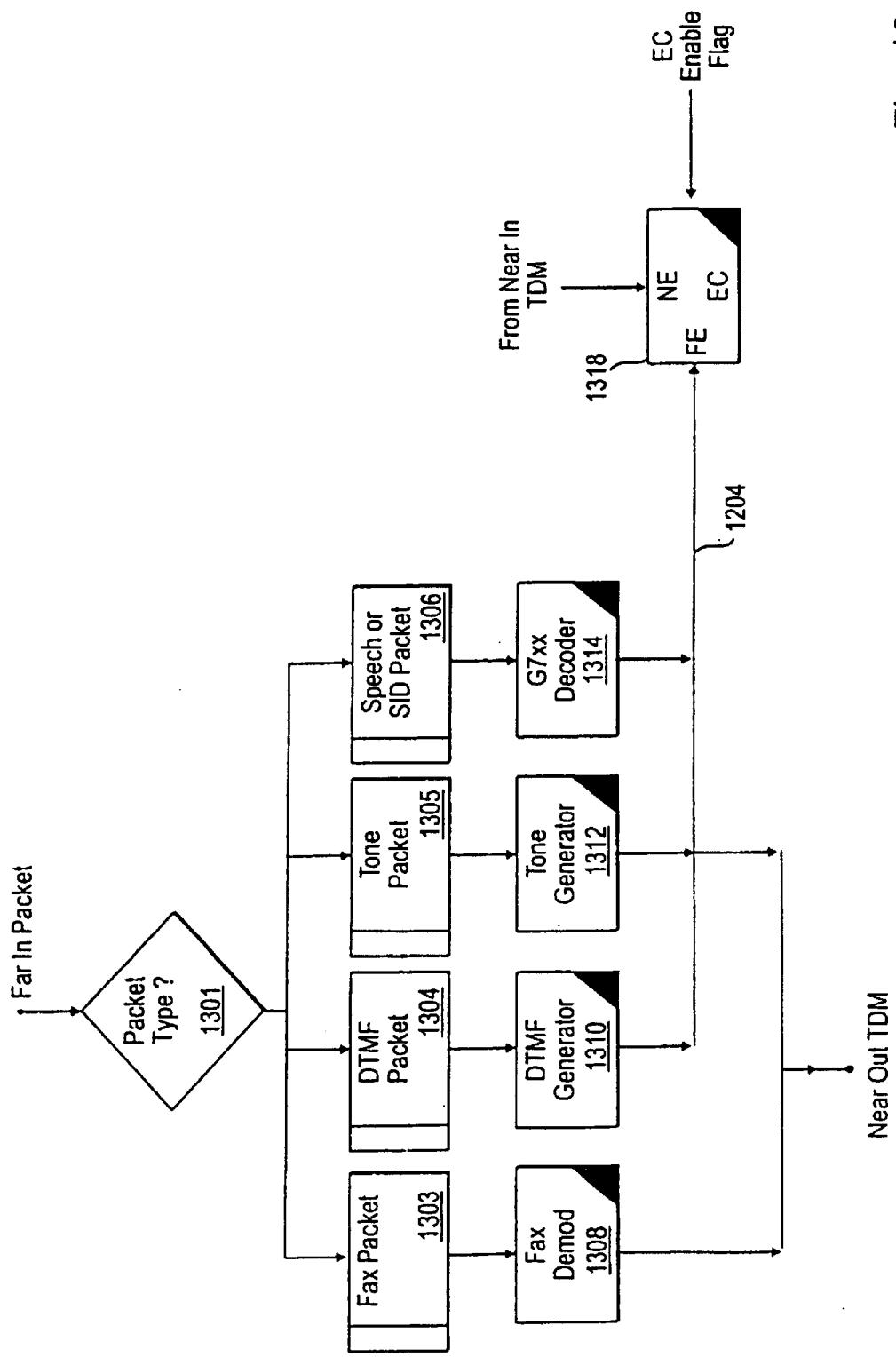

FIG. 13 is a flow chart of the telecommunication processing of a packet from the network into the integrated telecommunications processor into TDM signals at the near end.

Figure 14:
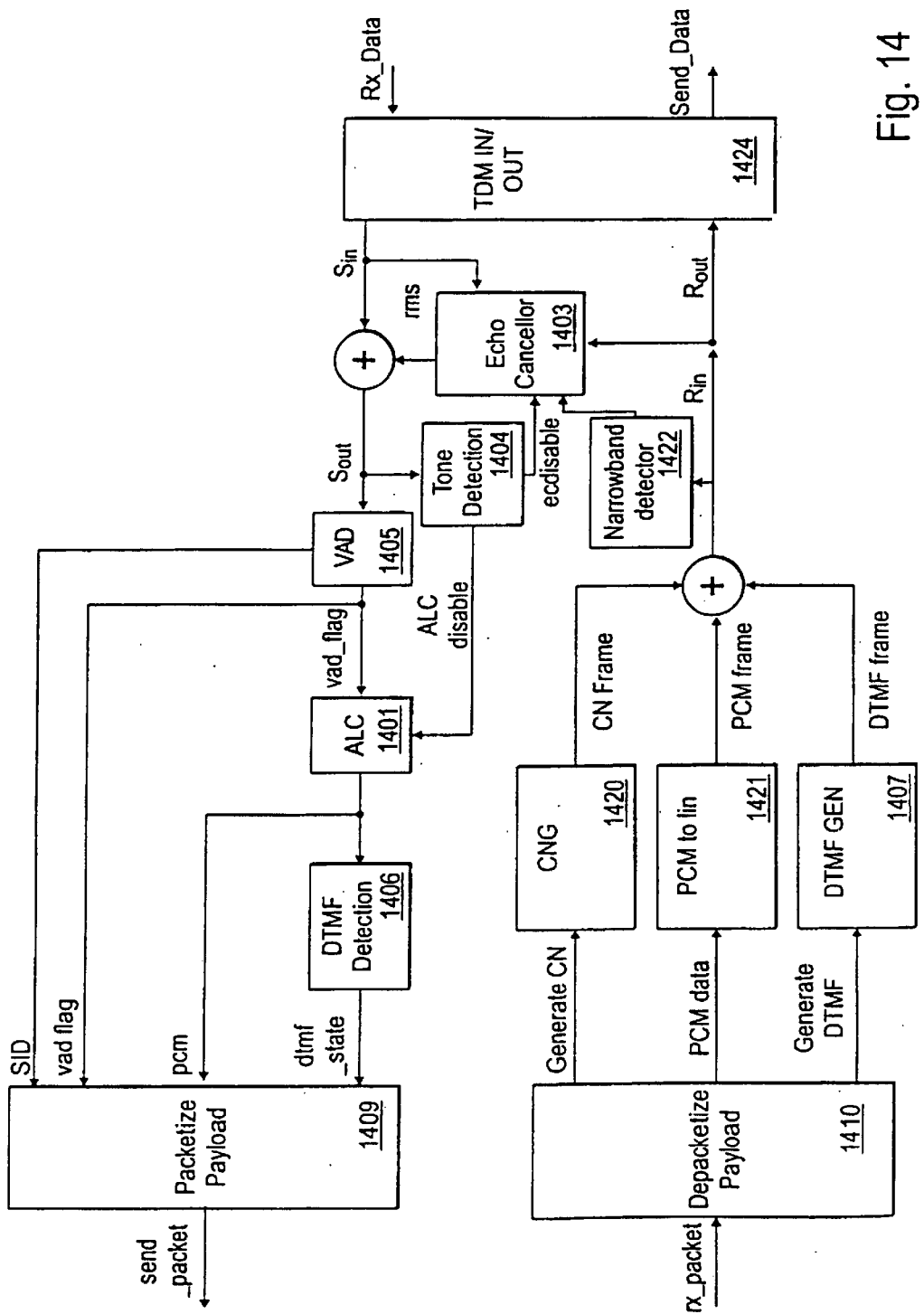

FIG. 14 is a block diagram of the data flows and interaction between exemplary functional blocks of the integrated telecommunications processor 150 for telephony processing.

Figure 15:
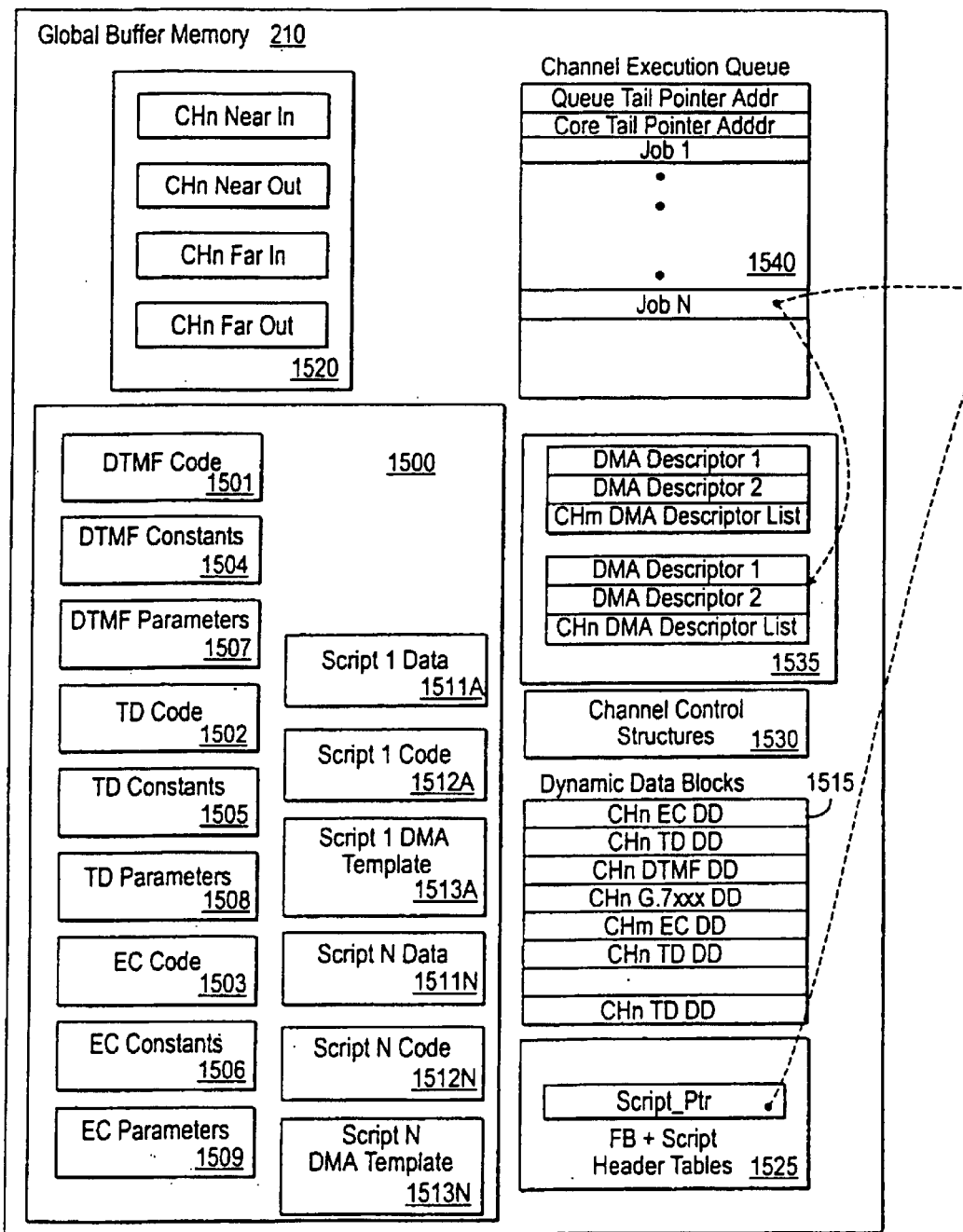
Figure 15:
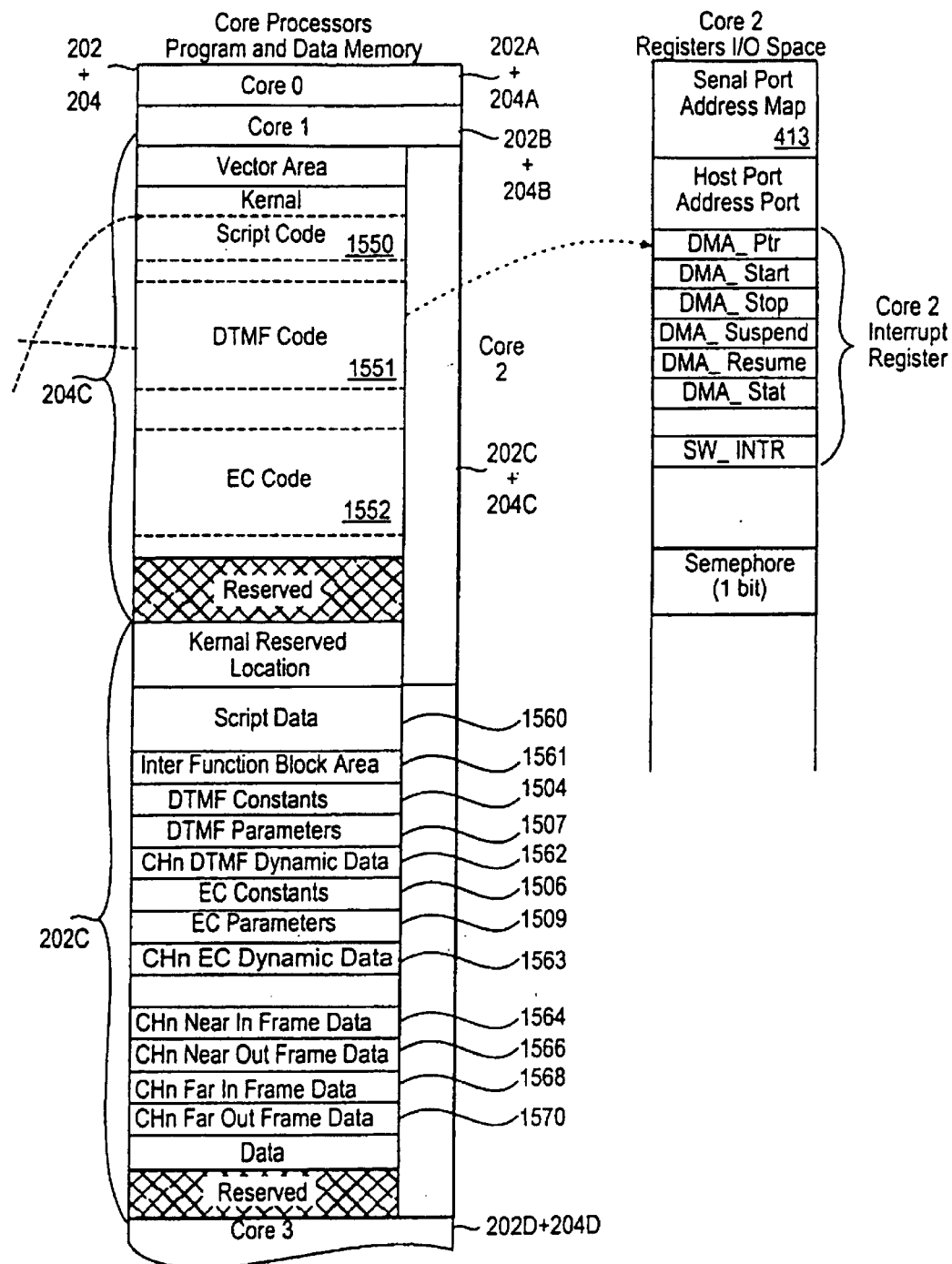

FIG. 15 is a block diagram of exemplary memory maps into the memories of the integrated telecommunications processor 150.

Figure 16:
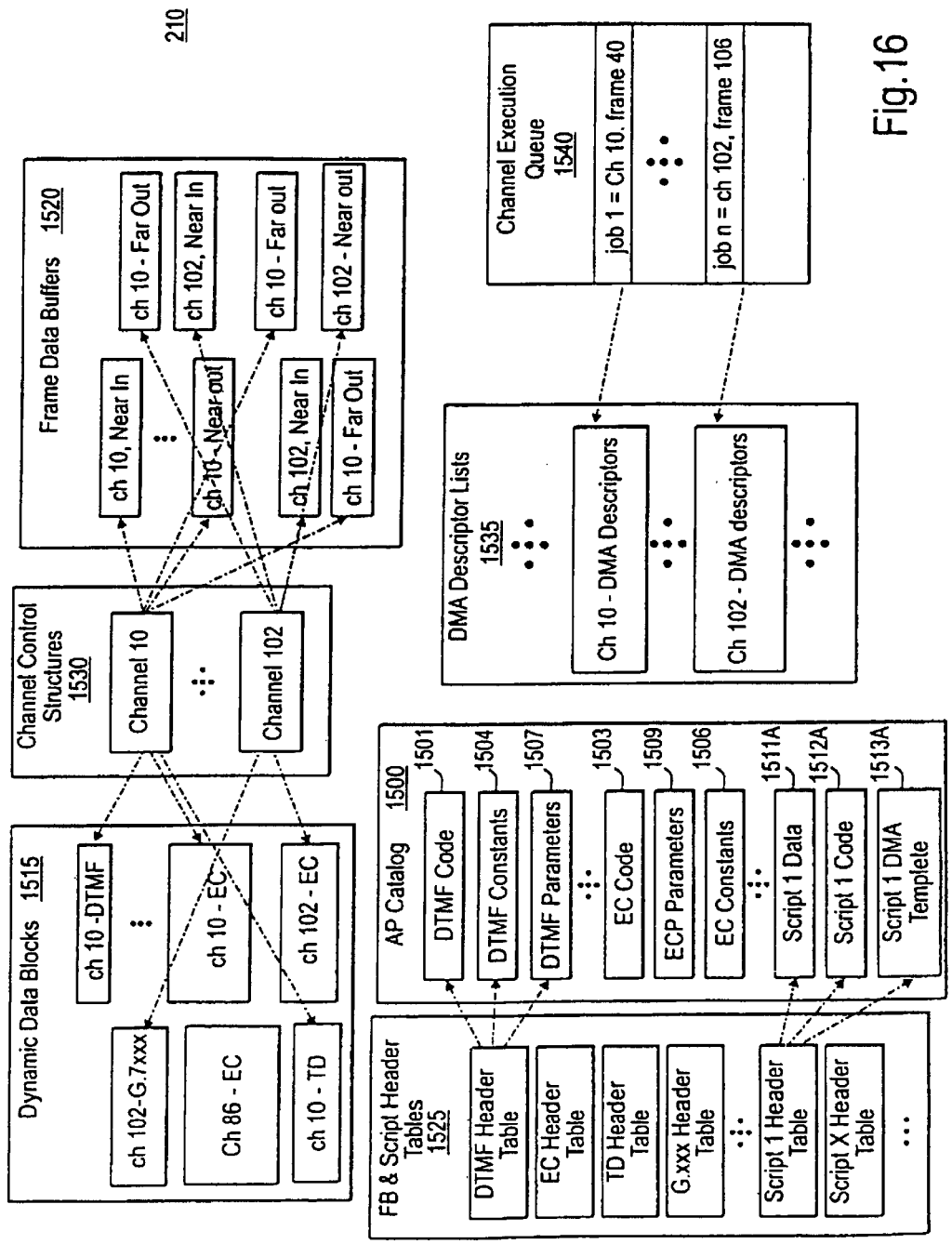

FIG. 16 is a block diagram of an exemplary memory map for the global buffer memory of the integrated telecommunications processor 150.

Figure 17:
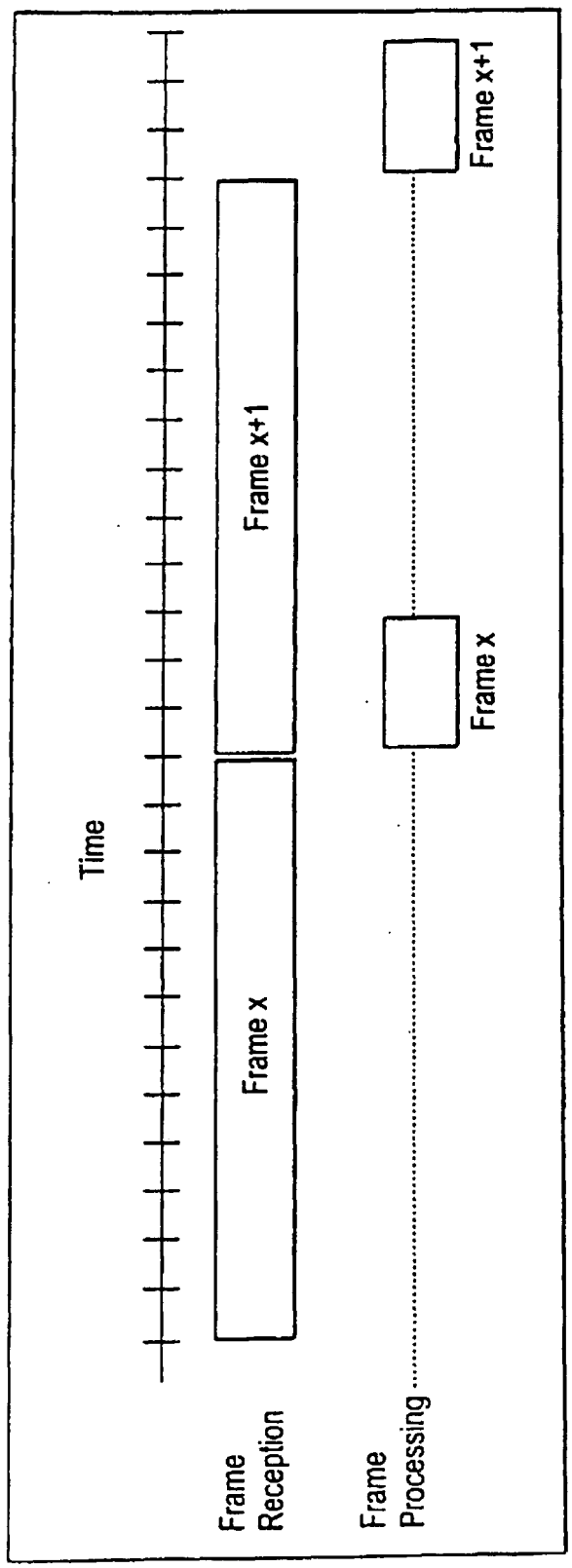

FIG. 17 is an exemplary time line diagram of reception and processing time for frames of data.

Figure 18:
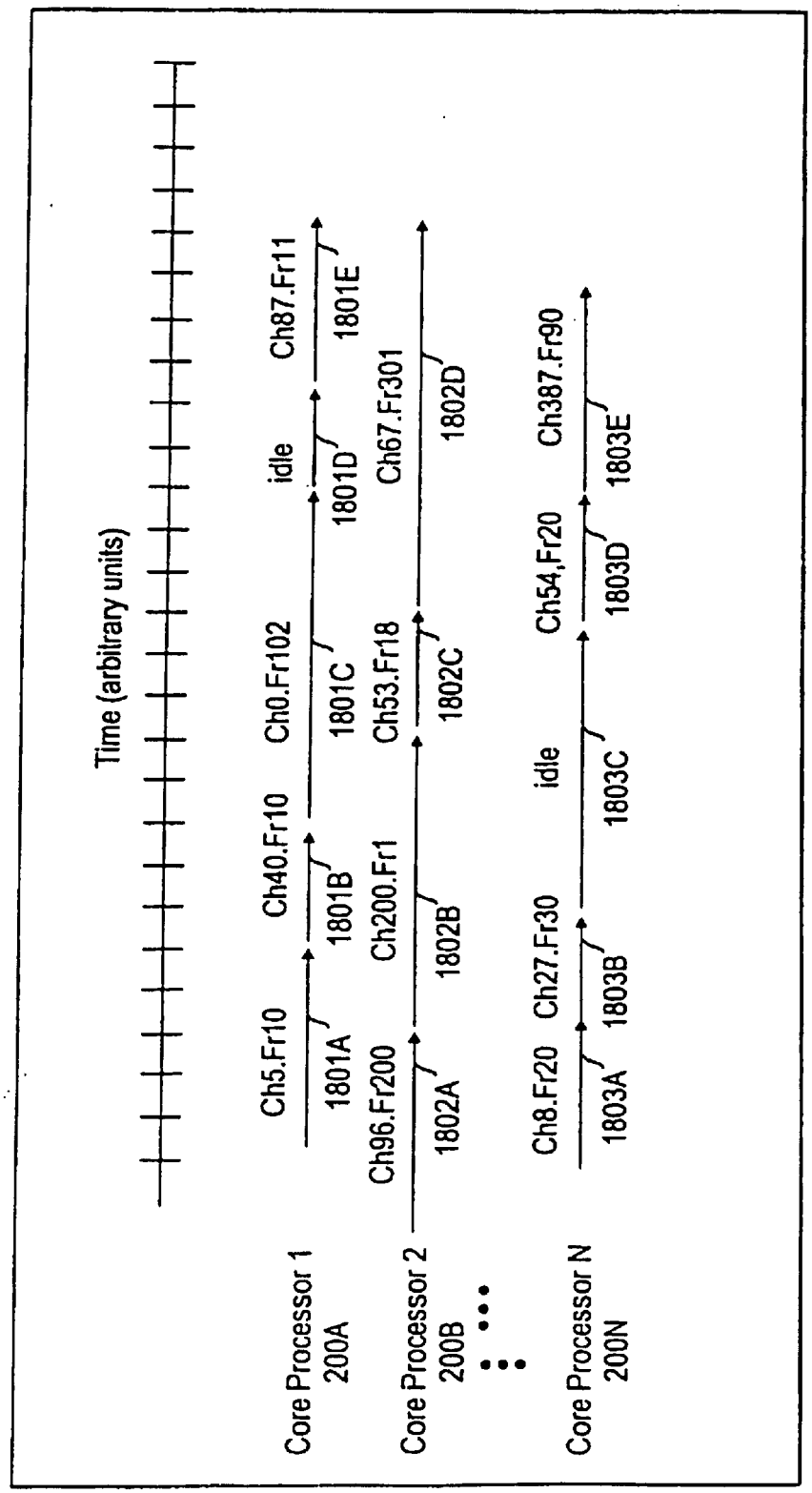

FIG. 18 is an exemplary time line diagram of how core processors of the integrated telecommunications processor 150 process frames of data for multiple communication channels.

Like reference numbers and designations in the drawings indicate like elements providing similar functionality. A letter or prime after a reference designator number represents an instance of an element having the reference designator number.

DETAILED DESCRIPTION OF THE PREFERRED EMBODIMENT

In the following detailed description of the present invention, numerous specific details are set forth in order to provide a thorough understanding of the present invention. However, it will be apparent to one skilled in the art that the present invention may be practiced without these specific details. In other instances well known methods, procedures, components, and circuits have not been described in detail so as not to unnecessarily obscure aspects of the present invention. Furthermore, the present invention will be described in particular embodiments but may be implemented in hardware, software, firmware or a combination thereof.

Multiple application specific signal processors (ASSPs) having the instruction set architecture of the present invention, including dyadic DSP instructions, are provided within gateways in communication systems to provide improved voice and data communication over a packetized network. Each ASSP includes a serial interface, a host interface, a buffer memory and four core processors in order to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over TP, ATM, Frame Relay, or other packetized network. The four signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units 300. The RISC ISA is a register based architecture including 16-registers within the register file 413, while the DSP ISA is a memory based architecture with efficient digital signal processing instructions. The instruction word for the ASSP is typically 20 bits but can be expanded to 40-bits to control two instructions to the executed in series or parallel, such as two RISC control instruction and extended DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor of the type where D=[(A op1 B) op2 C ] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor.

Moreover, embodiments of the present invention relate to an integrated tone detection processor for discriminating between tone and voice signals and determining the tones. The integrated tone detection processor includes a semiconductor integrated circuit having at least one signal processing unit to perform tone detection. Further, a processor readable storage means/machine-readable medium (e.g. a storage device, such as memory) stores signal processing instructions for execution by the at least one signal processing unit to perform the functions of the tone detection processor. The tone detection processor performs automatic gain control (AGC) to normalize the power of the tone or voice signal. Further, the energy of the tone or voice signals are determined at specific frequencies utilizing a Goertzel Filter process which implements a plurality of Goertzel filters. The tone detection processor determines whether or not a tone is present, and if a tone exists, determines the type of tone.

In one embodiment, the tone detection processor determines whether the tone is one of a dial tone, a busy tone, a fast busy tone, a ringing tone, or a fax tone. However, the tone detection processor can also determine many other types of tones. Also, the Goertzel filters can compute the energy levels of tone or voice signals at user-defined specific frequencies, for example at 16 user-defined frequencies. Based upon determining the two maximum energy levels of the Goertzel filtered tone, whether the tone is a single tone, dual tone, silence, or other (e.g. speech) can be discriminated. The tone can then be identified by a user-defined dictionary of tones. Based upon various ON and OFF cadence checks in combination with the use of TONE ON and TONE OFF counters, tones can be declared. Further, by utilizing four signal processors, simultaneously, according to an architecture of one embodiment of the present invention, very robust and efficient tone detection is provided.

Also, in other embodiments of the invention, other methods and structures for tone detection are provided, including the robust and efficient detection of FAX V.21 tones and modem tones.

Figure 1A:
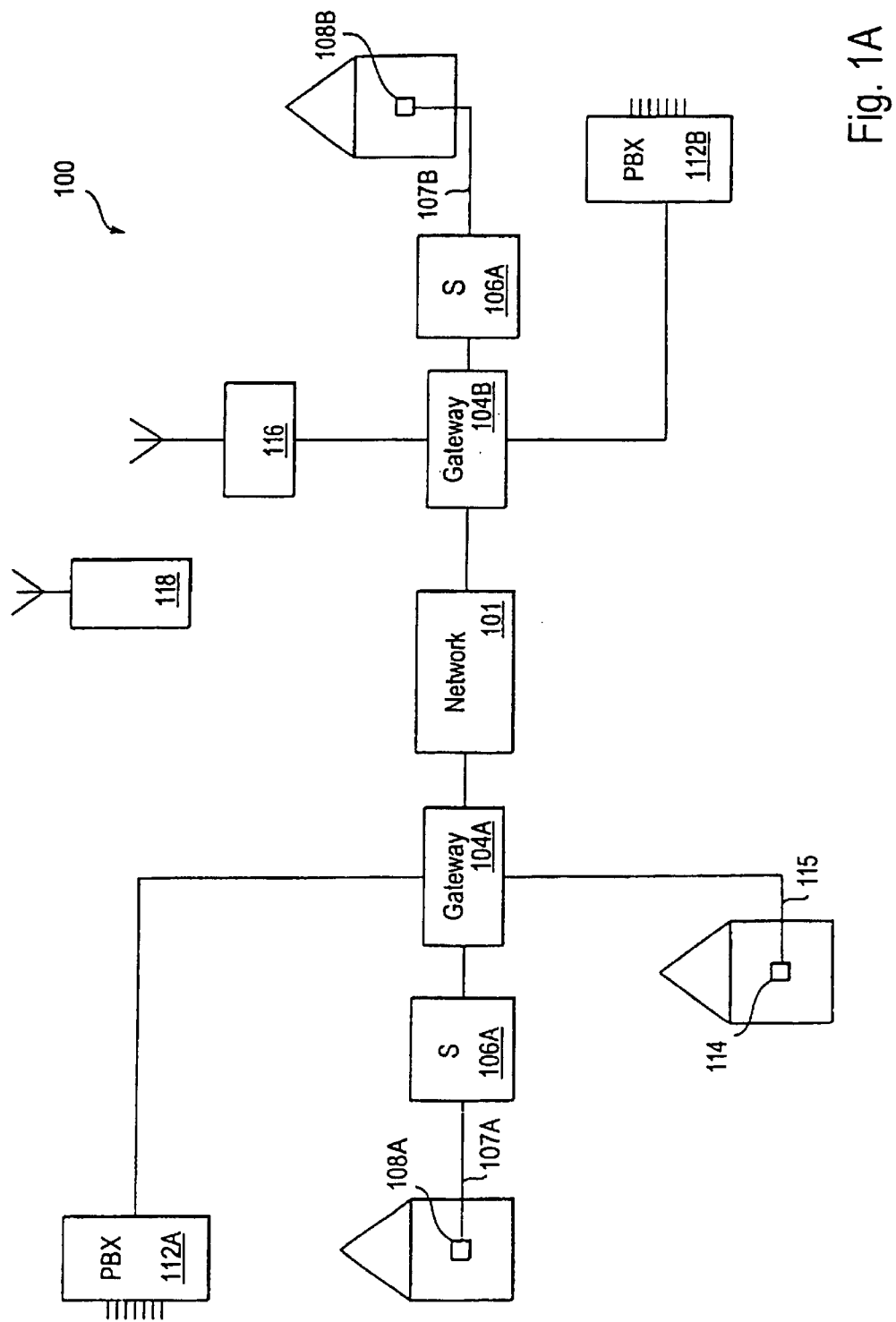
FIG. 1A is a block diagram of a system utilizing the present invention.

Referring now to FIG. 1A, a voice and data communication system 100 is illustrated. The system 100 includes a network 101 which is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A and 104B in order to packetize the information received for transmission across the network 101. A gateway is a device for connecting multiple networks and devices that use different protocols. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104B, respectively over the packet network 101. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DSO input to gateway 104B. At each of the gateways 104A and 104B, incoming signals are packetized for transmission across the network 101. Signals received by the gateways 104A and 104B from the network 101 are depacketized and transcoded for distribution to the appropriate destination.

Figure 1B:
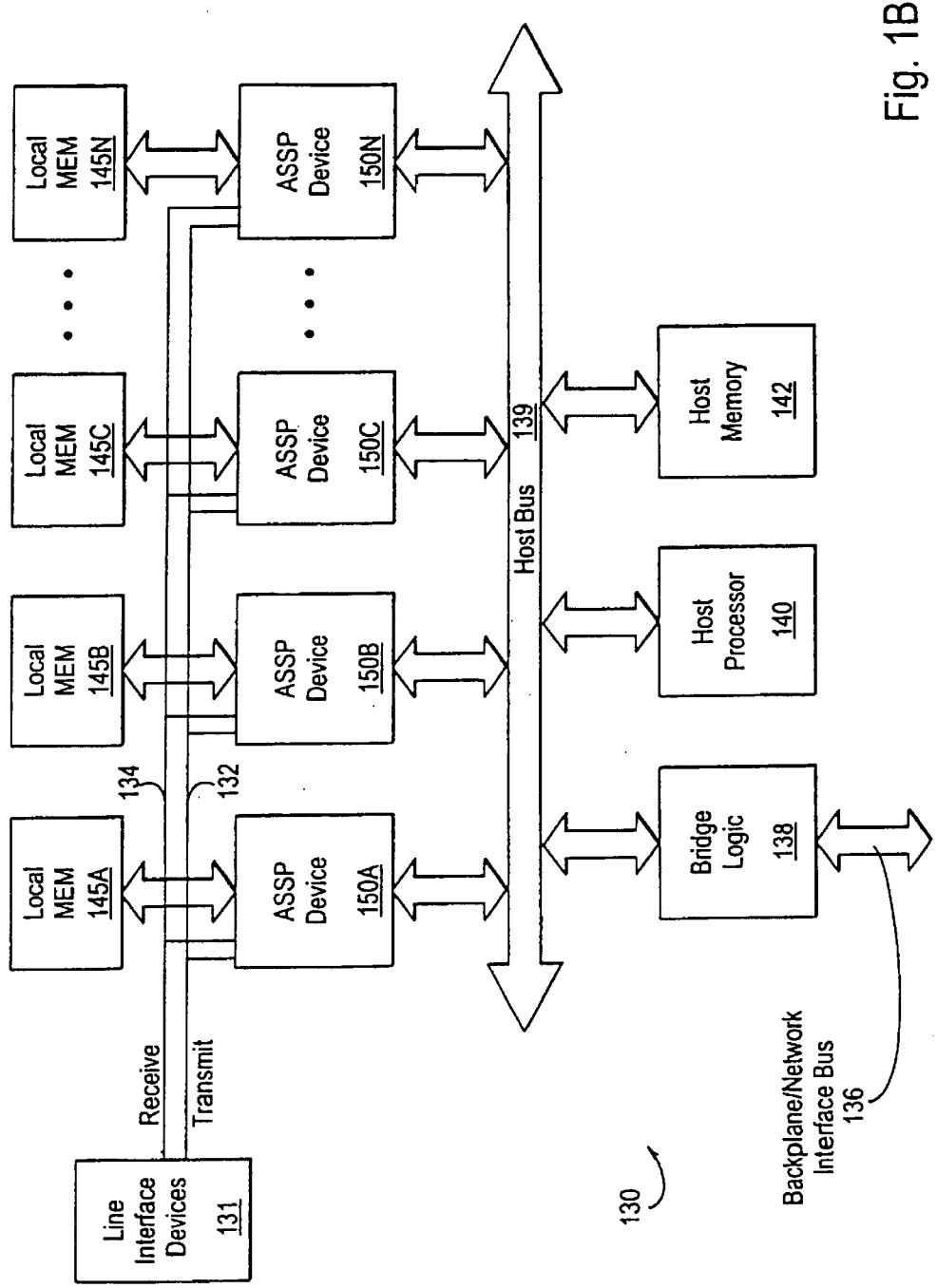
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
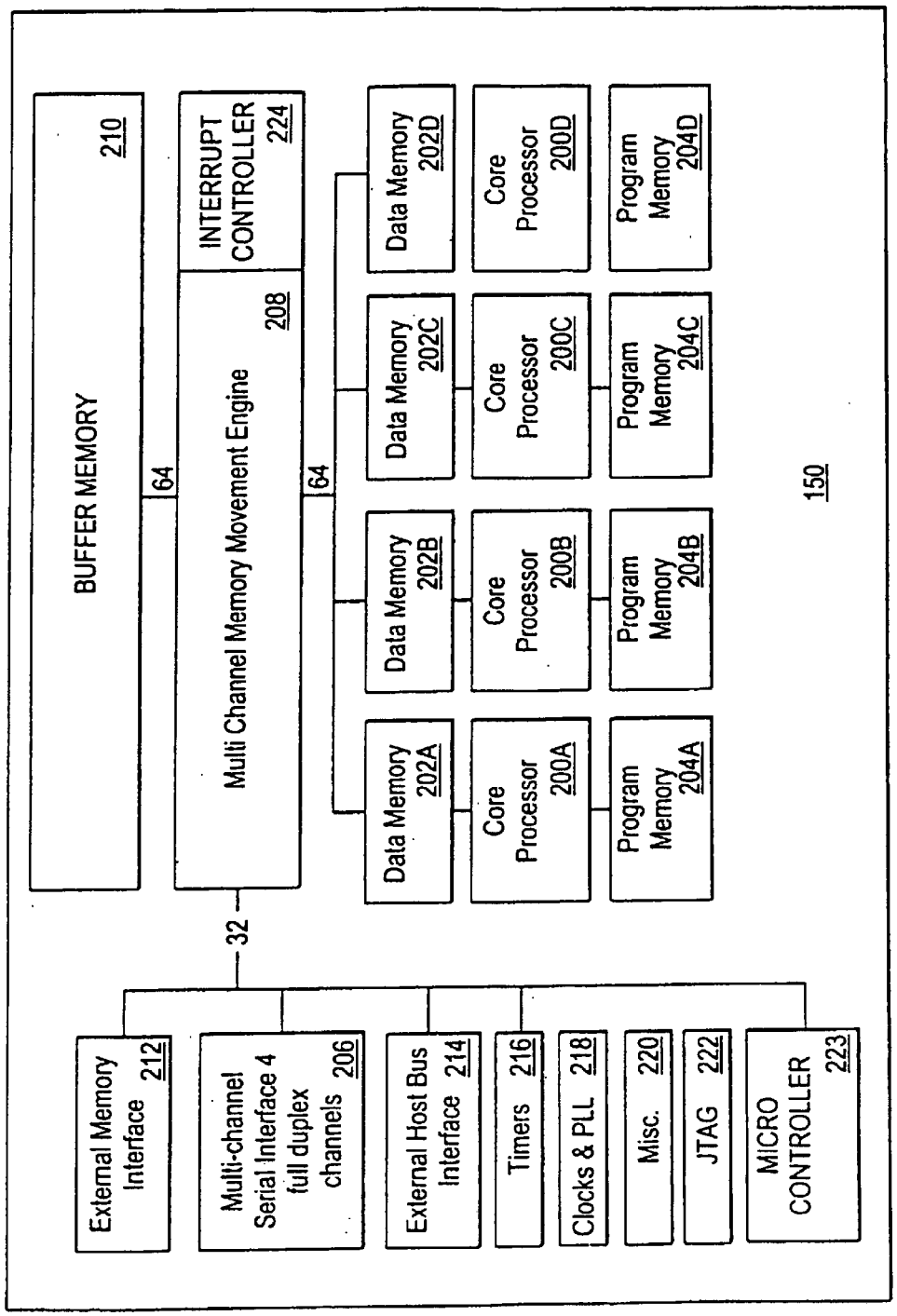
FIG. 2 is a block diagram of the Application Specific Signal Processor (ASSP) of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B. —Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level.

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory resulting, in very efficient data processing. Thus, the instruction set architecture of the present invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Program memory 204 couples to the pipe control 304 which includes an instruction buffer that acts as a local loop cache. The instruction buffer in the preferred embodiment has the capability of holding four instructions. The instruction buffer of the pipe control 304 reduces the power consumed in accessing the main memories to fetch instructions during the execution of program loops.

Figure 5B:
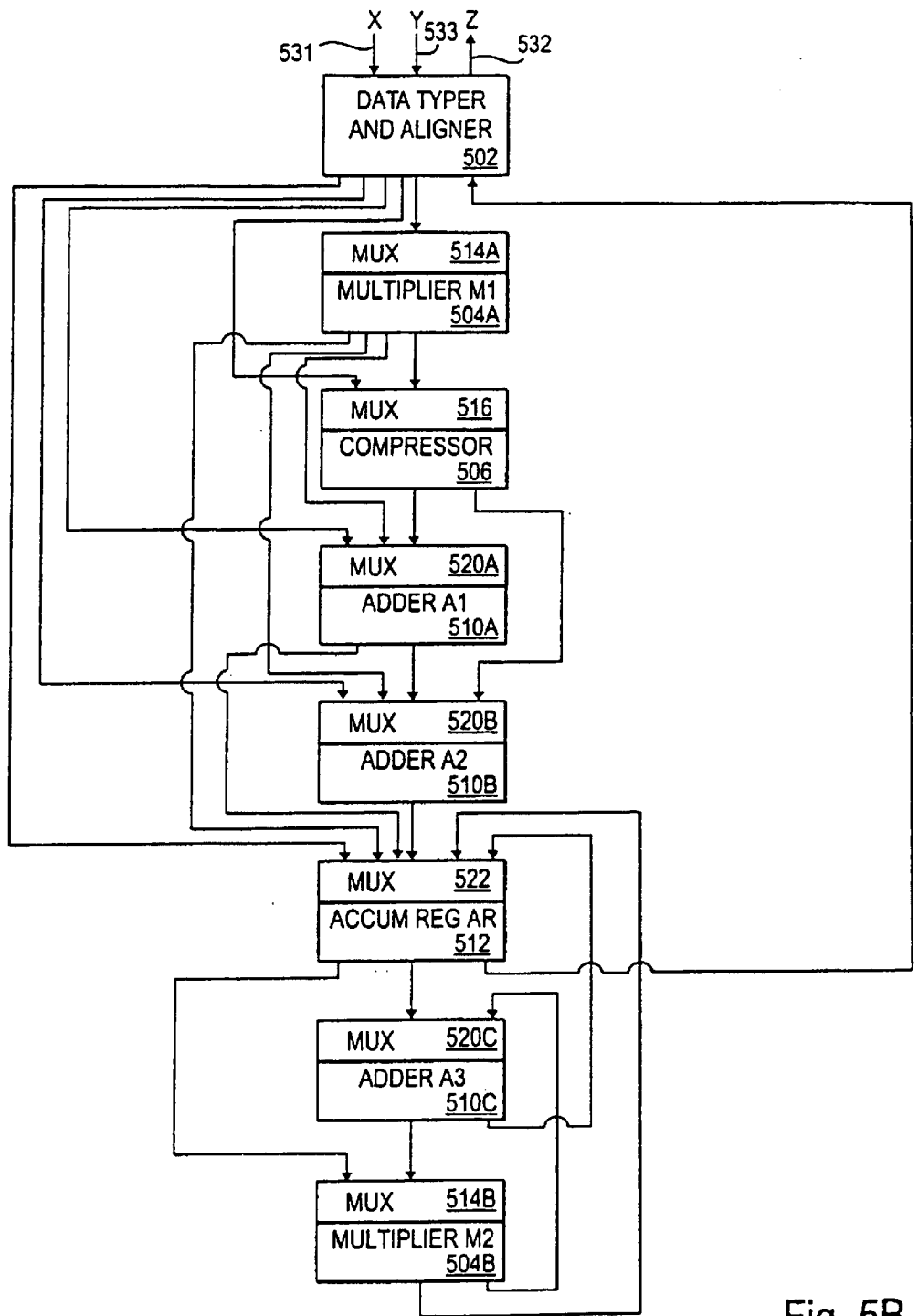
FIG. 5B is a more detailed block diagram of FIG. 5A illustrating the bus structure of the signal processing unit.

Referring now to FIG. 5B, a more detailed block diagram of the functional blocks and the bus structure of the signal processing unit is illustrated. Dyadic DSP instructions are possible because of the structure and functionality provided in each signal processing unit. Output signals are coupled out of the signal processor 300 on the Z output bus 532 through the data typer and aligner 502. Input signals are coupled into the signal processor 300 on the X input bus 531 and Y input bus 533 through the data typer and aligner 502. Internally, the data typer and aligner 502 has a different data bus to couple to each of multiplier M1 504A, compressor 506, adder A1 510A, adder A2 510B, and accumulator register AR 512. While the data typer and aligner 502 could have data busses coupling to the adder A3 510C and the multiplier M2 504B, in the preferred embodiment it does not in order to avoid extra data lines and conserve area usage of an integrated circuit. Output data is coupled from the accumulator register AR 512 into the data typer and aligner 502. Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512. Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

Instruction Set Architecture

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the present invention to DSP algorithmic structures is a balance between ease of implementation, processing efficiency, and programmability of DSP algorithms. The ISA of the present invention provides for data movement operations, DSP/arithmetic/logical operations, program control operations (such as function calls/returns, unconditional/conditional jumps and branches), and system operations (such as privilege, interrupt/trap/hazard handling and memory management control).

Referring now to FIG. 6A, an exemplary instruction sequence 600 is illustrated for a DSP algorithm program model employing the instruction set architecture of the present invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions which are typically infrequently executed. Instructions 604 are typically to provide the setup for the inner loop 602, other control through 2×20 control instructions, or offset extensions for pointer backup. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing units 300 in a single instruction multiple data execution mode, memory access for operands, dyadic DSP operations, and other DSP functionality through the 20/40 bit DSP instructions of the ISA of the present invention. Because instructions 605 are so often repeated, significant improvement in operational efficiency may be had by providing the DSP instructions, including general dyadic instructions and dyadic DSP instructions, within the ISA of the present invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC or DSP instructions to be executed in series or parallel, such as a RISC control instruction executed in parallel with a DSP instruction, or a 40 bit extended RISC or DSP instruction.

The instruction set architecture of the ASSP 150 has 4 distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor 200 of the type where D=[(A op1 B) op2 C] and each of "op1" and "op2" can be a multiply, add or extremum (min/max) class of operation on the three operands A, B, and C. The ISA of the ASSP 150 which accelerates these calculations allows efficient chaining of different combinations of operations. Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bit 39 and 19 indicating the type of instruction. After fetching, the instruction is grouped into two sections of 20 bits each for execution of operations. In the case of 20-bit control instructions with parallel execution (bit 39=0, bit 19=0), the two 20-bit sections are control instructions that are executed simultaneously. In the case of 20-bit control instructions for serial execution (bit 39=0, bit 19=1), the two 20-bit sections are control instructions that are executed serially. In the case of 20-bit DSP instructions for serial execution (bit 39=1, bit 19=1), the two 20-bit sections are DSP instructions that are executed serially. In the case of 40-bit DSP instructions (bit 39=1, bit 19=0), the two 20 bit sections form one extended DSP instruction which are executed simultaneously.

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands within the data memory 202 or registers within the accumulator 512 or register file 413, a 6-bit specifier is used in the DSP extended instructions to access operands in memory and registers. Of the six bit specifier used in the extended DSP instructions, the MSB (Bit 5) indicates whether the access is a memory access or register access. In the preferred embodiment, if Bit 5 is set to logical one, it denotes a memory access for an operand. If Bit 5 is set to a logical zero, it denotes a register access for an operand. If Bit 5 is set to 1, the contents of a specified register (rX where X: 0–7) are used to obtain the effective memory address and post-modify the pointer field by one of two possible offsets specified in one of the specified rX registers. If Bit 5 is set to 0, Bit 4 determines what register set has the contents of the desired operand. If Bit-4 is set to 0, then the remaining specified bits 3:0 control access to the registers within the register file 413 or to registers within the signal processing units 300.

DSP Instructions

There are four major classes of DSP instructions for the ASSP 150 these are:

1) Multiply (MULT): Controls the execution of the main multiplier connected to data buses from memory.
Controls: Rounding, sign of multiply
Operates on vector data specified through type field in address register Second operation: Add, Sub, Min, Max in vector or scalar mode 2) Add (ADD): Controls the execution of the main-adder
Controls: absolute value control of the inputs, limiting the result
Second operation: Add, add-sub, mult, mac, min, max 3) Extremum (MIN/MAX): Controls the execution of the main-adder
Controls: absolute value control of the inputs, Global or running max/min with T register, TR register recording control
Second operation: add, sub, mult, mac, min, max 4) Misc: type-match and permute operations.

The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently. All of the DSP instructions control the multipliers 504A–504B, adders 510A–510C, compressor 506 and the accumulator 512, the functional units of each signal processing unit 300A–300D.

In the 40 bit instruction word, the type of extension from the 20 bit instruction word falls into five categories:

1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers
5) DSP extensions that control the lower rows of functional units within a signal processing unit 300 to accelerate block processing.

The 40-bit control instructions with the 20 bit extensions further allow a large immediate value (16 to 20 bits) to be specified in the instruction and powerful bit manipulation instructions.

Efficient DSP execution is provided with 2×20-bit DSP instructions with the first 20-bits controlling the top functional units (adders 501A and 510B, multiplier 504A, compressor 506) that interface to data buses from memory and the second 20 bits controlling the bottom functional units (adder 510C and multiplier 504B) that use internal or local data as operands. The top functional units, also referred to as main units, reduce the inner loop cycles in the inner loop 602 by parallelizing across consecutive taps or sections. The bottom functional units cut the outer loop cycles in the outer loop 601 in half by parallelizing block DSP algorithms across consecutive samples.

Efficient DSP execution is also improved by the hardware architecture of the present invention. In this case, efficiency is improved in the manner that data is supplied to and from data memory 202 to feed the four signal processing units 300 and the DSP functional units therein. The data highway is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data. In the preferred embodiment when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

Dyadic DSP Instructions

All DSP instructions of the instruction set architecture of the ASSP 150 are dyadic DSP instructions within the 20 bit or 40 bit instruction word. A dyadic DSP instruction informs the ASSP in one instruction and one cycle to perform two operations. Referring now to FIG. 6B is a chart illustrating the permutations of the dyadic DSP instructions. The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the present invention can be generalized to combining any pair of basic DSP operations to provide very powerful dyadic instruction combinations. Compound DSP operational instructions can provide uniform acceleration for a wide variety of DSP algorithms not just multiply-accumulate intensive filters. The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

Referring now to FIG. 6C and FIG. 6D, bitmap syntax for an exemplary dyadic DSP instruction is illustrated. FIG. 6C illustrates bitmap syntax for a control extended dyadic DSP instruction while FIG. 6D illustrates bitmap syntax for a non-extended dyadic DSP instruction. In the non-extended bitmap syntax the instruction word is the twenty most significant bits of a forty bit word while the extended bitmap syntax has an instruction word of forty bits. The three most significant bits (MSBs), bits numbered 37 through 39, in each indicate the MAIN OP instruction type while the SUB OP is located near the middle or end of the instruction bits at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected. In the case of MULT as the MAIN OP, the SUB OPs are 000 for NOP, 001 or 010 for ADD, 100 or 011 for a negative ADD or subtraction, 101 or 110 for MIN, and 111 for MAX. In the preferred embodiment, the MAIN OP and the SUB OP are not the same DSP instruction although alterations to the hardware functional blocks could accommodate it. The lower twenty bits of the control extended dyadic DSP instruction, the extended bits, control the signal processing unit to perform rounding, limiting, absolute value of inputs for SUB OP, or a global MIN/MAX operation with a register value.

The bitmap syntax of the dyadic DSP instruction can be converted into text syntax for program coding. Using the multiplication or MULT non-extended instruction as an example, its text syntax for multiplication or MULT is (vmul||vmuln).(vadd|vsub|vmax|sadd|ssub|smax) da, sx, sa, sy [,(ps0)|ps1)]

The "vmul||vmuln" field refers to either positive vector multiplication or negative vector multiplication being selected as the MAIN OP. The next field, "vadd|vsub|vmax|sadd|ssub|smax", refers to either vector add. vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[,(ps0) |ps1)]" refers to pair selection of keyword PS0 or PS1 specifying which are the source-destination pairs of a parallel-store control register. Referring now to FIG. 6E and 6F, lists of the set of 20-bit DSP and control instructions for the ISA of the present invention is illustrated. FIG. 6G lists the set of extended control instructions for the ISA of the present invention. FIG. 6H lists the set of 40-bit DSP instructions for the ISA of the present invention. FIG. 6I lists the set of addressing instructions for the ISA of the present invention.

Referring now to FIG. 7, a block diagram illustrates the instruction decoding for configuring the blocks of the signal processing unit 300. The signal processor 300 includes the final decoders 704A through 704N, and multiplexers 720A through 720N. The multiplexers 720A through 720N are representative of the multiplexers 514, 516, 520, and 522 in FIG. 5B. The predecoding 702 is provided by the RISC control unit 302 and the pipe control 304. An instruction is provided to the predecoding 702 such as a dyadic DSP instruction 600. The predecoding 702 provides preliminary signals to the appropriate final decoders 704A through 704N on how the multiplexers 720A through 720N are to be selected for the given instruction. Referring back to FIG. 5B, in a dyadic DSP instruction the MAIN OP generally, if not a NOP, is performed by the blocks of the multiplier M1 504A, compressor 506, adder A1 510A, and adder A2 510B. The result is stored in one of the registers within the accumulator register AR 512. In the dyadic DSP instruction the SUB OP generally, if not a NOP, is performed by the blocks of the adder A3 510C and the multiplier M2 504B. For example, if the dyadic DSP instruction is to perform is an ADD and MULT, then the ADD operation of the MAIN OP is performed by the adder A1 510A and the SUB OP is performed by the multiplier M1 504A. The predecoding 720 and the final decoders 704A through 704N appropriately select the respective multiplexers 720A through 720B to select the MAIN OP to be performed by the adder A1 510A and the SUB OP to be performed by the multiplier M2 504B. In the exemplary case, multiplexer 520A selects inputs from the data typer and aligner 502 in order for adder A1 510A to perform the ADD operation, multiplexer 522 selects the output from adder 510A for accumulation in the accumulator 512, and multiplexer 514B selects outputs from the accumulator 512 as its inputs to perform the MULT SUB OP. The MAIN OP and SUB OP can be either executed sequentially (i.e. serial execution on parallel words) or in parallel (i.e. parallel execution on parallel words). If implemented sequentially, the result of the MAIN OP may be an operand of the SUB OP. The final decoders 704A through 704N have their own control logic to properly time the sequence of multiplexer selection for each element of the signal processor 300 to match the pipeline execution of how the MAIN OP and SUB OP are executed, including sequential or parallel execution. The RISC control unit 302 and the pipe control 304 in conjunction with the final decoders 704A through 704N pipelines instruction execution by pipelining the instruction itself and by providing pipelined control signals. This allows for the data path to be reconfigured by the software instructions each cycle.

Telecommunications Processing

Referring now to FIG. 10, a detailed system block diagram of the packetized telecommunication communication network 100' is illustrated. In the packetized telecommunications network 100' an end system 108A is at a near end while an end system 108B is at a far end. The end systems 108A and/or 108B can be a telephone, a fax machine, a modem, wireless pager, wireless cellular telephone or other electronic device that operates over a telephone communication system. The end system 108A couples to switch 106A which couples into gateway 104A. The end system 108B couples to switch 106B which couples into gateway 104B. Gateway 104A and gateway 104B couple to the packet network 101 to communicate voice and other telecommunication data between each other using packets. Each of the gateways 104A and 104B include network interface cards (NIC) 130A–130N, a system controller board 1010, a framer card 1012, and an Ethernet interface card 1014. The network interface cards (NIC) 130A–130N in the gateways provide telecommunication processing for multiple communication channels over the packet network 101. On one side, the NICs 130 couple packet data into and out of the system controller board 1010. The packet data is packetized and depacketized by the system controller board 1010. The system controller board 1010 couples the packets of packet data into and out of the Ethernet interface card 1014. The Ethernet interface card 1014 of the gateways transmits and receives the packets of telecommunication data over the packet network 101. On an opposite side, the NICs 130 couple time division multiplexed (TDM) data into and out of the framer card 1012. The framer card 1012 frames the data from multiple switches 106 as time division multiplexed data for coupling into the network interface cards 130. The framer card 1012 pulls data out of the framed TDM data from the network interface cards 130 for coupling into the switches 106.

Each of the network interface cards 130 includes a micro controller (cPCI controller) 140 and one or more of integrated telecommunications processors 150A–150N. Each of the integrated telecommunications processors 150N includes one or more RISC/DSP core processor 200, one or more data memory (DRAM) 202, one or more program memory (PRAM) 204, one or more serial TDM interface ports 206 to support multiple TDM channels, a bus controller or memory movement engine 208, a global or buffer memory 210, a host or host bus interface 214, and a microcontroller (MIPS) 223. Firmware flexibly controls the functionality of the blocks in the integrated telecommunications processor 150 which can vary for each individual channel of communication.

Referring now to FIG. 11A, a block diagram of the firmware telecommunications processing modules of the application specific signal processor 150, forming the "integrated telecommunications processor" 150, for one of multiple full duplex channels is illustrated. One full duplex channel consists of two time-division multiplexed (TDM) time slots on the TDM or near side and two packet data channels on the packet network or far side, one for each direction of communication. The telecommunication processing provided by the firmware can provide telephony processing for each given channel including one or more of network echo cancellation 1103, dial tone detection 1104, a fax processor 1119, voice activity detection 1105, dual-tone multi-frequency (DTMF) signal detection 1106; dual-tone multi-frequency (DTMF) signal generation 1107; dial tone generation 1108; G.7xxx voice encoding (i.e. compression) 1109; G.7xxx voice decoding (i.e. decompression) 1110, and comfort noise generation (CNG) 1111. The firmware for each channel is flexible and can also provide GSM decoding/encoding, CDMA decoding/encoding, digital subscriber line (DSL), modem services including modulation/demodulation, fax services including modulation/demodulation and/or other functions associated with telecommunications services for one or more communication channels. While -Law/A-Law decoding 1101 and -Law/A-Law encoding 1102 can be performed using firmware, in one embodiment it is implemented in hardware circuitry in order to speed the encoding and decoding of multiple communication channels. The integrated telecommunications processor 150 couples to the host processor 140 and a packet processor 1120. The host processor 140 loads the firmware into the integrated telecommunications processor to perform the processing in a voice over packet (VoP) network system or packetized network system.

The -Law/A-Law decoding 1101 decodes encoded speech into linear speech data. The -Law/A-Law encoding 1102 encodes linear speech data into -Law/A-Law encoded speech. The integrated telecommunications processor 150 includes hardware G.711 -Law/A-Law decoders and -Law/A-Law encoders. The hardware conversion of A-law/-law encoded signals into linear PCM samples and vice versa is optional depending upon the type of signals received. Using hardware for this conversion is preferable in order to speed the conversion process and handle additional communication channels. The TDM signals at the near end are encoded speech signals. The integrated telecommunications processor 150 receives TDM signals from the near end and decodes them into pulse-code modulated (PCM) linear data samples $S_{in}$. These PCM linear data samples $S_{in}$ are coupled into the network echo-cancellation module 1103. The network echo-cancellation module 1103 removes an echo estimated signal from the PCM linear data samples $S_{in}$ to generate PCM linear data samples $S_{out}$. The PCM linear data samples $S_{out}$ are provided to the DTMF detection module 1106 and the voice-activity detection and comfort-noise generator module 1105. The output of the Network Echo Canceller (Sout) is coupled into the Tone Detection module 1104, the DTMF Detection module 1106, and the Voice Activity Detection module 1105. Control signals from the Tone Detection module 1104 are coupled back into the Network Echo Cancellation module 1103. The decoded speech samples from the far end are PCM linear data samples Rin and are coupled into the network echo cancellation module 1103. The network echo cancellation module 1103 copies $R_{in}$ for echo cancellation purposes and passes it out as PCM linear data samples $R_{out}$. The PCM linear data samples $R_{out}$ are coupled into the mu-law and A-law encoding module 1102. The PCM linear data samples $R_{out}$ are encoded into mu-law and A-law encoded speech and interleaved into the TDM output signals of the TDM channel Output to the near end. The interleaving for framing of the data is performed after the linear to A-law/mu-law conversion by a Framer (not shown in FIG. 11A) which puts the individual channel data into different time slots. For example, for T1 signaling there are 24 such time slots for each T1 frame.

The Network Echo Cancellation module 1103 has two inputs and two outputs because it has full duplex interfaces with both the TDM channels and the packet network via the VX-Bus. The network echo cancellation module 1103 cancels echoes from linear as well as non-linear sources in the communication channel. The network echo cancellation module 1103 is specifically tailored to cancel non-linear echoes associated with the packet delays/latency generated in the packetized network.

The tone detection module 1104 receives both tone and voice signals from the network cancellation module 1103. The tone detection module 1104 discriminates the tones from the voice signals in order to determine what the tones are signaling. The tone detection module determines whether or not the tones from the near end are call progress tones (dial tone, busy tone, fast busy tone, etc.) signaling on-hook, ringing, off-hook or busy, or a fax/modem call. If a far end is dialing the near end, the call progress tones of on-hook, ringing, or off-hook or busy signal is translated into packet signals by the tone detection module for transmission over the packet network to the far end. If the tone detection module determines that fax/modem tones are present indicating that the near end is initiating a fax/modem call, further voice processing is bypassed and the echo cancellation by the network echo cancellation module 1103 is disabled.

To detect tones, the tone detection module 1104 uses infinite impulse-response (IIR) filters and accompanying logic. When a FAX or modem tone signaling tone is detected, the signaling tones help control the respective signaling event. The tone detection module 1104 detects the presence of several in-band tones at specific frequencies, checks their cadences, signals their presence to the echo cancellation module 1103, and prompts other modules to take appropriate actions. The tone detection module 1104 and the DTMF detection module operate in parallel with the network echo canceller 1103.

The tone detection module can detect true tones with signal amplitude levels from 0 dB to −40 dB in the presence of a reasonable amount of noise. The tone detection module can detect tones within a reasonable neighborhood of center frequency with detection delays within a prescribed limit. The tone detection module matches the tone cadences, as required by the tone-cadence rules defined by the ITU/TIA standards. To achieve the above properties, certain trade-offs are necessary in that the tone detection module must adjust several energy thresholds, the filter roll-off rate, and the filter stopband attenuation. Furthermore, the tone detection module is easily upgradeable to allow detection of additional tones simply by updating the firmware. The current telephony-related tones that the tone-detection module 1104 can detect are listed in the following table:

| Tones the Tone-Detection Module Detects | | | |
| --- | --- | --- | --- |
| Tone Name | Tone Description | 'On' Time | 'Off' Time |
| FAX CED | 2100 Hz | 2.6 to 4 seconds | — |
| Echo Cancellation Disable/ Modem Tones | 2100 Hz, with phase reversal every 450 ms | 2.6 to 4 seconds | — |
| FAX CNG | 1100 Hz | 0.5 seconds | 3 seconds |
| FAX V.21 | 7E flags frequency-shift keying at 1750-Hz carrier. | At least three 7E flags signal the onset of a FAX signal being sent. | |
| 2400 Hz | In-band signaling tones and continuity check tones | G.168 Test 8 describes the performance of echo cancellation in the presence of these tones. | |
| 2600 Hz | | | |

When a 2100-Hz tone with phase reversal is detected indicating a V-series modem operation the echo canceller is shut off temporarily. When the tone detection module detects facsimile tones, the echo canceller is shut off temporarily. The tone detection module can also detect the presence of narrowband signals, which can be control signals to control the actions of the echo cancellation module 1103. The tone detection modules function both during call set up and while the call progress through termination of the communication channel for the call. Any tone which is sent, generated, or detected before the actual call or communication channel is established, is referred to as an out-of-band tone. Tones which are detected during a call, after the call has been set-up, are referred to as in-band tones. The Tone Detector, in it's most general form, is capable of detecting many signaling tones. The tones that are detected include the call progress tones such as a Ringing Tone, a Busy Tone, a Fast Busy Tone, a Caller ID Tone, a Dial Tone, and other signaling tones which vary from country to country. The, call progress tones control the handshaking required to set up a call. Once a call is established, all the tones which are generated and detected are referred to as in-band tones. The same Tone Detectors and Generators Blocks are used both for in-band and out-of band tone detection and generation.

FIG. 11B illustrates a process 1121 for tone detection that can be implemented by a tone detection processor/module according to one embodiment of the invention. As previously discussed, the tone detection module 1104 receives both tone and voice signals from the network cancellation module and discriminates the tones from the voice signals in order to determine what the tones are signaling. The tone detection module determines whether or not the tones are call progress tones (dial tone, busy tone, fast busy tone, etc.) signaling on-hook, ringing, off-hook or busy, a fax call signal, or a modem call signal.

Upon start (block 1122), the process 1121 receives incoming tone and voice data frames. A frame is composed of N samples of the incoming tone/voice signal. In one embodiment, a frame is composed of, for example, 120 samples. Frequency resolution increases as the frame size increases. 120 samples was chosen to optimize both time and frequency resolution. The process 1121 operates on a frame by frame basis. The process 1121 first performs automatic gain control (AGC) (block 1124). The principal of operation of the AGC is based on normalizing the power of the incoming tone/voice signal to make sure that the gain is not so high that it will overflow the Goertzel filter. In doing so, the AGC computes the total energy (e.g. $\Sigma x(n)^2$).

Next, the process 1121 utilizes a Goertzel Filter process which implements a plurality of Goertzel filters to determine the energy of the tone/voice signal at specific frequencies. The Goertzel filter is a type of discrete Fourier transform to obtain a power spectrum, as a function of frequency, for a given signal waveform. The Goertzel filter is a type of infinite impulse-response (IIR) filter and is well known in the art. These specific frequencies can be chosen by the user of the "integrated telecommunications processor" 150. FIG. 11C shows a table of common frequencies used in the telecommunications industry and associated exemplary coefficients for the Goertzel filter. Also, it should be appreciated that the user can define two frequencies to define dual-tone multi-frequency (DTMF) tones, as well as other combinations of frequencies, to define various tones.

In one embodiment, the Goertzel filter computes the energy levels of the tone/voice signal at 16 specific frequencies. This takes advantage of the architecture of the integrated telecommunications processor 150. In one embodiment, the integrated telecommunications processor 150 includes a RISC/DSP core processor 200 that includes four signal processors 300a–d that can operate in parallel to perform four Goertzel filters, simultaneously. Thus, in four cycles of the core processor 200, 16 Goertzel filters can be computed to determine the energy levels of the tone/voice signal at the 16 specific frequencies thereby achieving an efficiency of 4-1. However, it should be appreciated that the architecture of the integrated telecommunications processor 150 is scalable to include any number of core processors with each core processor having a greater number of signal processors that can be used simultaneously to perform mathematical computations such as the Goertzel filter.

Next, the process 1121 determines the state of the tone detection (block 1128). The process 1121 includes three different states: TONE ON, TONE OFF, and TONE. ON/OFF. The state also includes a TONE ON counter that keeps track of the time a specific tone is recognized by the tone detection process 1121 and a TONE OFF counter that keeps track of the time after a tone has been recognized. For ease of illustration, the process 1121 will first be described assuming that a tone has not yet been recognized by the process 1121 and that the state is set to TONE OFF.

The process 1121 then finds the maximum energy level or levels of the incoming tone/voice signal and their associated frequencies (block 1130). Particularly, the process 1121 determines the two maximum energy levels of the tone/voice signal and their associated frequencies from the Goertzel filter. In one embodiment, the process 1121 determines the two maximum energy levels of the tone/voice signal and their associated frequencies from the 16 specific frequencies (e.g. user defined) computed by the Goertzel filter.

In block 1132, the process 1121 based upon the calculation of the two maximum energy levels discriminates whether the tone is a single tone, a dual tone, silence, or other (e.g. speech). In discriminating tones, the user can also define specific minimum energy levels at which to determine whether or not a tone exists (i.e. tone presence) for a given frequency. If a tone in block 1132 is not found, then the process 1121 proceeds to the next frame (block 1140) and the process 1121 starts over (block 1122). On the other hand, if a single or dual tone is detected, the process 1121 looks for the detected single/dual tone in a user defined dictionary of the tones (block 1134).

As previously discussed, a user can define a number of different frequencies at which to determine certain tones. In one embodiment, a user can define 16 frequencies at which to determine whether certain tones are present. FIG. 11D illustrates a partial dictionary of exemplary call progress tones. It should be appreciated that the user defined dictionary can also include many other sorts of tones such as the: FAX CED, FAX CNG, and DTMF.

If the tone is found the dictionary (block 1134), the process 1121 updates the state from TONE OFF to TONE ON (block 1138). The process 1121 then proceeds to the next frame (block 1140) and the process 1121 starts over (block 1122) with the state set to TONE ON.

Upon start (block 1122) the process 1121 receives and processes the next incoming tone/voice data frames. The process 1121 then performs automatic gain control (AGC) (block 1124), as previously described. Similarly, the process 1121 again utilizes a Goertzel filter to determine the energy of the next tone/voice signal at specific frequencies (block 1126), also as previously described. The process 1121 then determines the state of the tone detection (block 1128). Continuing with the current example, at this point, the state is determined to be set to TONE ON and the process 1121 proceeds to block 1142.

At block 1142, the process 1121 finds the maximum energy level or levels of the next tone/voice signal and their associated frequencies in the same manner as previously described. Further, as previously described, the process 1121 based upon the calculation of the two maximum energy levels discriminates whether the tone is a single tone, a dual tone, silence, or other (e.g. speech) (block 1144). If no tone is detected then the process 1121 continues to block 1150. However, if a single or dual tone is detected, the process 1121 determines if it is the same tone as the tone identified in the dictionary (block 1146). If so, then state information is updated by incrementing the TONE ON counter (block 1148) and the process 1121 proceeds to the next frame (block 1140) and the process 1121 starts over (block 1122)

with the state still set to TONE ON. On the other hand, if the same tone is not detected (block 1146) or no tone is detected (block 1144) then the process 1121 proceeds to block 1150.

At block 1150, the process 1121 determines whether an OFF cadence is defined for the tone identified in the dictionary. An OFF cadence is a period of time, set by a user or defined by telecommunications standards, in which there should be silence after the end of the tone. An ON cadence is a period of time, set by a user or defined by telecommunications standards, during which the tone should be on. Although an ON cadence value is almost always defined for a tone, an OFF cadence value for a tone may or may not be defined. Returning again to block 1150, the process 1121 determines whether an OFF cadence is defined. If an OFF cadence is not defined, then the process 1121 determines whether the tone identified in the dictionary was on for the period of time set by the ON cadence value (block 1152). If not, then the process 1121 is reset (block 1154) and the process 1121 then proceeds to the next frame (block 1140) and the process 1121 starts over (block 1122). Reset generally involves the initialization of the states and time counters. On the other hand, if the tone identified in the dictionary was on for the period of time set by the ON cadence value, then a tone is declared (block 1156). Next, the process 1121 is reset (block 1154) and the process 1121 then proceeds to the next frame (block 1140) and the process 1121 starts over (block 1122).

Returning to block 1150, if an OFF cadence value is defined, then the state is updated to TONE ON/OFF (block 1158). The process 1121 then proceeds to the next frame (block 1140) and the process 1121 starts over (block 1122) with the state set to TONE ON/OFF.

Upon start (block 1122) the process 1121 receives and processes the next incoming tone/voice data frames. The process 1121 then performs automatic gain control (AGC) (block 1124) and again utilizes a Goertzel filter to determine the energy of the next tone/voice signal at specific frequencies (block 1126), also as previously described. Next, the process 1121 determines the state of the tone detection (block 1128). Continuing with the current example, at this point, the state is determined to be set to TONE ON/OFF and the process 1121 proceeds to block 1160. The process 1121 based upon the calculation of the two maximum energy levels discriminates whether the tone is a single tone, a dual tone, silence, or other (e.g. speech) (block 1160). If no tone (i.e. silence) is detected then the process 1121 continues to block 1162. At block 1162, the process 1121 updates the state information by incrementing the TONE OFF counter and the process 1121 proceeds to the next frame (block 1140) and the process 1121 starts over (block 1122) with the state still set to TONE ON/OFF.

However, if a tone is detected, the process 1121 determines whether the tone identified in the dictionary was on (as measured by the TONE ON counter) for the period of time defined by the ON cadence value (block 1152) and whether the time after the tone identified in the dictionary (as measured by the TONE OFF counter) satisfies the OFF cadence value. If not, then the process 1121 is reset (block 1154) and the process 1121 then proceeds to the next frame (block 1140) and the process 1121 starts over (block 1122). On the other hand, if the tone identified in the dictionary was on for the period of time set by the ON cadence value and was off for the period of time set by the OFF cadence value then a tone is declared (block 1168). Next, the process 1121 is reset (block 1154) and the process 1121 then proceeds to the next frame (block 1140) and the process 1121 starts over (block 1122).

The process 1121 that has been previously described takes advantage of the architecture of the integrated telecommunications processor 150. In one embodiment, the integrated telecommunications processor 150 includes a RISC/DSP core processor 200 that includes four signal processors 300*a–d* that can operate in parallel to perform four Goertzel filters, simultaneously. Thus, in four cycles of the core processor 200, 16 Goertzel filters can be computed to determine the energy levels of the tone/voice signal at the 16 specific frequencies thereby achieving an efficiency of 4-1.

FIG. 11E illustrates another process 1169 for tone detection that can be implemented by a tone detection processor/module according to one embodiment of the invention. As previously discussed, the tone detection module 1104 receives both tone and voice signals from the network cancellation module and discriminates the tones from the voice signals in order to determine what the tones are signaling. Also, the tone detection module 1104 in implementing process 1169 operates in conjunction with the FAX processor 1119 (FIG. 11A). The tone detection module determines whether or not the tones are call progress tones (dial tone, busy tone, fast busy tone, etc.) signaling on-hook, ringing, off-hook or busy, a fax signal, or a modem signal. Further, the process 1169 particularly distinguishes FAX V.21 tones, modem tones, and echo cancellation (EC) disable tones. The process 1169 of FIG. 11E can be used alone and/or in conjunction with the process 1121 of FIG. 11B.

Additionally, when the process 1169 of FIG. 11E detects a modem tone and/or EC disable tone, it automatically disables echo cancellation. Also, when the process 1169 detects a FAXCED tone (ANS), a FAXCNG tone, or a FAX V.21 it disables voice processing and provides a data by-pass for FAX processing.

The process 1169 uses bandpass Infinite Impulse Response (IIR) filters to detect tones and voice signals. The bandpass IIR filter is used to filter an input signal. The process 1169 makes a decision as to whether a tone is present, and what the tone is, or whether a voice signal is present, based upon comparing the filtered energy to the energy of the input signal. The process 1169 is a sample based process so that a decision as to whether a tone is detected or not can potentially be made at any sample. Because IIR filters need to maintain state variables that are calculated one after the other, a cycle optimized implementation for the recursive algorithm of the IIR filter is desirable. An advantage of the process 1169 according to one embodiment of the present invention is that it allows for a cycle optimized implementation. Particularly, the architecture of the integrated telecommunications processor 150 includes a core RISC/DSP processor 200 having four signal processors 300*a–d* that can operate in parallel to perform four IIR filters, simultaneously. This allows the IIR filters to be calculated very efficiently in a cycle optimized implementation.

Also, as will be discussed, almost all the tone detection procedures are similar in nature to that of the basic process 1169, however, the process 1169 particularly distinguishes FAX V.21 tones and modem/echo cancellation disable tones. The detection of the FAX V.21 tone is based on a demodulation technique. Also, in order to further detect modem tones and/or echo cancellation disable tones, phase-reversals are uniquely tested for to more accurately detect these types of tones.

Referring again to FIG. 11E, the input signal x(n) first undergoes automatic gain control (AGC) at block 1170 in the process 1169. The principal operation of the AGC 1170 is based on normalizing the power of the incoming tone/ voice signal to make sure that the gain is not so high that it will overflow the IIR filters. Further, the AGC normalizes the power of the signal within a frame of N samples. In doing so, the AGC computes the total energy (e.g. $\Sigma x(n)^2$). This sort of scaling is necessary to accommodate the wide dynamic ranges of tones that need to be detected.

Continuing with reference to FIG. 11E, the process 1169 at block 1172 next performs filtering. In one embodiment, Elliptic IIR filters are used to design the bandpass filters. In this embodiment, the order of the filter used is 4. For implementing the elliptic IIR filters an efficient DFII structure is used as shown in FIG. 11F. DFII generally stands for Direct Form II (2) implementation of the IIR filter. The following equations implement the biquad structure:

$$Y[n]=b10*x[n]+d11$$

$$d11=b11*x[n]-a11*y[n]+d12$$

$$d12=b12*x[n]-a12*y[n]$$

or in a more general form:

$$y0=x0$$

$$yi=bi0yi-1[n]+di2[n-1]$$

$$di1[n]=bi1yi-1[n]-ai1yi[n]+di1[n-1]$$

$$di2[n]=bi2yi-1[n]-ai2yi[n]$$

$$i = 1, 2, \ldots, \left[\frac{N+1}{2}\right]$$

$$y[n] = y\left[\frac{(n+1)}{2}\right][n]$$

where x[n], y[n] are the input sample and filter output sample at instant 'n' respectively. The other parameters make up the filter coefficients and filter delays (see also FIG. 11F). The algorithm is essentially sample by sample rather than frame by frame. Thus, a sample by sample filtering is performed using the double biquad structure. The input arguments to this filter would be the all the filter coefficients and the state variables as well as the input at present time. Elliptic IIR filters utilizing a DFII structure are well known in the art.

Continuing with to reference to FIG. 11E, the process 1169 next performs an energy estimation of the filtered signal y(n) at block 1173 and an energy estimation of the input signal x(n) at block 1174. Thus, this stage gives an indication of how much energy is present in these signals. The energy estimation filters are implemented as follows:

$$E[n]=\alpha|x[n]|+(1-\alpha)E[n-1]$$

(Energy for input signal x(n))

$$E[n]=\alpha|y[n]|+(1-\alpha)E[n-1]$$

(Energy for y(n) filtered signal)

The Energy equations for the input signal x(n) and output signal y(n) are made into 1×16 matrices so that they can be combined with the energy computation stages of all the other filters.

Next, as shown in FIG. 11E, a decision at decision block 1176 is made as to whether or not a specific tone is present. The following are the conditions that the input signal x(n) and the filtered signal y(n) must satisfy, before a decision can be made as to whether or not a specific tone is present:

1) The input signal energy (Energy for x(n)) must be greater than a minimum specified threshold, MINTHRESH;
2) The filtered signal energy (Energy for y(n)) multiplied by a threshold must be greater than the input signal energy; and
3) The input signal must maintain an energy level which is adaptively updated by the process, otherwise, the tone will be declared as absent.

Assuming the above conditions are satisfied, a tone will be detected and declared as present (block 1178). An advantage of the present invention is that it allows for a cycle optimized implementation. Particularly, the architecture of the integrated telecommunications processor 150 includes a core RISC/DSP processor 200 having four signal processors 300a–d that can operate in parallel to perform four IIR filters, simultaneously. This allows the IIR filters to be calculated very efficiently in a cycle optimized implementation. Also, it should be noted that when the process 1169 detects a FAXCED tone (ANS) or a FAXCNG tone, it disables voice processing and provides a data by-pass for FAX processing.

However, even though a tone is detected, there are two special cases where extra detection needs to be performed to ensure that the particular tones are actually present. These tones are the modem/echo cancellation disable tones and the FAX V.21 tones. The process 1169 particularly distinguishes the modem/echo cancellation disable tones and the FAX V.21 tones.

Thus, assuming a signal that has the characteristics of a modem/echo cancellation disable tone (e.g. operation at 2100 Hz) is present, the process 1169 proceeds to block 1179 for further modem signal processing. For example, modem/echo cancellation disable tones operate at 2100 Hz but so do other signals, such as the FAX CED tone. Thus, presently, there is no way to truly distinguish the modem/echo cancellation disable tones. However, the process 1169 according to one embodiment of the present invention includes a further modem processing block 1179 which includes a method for phase reversal detection to ensure that the signal has all the characteristics of a modem/echo cancellation disable tone. Particularly, modem/echo cancellation disable tones have a phase reversal every 450 ms and the process 1169 checks for these phase reversals.

The sub-process for phase reversal detection 1181, shown in FIG. 11G, is implemented by the process 1169 as part of the further modem processing block 1179. The sub-process for phase reversal detection 1181 basically looks for a negative spike that is immediately followed by a positive spike. FIG. 11G also shows the energy of the signal (Es), the energy of the filtered signal (Ef), and the difference (diff) function of the filtered energy from the original energy (i.e. the IIR filter), to further illustrate the sub-process for phase reversal detection 1181. To detect the spikes, the sub-process 1181 checks if the value of the diff function is less than a negative threshold (block 1182), for example −0.15 (see 1183 on the graph of the difference function). If not, the sub-process 1181 ends. However, if so, then the sub-process 1181 checks for a positive spike by checking if the diff function has a value greater than a positive threshold (block 1184), for example 0.1 (see 1185 on the graph of the difference function). If not, the sub-process 1181 ends. On the other hand, if this kind of valid transition from negative to positive spike exists then we conclude that a phase reversal took place (block 1186). The threshold is made adaptive by using the fact that the diff function is a function of the filtered energy. An adaptive threshold enables the sub-process 1181 to have a wide dynamic range for the tone to be detected.

Advantageously, the sub-process 1181 specifically distinguishes the modem/echo cancellation disable tones from other tones such as the FAX CED tone which may have the same frequency (e.g. 2100 Hz) but that do not have the same phase reversal characteristics. The unique sub-process 1181 emphasizes finding blips in the difference function so that phase-reversal detection is robust. One technique used to accomplish this is basically to pass the energy of the filtered signal through a high-pass filter and as shown in the FIG. 11G the blips are really emphasized and are easily detectable. Additionally, when the process 1169 of FIG. 11E detects a modem tone and/or EC disable tone, it automatically disables echo cancellation.

Referring again to FIG. 11E, even though a tone is detected (e.g. a tone operating at a frequency of 1750 Hz) and it is believed to be a FAX V.21 tone, the process 1169 performs further detection to ensure that it is indeed a FAX V.21 tone. The FAX V.21 tone has the characteristics of including basically 7E (hexadecimal) flags sent at 300 bps. The binary signal is Frequency Shift Key (FSK) modulated around a carrier frequency of 1750 Hz. The frequency shift is +100 Hz for a binary zero and −100 Hz for a binary one. Thus, assuming a signal that has the characteristics of a V.21 FAX modem tone (e.g. operating at a frequency of 1750 Hz) is present, the process 1169 proceeds to block 1180 for further fax processing to ensure that it is indeed a V.21 FAX modem tone.

Furthermore, with the growth of the Internet and packet based telephony, there exists a strong need for an efficient mechanism for FSK demodulation. More specifically, the V.21 FAX standard requires specific modulated data and a carrier frequency in order to convey that a call contains FAX data rather than voice. The demodulator of this signal needs to be relatively insensitive to reasonable amounts of noise and frequency offsets, and must properly capture the output codewords. Similarly, the device must recognize when the tone has terminated.

A sub-process for fax V.21 detection 1199 according to embodiment of the invention, shown in FIG. 11H, satisfies the above requirements and demodulates the signal in a minimal amount of time and further detects the 7E flags robustly even with noise and frequency offset. The sub-process for fax V.21 detection is implemented by the process 1169 as part of the further Fax processing block 1179 (FIG. 11E). In one embodiment, the fax processor 1119 in conjunction with tone detection module 1104 (FIG. 11A) executes the sub-process for fax V.21 detection 1199.

As shown in FIG. 11H, the digitized input (e.g. y(n)) is received by the mixer 1189. As previously discussed the digitized input is modulated using FSK with a carrier frequency of 1750 Hz. The first stage in the sub-process for fax V.21 detection 1199 is to begin demodulation of the signal by removing the carrier. This is accomplished with the mixer (block 1189). The mixer 1189 mixes the data with a stored copy of the carrier frequency. One input is mixed to baseband in one cycle. More specifically, the four inputs are multiplied by four cosine samples and stored to memory in one cycle. This can be done twice a loop with two extra instructions for control code. Therefore, there are eight cosines multiplies in fours cycles. The same is then done with a sine wave of the same frequency. Thus eight samples are mixed with sine and cosine in eight cycles (two separate loops), or one output per cycle. The outputs of the mixer stage 1188 are known as the in-phase and quadrature components of the signal.

The second stage in the sub-process for fax V.21 detection 1199, i.e. the lowpass filter (block 1190), may be needed if the signal quality is poor. The lowpass filter (block 1190) removes most of the high frequency noise content. Both the in-phase and quadrature component can be passed through the lowpass filter to remove noise. One lowpass filter (LPF) output is completed in (N/8)+2 cycles. Two outputs are simultaneously calculated by using the data from two previous instructions. This permits the architecture of the integrated telecommunications processor 150 to operate eight multipliers in one cycle, utilizing the four signal processors (300a–d), simultaneously, for a highly efficient implementation of an FIR filter.

The third stage in the sub-process for fax V.21 detection 1199, i.e. the phase detector (block 1191), is where the original modulated signal is actually recovered. A simple mathematical difference equation is used in order to find the phase difference between each two successive baseband samples. Some noise may be introduced in the process since the two signals are not guaranteed to be of the same magnitude, and may have some residual noise not removed by the first filter. This phase difference contains a version of the original modulated signal. Particularly, one phase bit is detected in 0.5 cycles. The formula for detecting a specific phase bit is: $I(N)*Q(N+1)-I(N+1)*Q(N)$. The architecture of the integrated telecommunications processor 150, utilizing the four signal processors (300a–d), simultaneously, allows for the completion of this operation in two cycles for four simultaneous outputs, since four multipliers are active in a given cycle.

The fourth stage in the sub-process for fax V.21 detection 1199, i.e. the lowpass filter (LPF) to prevent aliasing (block 1192), is similar to the second stage in some respects. The LPF to prevent aliasing (block 1192) not only eliminates high frequency noise content, but also prevents distortion known as aliasing when the sample rate is reduced.

The fifth stage in the sub-process for fax V.21 detection 1199 includes reducing the sample rate (block 1193). The sample rate is reduced to one sample per modulated symbol by taking every Nth sample and discarding the rest.

Finally, in the sixth stage of the sub-process for fax V.21 detection 1199 the codewords are counted (block 1195). Particularly, the sign of the outputs are collected and counted one after another. If the pattern '7E' in hexadecimal is seen three consecutive times, the V21 flag is set to true. Otherwise, the flag goes back to reset state until the next three '7E' codewords occur. If the V21 flag is set to true, then it is determined that FAX V.21 is present (block 1196).

The sub-process for fax V.21 detection 1199 includes many advantages. For example, the sub-process detects the 7E flag robustly even with noise and frequency offset. Further, full demodulation occurs in 12 cycles per output. Also, the sub-process for fax V.21 detection 1199 utilizing the architecture of the integrated telecommunications processor 150 performs high density filtering, mixing, and phase detection. Additionally, the sub-process can be used to demodulate generic FSK modulated signals with a large enough sample rate, such that the approximation sin(phase)=phase can be made. Also, when the FAX V.21 tone is verifed, voice processing is disabled and a data by-pass is provided for FAX processing.

Turning away from tone detection and back to voice processing issues, in most conversations, speakers only voice speech about 35% of the time. During the remaining 65% of the time in most conversations, a speaker is relatively silent due to natural pauses for emphasis, clarity, breathing, thought processes, and so forth. When there are more than two speakers, as in conference calls, there is even more periods of silence. It is an inefficient use of a communication channel to transmit silence from one end to another. Thus, statistical multiplexing techniques are used to allocate to other calls this 65% of 'quiet' time (also known as 'dead time' or 'silence'). Even though quiet time is allocated to other calls, the channel quality during the time that end users use the communication channel is preserved. However, silence at one end, which is not transmitted to an opposite end, needs to be simulated and inserted into the call at the opposite end.

Sometimes when we speak over a telephone, we hear the echo of our own speech, which we usually ignore. The important point is that we do hear the echo. However, many digital telephone connections are so noise-free there is no background noise or residual echo at all. As a result a far-end user, hearing absolute silence, may think the connection is broken and hang up.

Returning again to FIG. 11a, to convince users there is a connection, the background or Comfort-Noise Generation (CNG) module 1105 simulates silence or quite time at an end by adding background noise such as a comforting 'hiss'. The CNG module 1105 can simulate ambient background noise of varying levels. An echo-cancellation setup message can be used to control the CNG module as an external parameter. The comfort noise generation module alleviates the effects of switching in and out as heard by far-end talkers when they stop talking. The near-end noise level is used to determine an appropriate level of background noise to be simulated and inserted at the SOut (Send Out) Port. However before silence can be simulated by the CNG module 1105, it first must be detected.

The Voice-Activity Detection (VAD) module 1105 is used to detect the presence or absence of silence in a speech segment. When the VAD module 1105 detects silence, background noise energy is estimated and an encoder therein generates a Silence-Insertion Description (SID) frame. The SID frame is transmitted to an opposite end to indicate that silence is to be simulated at the estimated background noise energy level. In response to receiving an SID frame at the opposite end (i.e., the Far End), the CNG module 1111 generates a corresponding comfort noise or simulated silence for a period of time. Using the received level of the ambient background noise from the SID frame, the CNG produces a level of comfort noise (also called 'white noise' or 'pink noise' or simulated silence) that replaces the typical background noises that have been removed, thereby assuring the far-end person that the connection has not been broken. The VAD module 1105 determines when the comfort noise is to be turned on (i.e. a quiet period is detected) and when comfort noise is to be turned off (i.e. the end user is talking again). The VAD 1105 (in the Send Path) and CNG module 1111 (in the Receive Path) work effectively together at two different ends so that speech is not clipped during the quiet period and comfort noise is appropriately generated.

The VAD module 1105 includes an Adaptive Level Controller (ALC) that ensures a constant output level for varying levels of near-end inputs. The adaptive level controller includes a variable gain amplifier to maintain the constant output level. The adaptive level controller includes a near-end energy detector to detect noise in the near-end signal. When the near end energy detector detects noise in the near-end signal the ALC is disabled so that undesirable noise is not amplified.

The DTMF detection module 1106 performs dual-tone multiple frequency detection necessary to detect DTMF tones as telephone signals. The DTMF detection module receives signals on Sout from the echo cancellation module 1103. The DTMF detection module 1106 is always active, even during normal conversation in case DTMF signals are transmitted during a conversation. The DTMF detection module does not disable echo cancellation when DTMF tones are detected. The DTMF detection module includes narrow-band filters to detect special tones and DTMF dialing tones. Furthermore because the G.7xxx speech encoding module 1109 and decoding module 1110 are used to compress/decompress speech signals and are not used for control signaling or dialing tones, the DTMF detection module may be used as appropriate to control sequencing, loading, and the execution of CODEC firmware.

The DTMF detection module 1106 detects the DTMF tones and includes a decoder to decode the tones to determine which telephone keypad button was pressed. The DTMF detection module 1106 is based on a Goertzel algorithm and meets all conditions of the Bellcore DTMF decoder tests as well as Mitel decoder tests.

The DTMF detection module 1106 indicates which dialpad key a sender has pressed after processing a few frames of data. The DTMF detection module can be adapted to receive user-defined parameters. The user defined parameters can be varied to optimize the DTMF detector for specific receiving conditions such as the thresholds for both of the frequencies made up by the 'rows' and 'columns' of the DTMF keypad, thresholds for acceptable twist ratios (the ratio of powers between the higher and lower frequencies), silence level, signal-to-noise ratios, and harmonic ratios. The DTMF generation module 1107 provides dual-tone multiple frequency (DTMF) generation necessary to generate DTMF tones for telephone signals. The encoding process in the DTMF generation module 1107 generates one of the various pairs of DTMF tones. The DTMF generation module 1107 generates digitized dual-tone multi-frequency samples for a dialpad key depression at the far end. The DTMF generation module 1107 is also always active, even during normal conversation. The DTMF generation module 1107 includes narrow-band filters to generate special tones and DTMF dialing tones. The DTMF generation module 1107 receives a DTMF packet from the far end over the packet network. The DTMF generation module 1107 includes a DTMF decoder to decode the DTMF packet and properly generate tones. The DTMF packet payload includes such information as the key or digit that was pressed that is to be played (i.e. dialpad key coordinates), duration to be played (Number of successive 125 microsecond samples during which the tone is enabled and Number of successive 125 microsecond samples during which the tone is shut off disabled), amplitude level (Lower-frequency amplitude level in dB and Upper-frequency amplitude level in dB) and other information. By specifying these parameters, the DTMF generation module 1107 can generate DTMF signaling tones having the required signal amplitude levels and timing for the appropriate digit/tone. The DTMF tones generated by the DTMF generation module 1107 are coupled into the echo canceller on Rin.

The tone generation module 1108 operates similar to the DTMF generation module 1107 but generates the specific tones that provide telephony signals. The tones generated by the tone generation module include tones to signal On-hook/off-hook, Ringing, Busy, and special tones to signal FAX/modem calls. A tone packet is received from the far end over the packet network and is decoded and the parameters of the tone are determined. The tone generation module 1108 generates tone similar to the DTMF generation module 1107 previously described using narrowband filters.

The G.7xx encoding module 1109 provides speech compression before being packetized. The G.7xx encoding module 1109 receives speech in a linear 64-Kbps pulse-code modulation (PCM) format from the network echo cancellation module 1103. The speech is compressed by the G.7xx encoding module 1109 using one of the compression standards specified for low bit-rate voice (LBRV) CODECs, including the ITU-T internationally standardized G.7xx series. Many speech CODECs can be chosen. However, the selected speech CODEC determines the block size of speech samples and the algorithmic delay. Of several industry-standard speech CODECs in use, each implements a different combination of Coding rate, Frame length (the size of the speech sample block), and Algorithmic delay (or detection delay) caused by how long it takes all samples to be gathered for processing.

The G.7xx decoding module 1110 provides speech decompression of signals received from the far end over the packet network. The decompressed speech is coupled into the network echo cancellation module 1103. The decompression algorithm of the G.7xx decoding module 1110 needs to match the compression algorithm of the G.7xx encoding module 1109. The G.7xx decoding module 1110 and the G.7xx encoding module 1109 are referred to as a CODEC (coder-decoder). Currently, there are several industry-standard speech CODECs from which to pick. The parameters for selection of a CODEC are previously described. The ITU CODECs include G.711, G.722, G.723.1, G.726, G.727, G.728, G.729, G.729A, and G.728E. Each of these can easily be selected by choice of firmware.

Data enters and leaves the processor 150 through the TDM serial I/O ports and a 32-bit parallel VX-Bus 1112. Data processing in the processor 150 is performed using 16-bits of precision. The commanded 8-bit PCM data on the TDM channel input is converted into 16-bit linear PCM for processing in the processor 150 and is re-converted back into 8-bit PCM for outputting on the TDM channel output.

Referring now to FIG. 12, a flow chart diagram of the telephony processing of linear data ($S_{in}$) from a near end to packet data on the network side at a far end is illustrated. Near in data $S_{in}$ is provided to the integrated telecommunications processor 150. At step 1201, a determination is made whether the echo cancellation module 1103 is enabled or not. If the echo cancellation module 1103 is not enabled, the integrated telecommunications processor 150 jumps to the tone detection module 1205 which detects the presence or absence of in-band tones in the Sin signal. If the echo cancellation module 1103 is enabled at step 1201, the near in data $S_{in}$ is coupled into the echo cancellation module 1003 at step 1203 and data from the far end (FarIn) is utilized to cancel out echoes. After echo cancellation is performed at step 1203 and/or if the echo cancellation module 1103 is enabled, the integrated telecommunications processor 150 jumps to the tone detection step 1205 where the data is coupled into tone detection module 1104. Methods for tone detection (including fax tone detection) have been discussed previously with reference to FIGS. 11A–H. The processor 150 goes to step 1207.

At step 1207, a determination is made whether a fax tone is present. If the fax tone is present at step 1207, the integrated telecommunications processor 150 jumps to step 1209 to provide fax processing. If no fax tone is present at step 1207, further interpretation of the result by the tone detection module occurs at step 1211.

At step 1211, a determination is made whether there is an echo cancellation control tone to indicate the Enabling and Disabling of the Echo Canceller. If an Echo cancellation control tone is present, integrated telecommunications processor jumps to step 1215. If no echo cancellation control tone is detected at step 1211, the incoming data signal Sin may be a voice or speech signal and the integrated telecommunications processor jumps to the VAD module at step 1219.

At step 1215 the energy of the Tone is compared to a predetermined threshold. A determination is made whether or not the energy level in the signal $S_{in}$ is less than a threshold level. If the energy of the Tone on $S_{in}$ is greater than or equal to this predetermined threshold, the processor jumps to step 1213. If the energy of the Tone on $S_{in}$ is less than the threshold level, the integrated telecommunications processor 150 jumps to step 1217.

At step 1213, the echo cancellation disable tone has been detected and the energy of the tone is greater than a given predetermined threshold which causes the echo cancellation module to be disabled to cancel newly arriving Sin signals. After the Echo Canceller Disable Tone has been detected, the Echo Canceller block is given an indication through a control signal to disable Echo Cancellation.

At step 1217, the echo cancellation disable tone was not detected and the energy of the tone is less than the given predetermined threshold. The echo cancellation module is enabled or remains enabled if already in such state. The Echo Canceller block is given an indication through a control signal to enable Echo Cancellation. This may indicate the end of Echo Canceller Disable Tone.

The predetermined threshold level is a cutoff level to determine whether or not an Echo Canceller Disable Flag should be turned OFF. If the Tone Energy drops below a predetermined threshold, the Echo Cancellation disable flag is turned OFF. This flag is coupled into the Echo Canceller module. The Echo Canceller module is enabled or disabled in response to the echo cancellation disable flag. If the Tone energy is greater than the pre-determined threshold, then the processor jumps to step 1213 as described above. In either case, whether or not the echo cancellation disable flag is set true or false or at steps 1213 or 1217, the next step in processing is the VAD module at step 1219.

At step 1219, the data signal Sin is coupled into the voice activity detector module 1105 which is used to detect periods of voice/DTMF/tone signals and periods of silence that may be present in the data signal Sin. The processor 150 jumps to step 1221.

At step 1221, a determination is made whether silence had been detected. If silence has been detected, the integrated telecommunications processor 150 jumps to step 1223 where an SID packet is prepared for transmission out as a packet on the packet network at the far end. If no silence is detected at step 1221, the processor couples the signal Sin into the ambient level control (ALC) module (not shown in FIG. 11). At step 1225, the ALC amplifies or de-amplifies the signal $S_{in}$ to a constant level. Integrated telecommunications processor 150 then jumps to step 1227 where DTMF/Generalized Tone detection is performed by the DTMF/Generalized Tone detection module 1106. The processor goes to step 1229.

At step 1229 a determination is made whether DTMF or tone signals have been detected. If DTMF or tone signals have been detected, integrated telecommunications processor 150 generates DTMF or tone packets at step 1231 for transmission out the packet network at the far end. If no DTMF or tone signals are detected at step 1229, the signal N is a voice/speech signal and the G.7XX encoding module 1109 encodes the speech into a speech packet at step 1233. A speech packet 1235 is then transmitted out the packet network side to the far end.

Referring now to FIG. 13, a flow chart diagram of the telephony processing of packet data from the network side at the far end by the integrated telecommunications processor 150 into $R_{out}$ signals at the near end is illustrated. The integrated. telecommunications processor 150 receives packet data from the far end over the packet network 101. At step 1301, a determination is made as to what type of packet has been received. The integrated telecommunications processor 150 is expecting one of five types of packets. The five packet types that are expected are a fax packet 1303, a DTMF packet 1304, a Tone packet 1305, a speech or SID packet 1306.

If at step 1301 a determination has been made that a fax packet 1303 has been received, data from the packet is coupled into a fax demodulation module by the integrated telecommunications processor at step 1308. At step 1308, the fax demodulation module demodulates the data from the packet using fax demodulation into Rout signals at the near end. If at step 1301 a determination has been made that a DTMF packet 1304 has been received, the data from the packet is coupled into the DTMF generation module 1107 at step 1310. At step 1310, the DTMF generation module 1107 generates DTMF tones from the data in the packet Rout signals at the near end. If at step 1301 the packet received is determined to be a tone packet 1305, the data from the packet is coupled into the tone generation module 1108 at step 1312. At step 1312, the tone generation module 1108 generates tones as Rout signals at the near end. If at step 1301 a determination has been made that speech or SID packets 1306 have been received, the data from the packet is coupled into the G.7xx decoding module 1110 at step 1314. At step 1314, the G.7xx decoding module 1110 decompresses the speech or SID data from the packet into Rout signals at the near end.

If at step 1301 a determination has been made that the packet is either a DTMF packet 1304, a tone packet 1305, a speech packet or an SWD packet 1306, the integrated telecommunications processor 150 jumps to step 1318. If at step 1318, the echo canceller flag is enabled, the $R_{out}$ signals from the respective module is coupled into the echo cancellation module. These $R_{out}$ signals are the Far End Input to the Echo Canceller whose echo, if not cancelled, rides on the Near End Signal when it gets transmitted to the other end. At step 1318, the respective $R_{out}$ signal from a module in conjunction with the $S_{in}$ signal and the Echo Canceller Enable Flag from the nearend is used to perform echo canceling. The Echo Canceller Enable Flag is a binary flag which turns ON and OFF the Echo Canceling operation in step 1318. When this flag is ON, the NearEndIn signals are processed to cancel the potential echo of the FarEnd. When this flag is OFF, the NearEndIn signal by-passes the Echo Canceling as is.

Referring now to FIG. 14, a block diagram of the data flows and interaction between exemplary functional blocks of the integrated telecommunications processor 150 for telephony processing is illustrated. There are two data flows in the voice over packet (VOP) system provided by the integrated telecommunications processor 150. The two data flows are TDM-to-Packet and Packet-to-TDM which are both executed in tandem to form a full duplex system.

The functional blocks in the TDM-to-Packet data flow includes the Echo Canceller 1403, the tone detector 1404, the voice activity detector (VAD) 1405, the automatic level controller (ALC) 1401, DTMF detector 1405, and packetizer 1409. The Echo Canceller 1403 substantially removes a potential echo signal from the near end of gateway. The Tone Detector 1404 controls the echo canceller and other modules of the integrated telecommunications processor 150. The tone detector is for detecting the EC Disable Tone, the FAXCED tone, the FAXCNG tone and V21 '7E'flags. The tone detector 1404 can also be programmed to detect a given number of signaling tones also. The VAD 1405 generates Silence Information Descriptor (SID) when speech is absent in the signal from the near end. The ALC 1401 optimizes volume (amplitude) of speech. The DTMF detector 1405 looks for tones representing DTMF digits. The Packetizer 1409 packetizes the appropriate payloads in order to send packets.

The functional blocks in the Packet to TDM Flow include: the Depacketizer 1410, the Comfort Noise Generator (CNG) 1420, the DTMF Generator 1407, the PCM to linear converter 1421, and the optional Narrowband signal detector 1422. The Decoder 1410 depackets the packet type and routes it appropriately to the CNG 1420, the PCM to linear converter 1421 or the DTMF generator 1407. The CNG 1420 generates comfort noise based on an SID packet. The DTMF generator 1407 generates DTMF signals of a given amplitude and duration. The optional Narrowband signal detector 1422 detects when it is undesirable for the echo canceller to cancel the echo of certain tones on Rin side. The PCM to Linear converter 1421 converts A-law/mu-law encoded speech into 16-bit linear PCM samples. However, this block can easily be replaced by a general speech decoder (e.g. G.7xx speech decoder) for a given communications channel by swapping out the appropriate firmware code. The TDM IN/OUT block 1424 is a A-law/mu-law to linear conversion block (i.e. 1102, 1103) which occurs at the TDM interface. This could be performed by hardware or can be programmed and performed by firmware.

The integrated telecommunications processor is a modular system. It is easy to open new communication channels and support numerous channels simultaneously as a result. These functional modules or blocks of the integrated telecommunications processor 150 interact with each other to achieve complete functionality.

Communication between blocks or modules, that is inter functional-block communication, is carried out by using shared memory resources with certain access rules. The location of the shared area in memory is called Inter functional-block data (InterFB data). All functional blocks of the integrated telecommunications processor 150 have permission to read this shared area in memory but only a few blocks or modules of the integrated telecommunications processor 150 have permission to write into this shared area of memory. The InterFB data is a fixed (reserved) area in memory starting at a memory address such as 0x0050H for example. All the functional blocks or modules of the integrated telecommunications processor 150 communicate with each other if need using this shared memory or InterFB data. The same shared memory area may be used for both TDM-Packet and Packet-TDM data flows or they may be split into different shared memory areas.

The table below indicates a sample set of parameters that may be communicated between functional blocks in the integrated telecommunications processor 150. The column "Parameter Name" indicates the parameter while the "Function" column indicates the function the parameters assist in performing. The "Write/Read Access" column indicates what functional blocks can read or write the parameter.

| Parameter Name | Write/Read Access | Function |
| --- | --- | --- |
| td_initialize | Script(w), tone_detect(w/r) | Initializes state for TD |
| Ecdisable_detect, faxced_detect, faxcng_detect, faxv21_detect, | Td(w), ec(r,w) | Switching ALC, EC ON/OFF |
| Key, dtmf_detect | Dtmf(w), packetizer (r) | Indicates dtmf digit presence |
| Vad_decision, noise_level | Vad(w), cng(r), script/alc(r) | Voice decision, SID for CNG |
| Tone_flag, frequency1, frequency2 | Narrowband(w), ec/script(r) | Indicates narrow-band signal on Rin |

The interaction between the functional blocks or modules and the respective signals are now described. The echo canceller 1403 receives both the Sin signal and Rin signal in order to generate the Sout signal as the echo cancelled signal. The echo canceller 1403 also generates the Rout signal which is normally the same as Rin. That is, no further processing is performed to the Rin signal in order to generate the Rout signal in most cases. The echo canceller 1403 operates over both data flows in that it receives from the TDM end as well as data from the packet side. The echo canceller 1403 properly functions only when data is fully available in both the flows. When a TDM frame (Sin) is ready to be processed, a packet is grabbed from the packet buffer and decoded (Rin) and put into memory. The TDM frame is the Sin signal data from which the echo needs to be removed. The decoded packet is the Rin data signal.

The tone detector 1404 receives the output Sout from the echo canceller 1403. The tone detector 1404 looks for the EC Disable Tone, the FAXCED tone, the FAXCNG tone and the tones representing V21 '7E' flags. The tone detector functions on Sout data after the echo canceller 1403 has completed its data processing. The tone detector's main purpose is to control other modules of the integrated telecommunications processor 150 by turning them ON or OFF. The tone detector 1404 is basically a switching mechanism for the modules such as the Echo Canceller 1403 and the ALC 1401. The tone detector can write the ecdisable flag in the shared memory while the echo canceller 1402 reads it. The tone detector or Echo Canceller writes an ALCdisable flag in the shared memory while the ALC 1401 reads it. Most events detected by the tone detector are used by the echo canceller in one way or another. For example, the Echo Canceller 1403 is to turn OFF when an ecdisable tone is detected by the tone detector 1404. Modems usually send the /ANS signal (or ecdisable tone) to disable the echo cancellers in a network. When the tone detector 1404 of the integrated telecommunications processor 150 detects the ecdisable tone, it writes a TRUE state into the memory location representing ecdisable flag. On the next TDM data packet flow, the echo canceller 1403 reads the ecdisable flag to determine it is to perform echo cancellation or not. In the case its disabled, the echo canceller 1403 generates Sout as Sin with no echo canceling signal added. The ecdisable flag is updated to a FALSE state by the echo canceller 1403 when the root mean squared energy of Sin (RMS) falls below −36 dbm indicating no tone signals.

In certain cases it is undesirable for the ALC 1401 to modify the amplitude of a signal such as when sending FAX data. In this case it is desirable for the ALC 1041 to be turned ON and OFF. In most cases an ANS tone is required to turn the ALC 1401 OFF. When the tone detector 1404 detects an ANS tone, it writes a TRUE state into the memory location for the ALC disable flag. The ALC 1401 reads the shared memory location for the ALC disable flag and turns itself ON or OFF in response to its state. Another condition that ALC disable flag may be turned ON could be a signal from the Echo Canceller saying there was no detected Near End signal. This may be the case when the Sout signal is below a given threshold level.

When the tone detector detects an EC disable tone, it turns OFF the echo canceller 1403 (G.168). When the tone detector detects a FAXCED tone(ANS), it turns OFF the ALC 1401 (G.169) and provides a data by-pass for FAX processing. When the tone detector detects a FAXCNG tone, it provides a data by pass for FAX processing. When the tone detector simultaneously detects three V21 '7E' Flags in a row, it provides a data by pass for FAX processing.

The VAD 1405 is used to reduce the effective bitrate and optimize the bandwidth utilization. The VAD 1405 is used to detect silence from speech. The VAD encodes periods of silence by using a Silence Information Descriptor rather than sending PCM samples that represent silence. In order to do so, the VAD functions over frames of data samples of Sout. The frame size can vary depending on situations and needs of different implementations with a typical frame representing 80 data samples of Sout. If the VAD 1405 detects silence, it writes a voice_activity flag in the shared memory to indicate silence. It also measures the noise power level and writes a valid noise_power level into a shared memory location.

The ALC 1401 reads the voice_activity flag and applies gain control if voice is detected. Otherwise if the voice_activity flag indicates silence, the ALC 1401 does not apply gain and passes Sout through without amplitude change as its output.

The packetizer/encoder 1409 reads the voice activity flag to determine if a current frame of data contains a valid voice signal or not. If the current frame is voice, then the output from the ALC needs to be added into the PCM payload. If the current frame is silence and an SID has been generated by the VAD 1405, the packetizer/encoder 1049 reads the SID information stored in the shared memory in order for it to be packetized.

The ALC 1401 functions in response to the VAD 1405. The VAD 1405 may look over the last one or more frames of data to determine whether or not the ALC information should be added to a frame or not. The ALC 1401 applies gain control if voice is detected else Sout is passed through without any change. The tone detector 1404 disables and enables the ALC 1401 as described above to comply with the G.169 specification. Additionally, the ALC 1401 is disabled when Sout signal level goes below certain threshold (−40 dBm for example) after Echo Cancellation by the echo canceller 1403. If current frame contains valid voice data, then the output gain information from the ALC 1401 is added to the PCM payload by the packetizer. Otherwise if silence is detected, the packetizer uses the SID information to generate packets to be sent as the send_packets.

The DTMF detector 1406 functions in response to the output from the ALC 1401. The DTMF detector 1406 uses an internal frame size of 102 data samples but it adapts to any frame size of data samples. DTMF signaling events for a current frame are recorded in an InterFB area of shared memory. High level programs use DTMF signaling events stored in the InterFB area. Typically the high level program reads all the necessary info and then clears the contents for future use.

The DTMF detector 1406 may read the VAD_activity flag to determine if voice signals are detected. If so, the DTMF detector may not execute until other signal types, such as tones, are detected. If the DTMF detector detects that a current frame of data contains valid DTMF digits, then a special DTMF payload is generated for the packetizer. The special DTMF payload contains relevant information needed to faithfully regenerate DTMF digits at the other end. The packetizer/encoder generates DTMF packets for transmission over the send_packet output.

The Packetizer/Encoder 1409 includes a packet header of 1 byte to indicate which data type is being carried in the payload. The payload format depends on the data being transported. For example, if the payload contains PCM data then the packet will be quite larger than an SID packet for generating comfort noise. The packetizing may be implemented as part of the integrated telecommunications processor or it may be performed by an external network processor.

The Depacketizer/Decoder 1410 receives a stream of packets over rx_packet and first determines what type of packet it is by looking at the packet header. After making a determination as to the type of packet received, the appropriate decoding algorithm can be executed by the integrated telecommunications processor. The type of packets and their possible decoding functions include Comfort Noise Generation (CNG), DTMF Generation, and PCM/Voice decoding. The Depacketizer/Decoder 1410 generates frames of data which are used as Rin. In many cases, a single frame of data is generated by one packet of data.

The comfort noise generator (CNG) 1420 receives commands from the depacketizer/decoder 1410 to generates a "comfortable" pink noise in response receiving an SID frame as a payload in a packet on the rx_packet. The comfort noise generator (CNG) 1420 generates the "comfortable" pink noise at a level corresponding to the noise power indicated in the SID frame. In general, the comfort noise generated can have any spectral characteristics and is not limited to pink noise.

The DTMF Generator 1407 receives commands from the depacketizer and generates DTMF tones in response to the depacketizer receiving a DTMF payload in a packet on rx_packet. The DTMF tones generated by the DTMF Generator 1407 correspond to amplitude levels, key, and possibly duration of the corresponding DTMF digit described in the DTMF payload.

Referring now to FIG. 15, exemplary memory maps of the memories of the integrated telecommunications processor 150 and their inter-relationship are illustrated. FIG. 15 illustrates an exemplary memory map for the global buffer memory 210 to which each of the core processors 200 have access. The program memory 204 and the data memory 202 for each of four core processors 200A–200D (Core 0 to Core 3) is also illustrated in FIG. 15 as being stacked upon each other. The program memory 204C and the data memory 202C for the core processor 200C (Core 2) is expanded in FIG. 15 to show an exemplary memory map. FIG. 15 also illustrates the file registers 413 for one of the core processors, core processor 200C (Core 2).

The memory of the integrated telecommunications processor 150 provides for flexibility in how each communication channel is processed. Firmware and data can be swapped in and out of the core processors 200 when processing a different job. Each job can vary by channel, by frame, by data blocks or otherwise with changes to the firmware. In one embodiment, each job is described for a given frame and a given channel. By providing the functionality in firmware and swapping the code into and out of program memory of the core processors 200, the functionality of the integrated telecommunications processor 150 can be easily modified and upgraded.

FIG. 15 also illustrates the interrelationship between the global buffer memory 210, data memory 202 for the core processors 200, and the register files 413 in the signal processing units 300 of each core processor 200. The multichannel memory movement engine 208 flexibly and efficiently manages the memory mapping so as to extract the maximum efficiency out of each of the algorithm signal processors 300 for a scalable number of channels. That is, the integrated telecommunications processor 150 can support a varying number of communication channels which is scalable by adding additional core processors because the signal processing algorithms and data are stored in memory are easily swapped into and out of many core processors. Furthermore, the memory movement engine 208 can sequence through different signal processing algorithms to provide differing module functionality for each channel.

All algorithm data and code segments are completely relocatable in any memory space in which they are stored. This allows processing of each frame of data to be completely independent from the processing of any other frame of data for the same channel. In fact, any frame of data may be processed on any available signal processor 300. This allows maximum utilization of the processor resources at all times.

Frame processing can be partitioned into several pieces corresponding to algorithm specific functional blocks such as those for the integrated telecommunications processor illustrated in FIGS. 11–14. The "fixed" (non-changing) code and data segments associated with each of these functional blocks can be independently located in a memory space which is not fixed and only one copy of these segments need be kept regardless of the number of channels which are to be supported. This data can be downloaded and/or upgraded at any time prior to it's use. A table of pointers, for example, can be used to specify where each of these blocks currently resides in a memory space. In addition, dynamic data spaces required by the algorithms, which are modifiable, can be allocated at run-time and de-allocated when no longer needed.

When a frame(s) for a particular channel is ready for processing, only the code and data for the functional blocks required for the specified processing of the frame need be referenced. A "script" specifying which of these functional blocks is required can be constructed in real time on a frame by frame basis. Alternately, pre-existing scripts which contain functional block references identified by an identifier for example can be called and executed without addresses. In this case the locations of the functional blocks in any memory space are "looked" up from a table of pointers, for example.

Furthermore, DMA can be utilized if the code and/or data segments for a functional block must be transferred from one memory space to another memory space in order to reduce the overhead associated with processor intervention in such transfer. Since the code and data blocks required by any functional block are completely independent of each other, "chains" of DMA transfers can be defined and executed to transfer multiple blocks from one memory space to another without processor intervention. These "chains" can be created or updated when needed based on the current processing requirements for a particular channel using the "catalog" of functional blocks currently available. A DMA module creating a description of DMA transfers can optimize the use of the destination memory space by locating the segments wherever necessary to minimize wasted space.

In FIG. 15, functional blocks and channel specific segments are arranged in the memory spaces of the global buffer memory 210 and called into the data memory 202 and program memory 204 of a core processor 200. In the exemplary illustration of FIG. 15, the Global buffer memory 210 includes an Algorithm Processing (AP) Catalog 1500, Dynamic Data Blocks 1515, Frame Data Buffers 1520, Functional-Block (FB) & Script Header Tables 1525, Channel Control Structures 1530, DMA Descriptors List 1535, and a Channel Execution Queue 1540.

FIG. 16 is a block diagram illustrating another exemplary memory map for the global buffer memory 210 of the integrated telecommunications processor 150 and the inter-relationship of the blocks contained therein.

Referring to FIGS. 15 and 16, the Algorithm Processing (AP) Catalog 1500 includes channel independent, algorithm specific constant data segments, code data segments and parameter data segments for any algorithm which may be required in the integrated telecommunications processor system. These algorithms include telecommunication modules for Echo cancellation (EC), tone detection and generation (TD), DTMF detection and generation (DTMF), G.7xx CODECs, and other functional modules. Examples of the code data segments include DTMF code 1501, TD code 1502, and EC code 1503 for the DTMF, TD and EC algorithms respectively. Examples of the algorithm specific constant data segments include DTMF constants 1504, TD constants 1505, and EC constants 1506 for the DTMF, TD and EC algorithms respectively. Examples of the parameter data segments include DTMF parameters 1507, TD parameters 1508, and EC parameters 1509 for the DTMF, TD and EC algorithms respectively.

The Algorithm Processing (AP) Catalog 1500 also includes a set of scripts (each containing a script data, script code, and a script DMA template) for each kind of frame processing required by the system. The same script may be used for multiple channels, if these channels all require the same processing. The scripts do not contain any channel specific information. FIG. 15 illustrates script 1 data 1511A, script 1 code 1512A, and a script 1 DMA template 1513A through script N data 1511N, script N code 1512N, and script N DMA template 1513N.

The script 1 blocks (script 1 data 1511A, script 1 code 1512A, script 1 DMA template 1513A) in the AP catalog 1500 define the functional blocks required to accomplish specific processing of a frame of data of a any channel which requires the processing defined by this script and the addresses into the program memory 204 where the functional block code should be transferred and the data memory 202 where the data segments should be transferred. Alternately, these addresses into the program memory 204 and data memory 202 where the data segments should be transferred could be determined at run time by a core memory management function. The script 1 blocks also specify the order of execution of the functional blocks by one of the core processors 200. The script 1 code 1512A for example may define the functional blocks and order of execution required to accomplish echo cancellation and DTMF detection. Alternately, it could describe the functional blocks and execution required to perform G.7xx coding and decoding. Note also that the script 1 blocks can specify "conditional" data transfer and execution such as a data transfer or an execution which depends on the result of another functional blocks results. For example these conditional data transfers may include those surrounding the functional blocks such as whether or not call progress tones are detected. The script 1 DMA template 1513A associated with the script 1 blocks specifies the sequence in which the data should be transferred into and out of the data memory and program memory of one of the core processors 200. Additionally, the script DMA templates associated with each script block is used to construct the one or more channel specific DMA descriptors in the DMA descriptors list 1535 in the global memory buffer 210.

The global buffer memory 210 also includes a table of Functional Block and Script Headers referred to as the FB and Script Header tables 1525. The FB and Script Headers tables 1525 includes the size and the global buffer memory starting addresses for each of the functional blocks segments and script segments contained in the AP Catalog 1500. For example referring to FIG. 16, the DTMF header table includes the size and starting addresses for the DTMF code 1501, the DTMF constants 1504 and the DTMF parameters 1507. A script 1 header table includes the size and starting addresses for the script 1 data 1511A, the script 1 code 1512A, and the script 1 DMA template 1513A. FB and Script Headers table 1525 in essence points to these blocks in the AP catalog 1500 including others such as the EC Code 1503, the EC constants 1506 and the EC Parameters 1509. The contents of FB and Script Header tables 1525 is updated whenever a new AP catalog 1500 is loaded or an existing AP catalog 1500 is updated in the global buffer memory 210.

The global buffer memory also has channel specific data segments consisting of dynamic data blocks 1515 and frame data buffers 1520. The dynamic data blocks 1515 illustrated in the exemplary map of FIG. 15 includes the dynamic data blocks for channels n (CHn) through channel p (CHp). The type of dynamic data blocks for each channel corresponds to the functional modules used in each channel. For example as illustrated in FIG. 15, channel n has EC dynamic data blocks, TD dynamic data blocks, DTMF dynamic data blocks, and G.7xxx codec dynamic data blocks. In FIG. 16, the dynamic data blocks required for channel 10 are ch10-DTMF, ch10-EC and ch10-TD, required for channel 102 are Ch102-EC and ch102-G.7xx, and required for channel 86 is Ch86-EC.

The frame data buffers 1520 include channel specific data segments for each channel for the far in data, far out data, near in data and near out data. The near in data and near out data are for the PSTN network side while the far in data and the far out data are for the packet network side. Note that n channels may be supported such that there may be n sets of channel specific dynamic data segments and n sets of channel specific frame buffer data segments. In FIG. 16, the channel specific frame data segments include ch10-Near In data, ch10-Near Out data, ch10-Far In data, ch10-Far Out data, ch102-Near In, ch 102-Far In, ch 102-Near Out and ch102-Far Out in the frame data buffers 1520. The channel specific data segments and the channel specific frame data segments allows the integrated telecommunications processor 150 to process a wide variety of communication channels having differing parameters at the same time.

The set of channel control structures 1530 in the global buffer memory 210 includes all information required to process the data for a particular channel. This information includes the channel endpoints (e.g. source and destination of TDM data, source and destination of packet data), a description of the processing required (e.g. Echo cancellation, VAD, DTMF, Tone detection, coding, decoding, etc, to use). It also contains pointers to locate the data resources required for processing (e.g. the script, the dynamic data blocks, the DMA descriptor list, the TDM (near in and near out) buffers, and the packet data (far in and far out) buffers). Statistics regarding the channel are also maintained in the channel control structure. This includes such things as the # of frames processed, the channel state (e.g. Call setup, fax/voice/data mode, etc), bad frames received, etc). In FIG. 16, the channel control structures include channel control structures for channel 10 and channel 102 each of which point to respective dynamic data blocks 1515 and frame data buffers 1520.

The DMA Descriptor lists 1535 in the global buffer memory 210 defines the source address, destination address, and size for every data transfer required between the Global buffer memory 210 and the program memory 204 and data memory 202 for processing the data of a specific channel. Thus, n sets of DMA descriptor lists exist for processing n channels. FIG. 15 illustrates the DMA descriptors list 1535 as including CHm DMA descriptors list through CHn DMA descriptors list. In FIG. 16, the DMA Descriptor Lists 1535 includes CH 10-DMA descriptors and CH 102-DMA descriptors.

The global buffer memory 210 further has a Channel Execution Queue 1540. The Channel Execution Queue 1540 schedules and monitors processing jobs for all the core processors 200 of the integrated telecommunications processor 150. For example, when a frame of data for a particular channel is ready to be processed, a "management function" creates or updates the DMA descriptor list for that channel based on the Script and block addresses found in the FB headers of the FBH table 1525 and/or channel control structure found in the script block 1530. The job is then scheduled for processing by the Channel Execution Queue 1540. The DMA descriptor list 1535 includes the transfer of the script itself from the global buffer memory 210 to the data memory 202 and program memory 204 of the core processor 200 that will process that job. Note that the core addresses are specified in such a way that they are applicable to ANY core which may process the job. The same DMA descriptor list may be used to transfer data to any one of the cores in the system. In this way, all necessary information to process a frame of data can be constructed ahead of time, and any core which may then become available can perform the processing.

Consider the scheduled job 1 in the session execution queue 1540 of FIG. 16, for example. Scheduled job 1 points to the Ch 10-DMA descriptors in the DMA Descriptor list 1535 for frame 40 of channel 10. The scheduled job n points to the Ch 102-DMA descriptors in the DMA Descriptor list 1535 to process frame 106 of channel 102.

The upper portion of the program memory 204C and data memory 202C illustrates an example of the program memory 204C including script code 1550, DTMF code 1551 for the DTMF generation and detection, and EC code 1552 for the echo cancellation module. The code stored in the program memory 204 varies depending upon the needs of a given communication channel. In one embodiment, the code stored in the program memory 204 is swapped each time a new communication channel is processed by each core processor 200. In another embodiment, only the code that needs to be swapped out, removed or added in the program memory 204 each time a new communication channel is processed by each core processor 200.

The lower portion of the program memory 204C and data memory 202C illustrates the data memory 202C which includes script data 1560, interfunctional block data area 1561, DTMF constants 1504, DTMF Parameters 1507, CHn DTMF dynamic data 1562, EC constants 1506, EC Parameters 1509, CHn EC dynamic data 1563, CHn Near In Frame Data 1564, CHn Near Out Frame Data 1566, CHn Far In Frame Data 1568, and CHn Far Out Frame Data 1570, and other information for additional functionality or additional functional telecommunications modules. These constants, variables, and parameters (i.e. data) stored in the data memory 202 varies depending upon the needs of a given communication channel. In one embodiment, the data stored in the data memory 202 is swapped each time a new communication channel is processed by each core processor 200. In another embodiment, only the data that needs to be swapped out, removed or added into the data memory 202 each time a new communication channel is processed by each core processor 200.

FIG. 15 illustrates the Register File 413 for the core processor 200A (core 0). The register file 413 includes a serial port address map for the serial port 206 of the integrated telecommunications processor 150, a host port address map for the host port 214 of the integrated telecommunications processor 150, core processor 200A interrupt registers including DMA pointer address, DMA starting address, DMA stop address, DMA suspend address, DMA resume address, DMA status register, and a software interrupt register, and a semaphore address register. Jobs in the channel execution queue 1540 load the DMA pointer in the file registers 412 of the core processor.

FIG. 17 is an exemplary time line diagram of processing frames of data. The integrated telecommunications processor processes multiple frames of multiple channels. The time required to process a frame of data for any particular channel is in most cases much shorter than the time interval to receive the next complete frame of data. The time line diagram of FIG. 17 illustrates two frames of data for a given channel, Frame X and Frame X+1, each requiring about twelve units of time to receive. The frame processing time is typically shorter and is illustrated in FIG. 17 for example as requiring two units each to process Frame X and Frame X+1. For the same channel it can be expected that the processing time for each frame is similar. Note that there is about ten units of delay time between the completion of processing of Frame X and the start of processing of Frame X+1. It would be an inefficient use of resources for a processor to sit idle during this delay time between received frames waiting for a new frame of data to be received in order to start processing.

To avoid inefficiencies, the integrated telecommunications processor 150 processes jobs for other channels and their respective frames of data instead of sitting idle between frames for one given channel. The integrated telecommunications processor 150 processes jobs which are completely channel and frame independent as opposed to processing one or more dedicated channels and their respective frames. Each frame of data for any given channel can be processed on any available core processor 200.

Referring now to FIG. 18, an exemplary time line diagram of how one or more core processors 200A–200N of the integrated telecommunications processor 150 processes jobs on frames of data for multiple communication channels. The arrows 1801A–1801E in FIG. 18 represent jobs or idle time for the core processor 1 200A. The arrows 1802A–1802D represent jobs or idle time for the core processor 2 200B. The arrows 1803A–1803E represent jobs or idle time for the core processor N 200N. Arrows 1801D and 1803C illustrated idle time for core processor 1 and core processor N respectively. Idle times occur for a core processor only when there is no data available for processing on any currently active channel. The Ch### nomenclature above the arrows refers to the channel identifier of the job that is being processed over that time period by a given core processor 200. The Fr### nomenclature above the arrows refers to the frame identifier for the respective channel of the job that is being processed over that time period by the given core processor 200.

The jobs, including a job description, are stored in the channel execution queue 1540 in the global buffer memory 210. In one embodiment of the present invention, all channel specific information is stored in the Channel Control Structure, and all required information for processing the job is contained in the (channel independent) script code and script data, and the (channel dependent) DMA descriptor list which is constructed prior to scheduling the job. The job description stored in the channel execution queue, therefore, need only contain a pointer to the DMA descriptor list.

Core processor 200A, for example, processes job 1801A, job 1801B, job 1801C, waits during idle 1801D, and processes job 1801E. The arrow or job 1801A is a job which is performed by core processor 1 200A on the data of frame 10 of channel 5. The arrow or job 1801B is a job on the data of frame 2 of channel 40 by the core processor 1 200A. The arrow or job 1801C is a job on the data of frame 102 of channel 0 by the core processor 1 200A. The arrow or job 1801E is a job on the data of frame 11 of channel 87 by the core processor 1 200A. Note that core processor 1 200A is idle for a short period of time during arrow or idle 1801D and otherwise use to process multiple jobs.

Thus, FIG. 18 illustrates an example of how job processing of frames of multiple telecommunication channels can be distributed across multiple core processors 200 over time in one embodiment of the integrated telecommunications processor 150.

Because jobs are processed in this manner, the number of channels supportable by the integrated telecommunications processor 150 is scalable. The greater the number of core processors 200 available in the integrated telecommunications processor 150 the more channels that can be supported. The greater the processing power (speed) of each core processor 150, the greater the number of channels that can be supported. The processing power in each core processor 200 may be increased for example such as by faster hardware (faster transistors such as by narrower channel lengths) or improved software algorithms.

As those of ordinary skill will recognize, the present invention has many advantages. One advantage of the present invention is that telephony processing is integrated into one processor. Another advantage of the present invention is that improved telephone communication channels are provided between a time division multiplexed (TDM) telephone network and a packetized network. Another advantage of the present invention is that all the telecommunications modules couple together as a unit and the interrelationships among different modules can then be exploited. As a result, the present invention enables aggregating a large number of TDM channels by providing all Telephony functions, compression, decompression and transceiving as separate packet channels over a packet network. The control mechanism of the present invention can process the data inputs and outputs of different TDM channels and sequence them efficiently for channel based signal processing in the hardware.

The preferred embodiments of the present invention are thus described. While the present invention has been described in particular embodiments, it may be implemented in hardware, software, firmware or a combination thereof and utilized in systems, subsystems, components or subcomponents thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims.

What is claimed is:

1. An apparatus comprising:
   a tone detection processor including at least one core processor including at least four signal processing units to perform tone detection; and
   a storage device to store signal processing instructions for execution by the four signal processing units to:
      perform automatic gain control (AGC) to normalize the power of a tone or voice signal;
      determine the energy of the tone or voice signals at specific frequencies utilizing a Goertzel Filter process which implements a plurality of Goertzel filters;
      determine whether or not a tone is present; and
      if a tone exists, determine what type of tone;
   wherein the four signal processing units operate in parallel to execute four Goertzel filters, simultaneously, and wherein the four Goertzel filters process data frames of the tone or voice signal that are of fixed size.

2. The apparatus of claim 1, wherein determining what type of tone includes determining whether the tone is one of a dial tone, a busy tone, a fast busy tone, a ringing tone, or a fax tone.

3. The apparatus of claim 1, wherein, Goertzel filters compute the energy levels of tone or voice signals at 16 specific frequencies.

4. The apparatus of claim 1, wherein the signal processing instructions further for execution by the four signal processing units to further, determine two maximum energy levels of the tone or voice signal and their associated frequencies, respectively, utilizing Goertzel filters.

5. The apparatus of claim 4, wherein the signal processing instructions further for execution by the four signal processing units to further, based upon the two maximum energy levels of the tone signal and the associated frequencies of the tone signal, discriminate whether the tone is a single tone, a dual tone, silence, or another type of tone.

6. The apparatus of claim 5, wherein the signal processing instructions further for execution by the four signal processing units to further, if the tone was discriminated as a single tone or dual tone, determine the tone by identifying the tone in a user defined dictionary of tones.

7. The apparatus of claim 6, wherein the signal processing instructions further for execution by the four signal processing units to further, update a state to TONE ON.

8. The apparatus of claim 6, wherein the signal processing instructions further for execution by the four signal processing units to further, determine if a next tone is the same as the tone identified in the user defined dictionary and, if so, increment a TONE ON counter.

9. The apparatus of claim 8, wherein the signal processing instructions further for execution by the four signal processing units to further, when the next tone is not the same as the tone identified in the user defined dictionary, determine if an OFF cadence value is defined; and if so, set a state to TONE ON/OFF.

10. The apparatus of claim 9, wherein the signal processing instructions further for execution by the four signal processing units to further, increment a TONE OFF counter if a subsequent tone or voice signal includes silence.

11. The integrated tone detection processor of claim 9, wherein the signal processing instructions further for execution by the four signal processing units to further, if a subsequent tone or voice signal does not include silence, determine if the tone identified in the dictionary satisfies an ON cadence value and an OFF cadence value; and if so, declare a tone.

12. The apparatus of claim 8, wherein the signal processing instructions further for execution by the four signal processing units to further, when the next tone is not the same as the tone identified in the user defined dictionary, determine if an OFF cadence value is defined; and if not, determine whether the tone identified in the user defined dictionary satisfies an ON cadence value; and if so, declare the tone.

13. A method comprising:

performing automatic gain control (AGC) to normalize the power of the tone or voice signal;

determining the energy of tone or voice signals at specific frequencies utilizing a Goertzel Filter process which implements a plurality of Goertzel filters wherein a core processor including at least four signal processing units execute the Goertzel filters, simultaneously;

determining whether or not a tone is present; and if a tone exists, determining what type of tone;

wherein the four signal processing units operate in parallel to execute four Goertzel filters, simultaneously, and wherein the four Goertzel filters process data frames of the tone or voice signal that are of fixed size.

14. The method of claim 13, wherein determining what type of tone includes determining whether the tone is one of a dial tone, a busy tone, a fast busy tone, a ringing tone, or a fax tone.

15. The method of claim 13, wherein, Goertzel filters compute the energy levels of tone or voice signals at 16 specific frequencies.

16. The method of claim 13, further comprising, determining two maximum energy levels of the tone or voice signal and their associated frequencies, respectively, utilizing Goertzel filters.

17. The method of claim 16, wherein based upon the two maximum energy levels of the tone signal and the associated frequencies of the tone signal, further comprising, discriminating whether the tone is a single tone, a dual tone, silence, or another type of tone.

18. The method of claim 17, wherein if the tone was discriminated as a single tone or dual tone, further comprising, determining the tone by identifying the tone in a user defined dictionary of tones.

19. The method of claim 17, further comprising, updating a state to TONE ON.

20. The method of claim 17, further comprising, determining if a next tone is the same as the tone identified in the user defined dictionary and, if so, incrementing a TONE ON counter.

21. The method of claim 20, further comprising, when the next tone is not the same as the tone identified in the user defined dictionary, determining if an OFF cadence value is defined; and if not, determining whether the tone identified in the user defined dictionary satisfies an ON cadence value; and if so, declaring the tone.

22. The method of claim 20, further comprising, when the next tone is not the same as the tone identified in the user defined dictionary, determining if an OFF cadence value is defined; and if so, setting a state to TONE ON/OFF.

23. The method of claim 21, further comprising, incrementing a TONE OFF counter if a subsequent tone or voice signal includes silence.

24. The method of claim 21, further comprising, if a subsequent tone or voice signal does not include silence, determining if the tone identified in the dictionary satisfies an ON cadence value and an OFF cadence value; and if so, declaring a tone.

25. A machine-readable medium having stored thereon instructions, which when executed by a machine, causes the machine to perform operations comprising:

performing automatic gain control (AGC) to normalize the power of the tone or voice signal;

determining the energy of tone or voice signals at specific frequencies utilizing a Goertzel Filter process which implements a plurality of Goertzel filters wherein a core processor including at least four signal processing units execute the Goertzel filters, simultaneously;

determining whether or not a tone is present; and if a tone exists, determining what type of tone;

wherein the four signal processing units operate in parallel to execute four Goertzel filters, simultaneously, and wherein the four Goertzel filters process data frames of the tone or voice signal that are of fixed size.

26. The machine-readable medium of claim 25, wherein determining what type of tone includes determining whether the tone is one of a dial tone, a busy tone, a fast busy tone, a ringing tone, or a fax tone.

27. The machine-readable medium of claim 25, wherein, Goertzel filters compute the energy levels of tone or voice signals at 16 specific frequencies.

28. The machine-readable medium of claim 25, further comprising, determining two maximum energy levels of the tone or voice signal and their associated frequencies, respectively, utilizing Goertzel filters.

29. The machine-readable medium of claim 28, wherein based upon the two maximum energy levels of the tone signal and the associated frequencies of the tone signal, further comprising, discriminating whether the tone is a single tone, a dual tone, silence, or another type of tone.

30. The machine-readable medium of claim 29, wherein if the tone was discriminated as a single tone or dual tone, further comprising, determining the tone by identifying the tone in a user defined dictionary of tones.

31. The machine-readable medium of claim 30, further comprising, updating a state to TONE ON.

32. The machine-readable medium of claim 30, further comprising, determining if a next tone is the same as the tone identified in the user defined dictionary and, if so, incrementing a TONE ON counter.

33. The machine-readable medium of claim 32, further comprising, when the next tone is not the same as the tone identified in the user defined dictionary, determining if an OFF cadence value is defined; and if so, setting a state to TONE ON/OFF.

34. The machine-readable medium of claim 33, further comprising, incrementing a TONE OFF counter if a subsequent tone or voice signal includes silence.

35. The machine-readable medium of claim 33, further comprising, if a subsequent tone or voice signal does not include silence,
 determining if the tone identified in the dictionary satisfies an ON cadence value and an OFF cadence value; and
 if so, declaring a tone.

36. The machine-readable medium of claim 32, further comprising, when the next tone is not the same as the tone identified in the user defined dictionary,
 determining if an OFF cadence value is defined; and
 if not, determining whether the tone identified in the user defined dictionary satisfies an ON cadence value; and
 if so, declaring the tone.

* * * * *

UNITED STATES PATENT AND TRADEMARK OFFICE
CERTIFICATE OF CORRECTION

PATENT NO. : 7,003,093 B2
APPLICATION NO. : 09/938699
DATED : February 21, 2006
INVENTOR(S) : Prabhu et al.

It is certified that error appears in the above-identified patent and that said Letters Patent is hereby corrected as shown below:

In column 5, at line 11, delete "TP," and insert --IP,--.

In column 7, at line 17, delete "DSO" and insert --DS0--.

In column 31, at line 37, delete "SWD" and insert --SID--.

Signed and Sealed this

Sixth Day of November, 2007

JON W. DUDAS
*Director of the United States Patent and Trademark Office*